US009286200B2

United States Patent
Kawaguchi

(10) Patent No.: US 9,286,200 B2
(45) Date of Patent: Mar. 15, 2016

(54) TIERED STORAGE POOL MANAGEMENT AND CONTROL FOR LOOSELY COUPLED MULTIPLE STORAGE ENVIRONMENT

(71) Applicant: HITACHI, LTD., Tokyo (JP)

(72) Inventor: Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 125 days.

(21) Appl. No.: 14/106,997

(22) Filed: Dec. 16, 2013

(65) Prior Publication Data

US 2014/0108763 A1    Apr. 17, 2014

Related U.S. Application Data

(60) Continuation of application No. 13/733,610, filed on Jan. 3, 2013, now Pat. No. 8,621,164, which is a division of application No. 12/860,086, filed on Aug. 20, 2010, now Pat. No. 8,356,147.

(51) Int. Cl.
| | | |
|---|---|---|
| G06F 12/00 | (2006.01) | |
| G06F 12/02 | (2006.01) | |
| G06F 3/06 | (2006.01) | |
| G06F 13/00 | (2006.01) | |

(52) U.S. Cl.
CPC .......... *G06F 12/0223* (2013.01); *G06F 3/0605* (2013.01); *G06F 3/0631* (2013.01); *G06F 3/0685* (2013.01); *G06F 3/0647* (2013.01)

(58) Field of Classification Search
CPC ......... G06F 12/00; G06F 13/18; G06F 13/26; G06F 13/30; G06F 13/34
USPC ........................... 711/100, 154, 157, 158, 165
See application file for complete search history.

(56) References Cited

U.S. PATENT DOCUMENTS

| | | |
|---|---|---|
| 5,680,573 A | 10/1997 | Rubin et al. |
| 5,964,859 A | 10/1999 | Steinbach et al. |
| 6,240,498 B1 | 5/2001 | Dickes et al. |

(Continued)

FOREIGN PATENT DOCUMENTS

| | | |
|---|---|---|
| JP | 2002-222061 A | 8/2002 |
| JP | 2005-242757 A | 9/2005 |

(Continued)

OTHER PUBLICATIONS

European Search Report received in EP11156352 issued Oct. 24, 2012.

*Primary Examiner* — Tuan Thai
(74) *Attorney, Agent, or Firm* — Mattingly & Malur, PC

(57) ABSTRACT

A system comprises a first storage system including a first storage controller, which receives input/output commands from host computers and provides first storage volumes to the host computers; and a second storage system including a second storage controller which receives input/output commands from host computers and provides second storage volumes to the host computers. A first data storing region of one of the first storage volumes is allocated from a first pool by the first storage controller. A second data storing region of another one of the first storage volumes is allocated from a second pool by the first storage controller. A third data storing region of one of the second storage volumes is allocated from the first pool by the second storage controller. A fourth data storing region of another one of the second storage volumes is allocated from the second pool by the second storage controller.

15 Claims, 51 Drawing Sheets

(56) References Cited

U.S. PATENT DOCUMENTS

| | | |
|---|---|---|
| 6,823,442 B1 | 11/2004 | Cameron |
| 6,836,832 B1 * | 12/2004 | Klinkner ............. 711/170 |
| 6,842,829 B1 | 1/2005 | Nichols et al. |
| 6,954,831 B2 | 10/2005 | Carlson et al. |
| 7,231,662 B2 | 6/2007 | Wissenbach |
| 7,469,329 B2 * | 12/2008 | Kuczynski et al. ......... 711/170 |
| 7,711,896 B2 | 5/2010 | Yamamoto et al. |
| 2002/0099914 A1 | 7/2002 | Matsunami et al. |
| 2005/0193165 A1 | 9/2005 | Sakaguchi et al. |
| 2006/0184759 A1 * | 8/2006 | Jordan ............. 711/170 |
| 2007/0055713 A1 | 3/2007 | Nagai et al. |
| 2008/0104355 A1 * | 5/2008 | Moore et al. ............. 711/170 |
| 2008/0184000 A1 | 7/2008 | Kawaguchi |
| 2008/0244204 A1 * | 10/2008 | Cremelie et al. ............. 711/162 |
| 2009/0138884 A1 | 5/2009 | Kakeda et al. |
| 2009/0248953 A1 | 10/2009 | Satoyama et al. |
| 2009/0276588 A1 | 11/2009 | Murase |
| 2010/0070722 A1 | 3/2010 | Otani et al. |
| 2010/0077128 A1 * | 3/2010 | Stansell et al. ............. 711/6 |
| 2010/0082546 A1 | 4/2010 | Sreenivas et al. |
| 2010/0082765 A1 | 4/2010 | Murase |
| 2010/0115222 A1 | 5/2010 | Usami |
| 2010/0115223 A1 | 5/2010 | Sakaguchi |
| 2010/0122020 A1 | 5/2010 | Sikdar et al. |
| 2012/0017042 A1 | 1/2012 | Matsui et al. |

FOREIGN PATENT DOCUMENTS

| | | |
|---|---|---|
| JP | 2009-129134 A | 6/2009 |
| JP | 2009-245387 A | 10/2009 |
| JP | 2010-108341 A | 5/2010 |
| JP | 2010113509 A | 5/2010 |
| JP | 2012-504295 A | 2/2012 |
| WO | 2006061272 | 6/2006 |
| WO | 2010/039426 A2 | 4/2010 |

* cited by examiner

| RAID Gr.# | Capacity | Attribution | Internal/External | RAID Lv. | Disk# or WWN/LUN |
|---|---|---|---|---|---|
| 0 | 500GB | SSD | Internal | 5 | #0-3 |
| 1 | 500GB | SSD | Internal | 5 | #4-7 |
| 2 | 900GB | 10Krpm | Internal | 5 | #128-131 |
| 3 | 900GB | 10Krpm | Internal | 5 | #131-135 |
| 4 | 900GB | 10Krpm | Internal | 5 | #136-139 |
| 5 | 900GB | 10Krpm | Internal | 5 | #140-143 |
| 6 | 12000GB | 7Krpm | Internal | 6 | #256-263 |
| 7 | 12000GB | 7Krpm | Internal | 6 | #264-271 |
| 8 | 12000GB | 7Krpm | Internal | 6 | #272-279 |
| 9 | 12000GB | 7Krpm | Internal | 6 | #280-287 |
| 10 | 12000GB | 7Krpm | Internal | 6 | #288-295 |
| 11 | 100GB | FE SSD | External | 0 | 01:23:45:67:89:00/0 |
| 12 | 300GB | FE HDD | External | 0 | 01:23:45:67:89:00/1 |
| 13 | 150GB | FE SSD | External | 0 | 01:23:45:67:89:01/0 |
| 14 | 200GB | FE HDD | External | 0 | 01:23:45:67:89:01/1 |
| 15 | 10000GB | BE | External | 0 | ab:cd:ef:00:00:00/0 |
| 16 | 10000GB | BE | External | 0 | ab:cd:ef:00:00:01/0 |
| 17 | 10000GB | BE | External | 0 | ab:cd:ef:00:00:01/1 |

| Tier# | Capacity | Used Capacity | Configuration | RAID Gr.# | Priority |
|---|---|---|---|---|---|
| 0 | 1000GB | 1000GB | Int. SSD | 0-1 | 0 |
| 1 | 3600GB | 1863GB | Int. 15Krpm HDD | 2-5 | 2 |
| 2 | 60000GB | 32274GB | Int. 7Krpm HDD | 6-10 | 3 |
| 3 | 30000GB | 23747GB | Ext. BE Vol | 15-17 | 4 |
| 4 | 250GB | 41GB | Ext. FE SSD | 11,13 | 1 |
| 5 | 300GB | 0GB | Ext. FE HDD | 12,14 | 5 |

| Vol# | Vol Capacity | Allocated Capacity | Usable Tier | Volume Type |
|---|---|---|---|---|
| 0 | 200GB | 132GB | 0 | Host |
| 1 | 200GB | 120GB | 0,4 | Host |
| 2 | 200GB | 180GB | 0,4 | Host |
| 3 | 200GB | 56GB | 0,1 | Host |
| 4 | 200GB | 134GB | 0,1 | Host |
| 5 | 200GB | 154GB | 0,1,2 | Host |
| 6 | 200GB | 136GB | 0,1,2 | Host |
| 7 | 200GB | 34GB | 0,1,2 | Host |
| 8 | 300GB | 95GB | 0,1,2 | Host |
| 9 | 300GB | 74GB | 1,2,3,5 | Host |
| 10 | 300GB | 265GB | 1,2,3,5 | Host |
| 11 | 300GB | 173GB | 1,2,3,5 | Host |
| 12 | 150GB | 150GB | 0 | FE Storage |
| 13 | 150GB | 150GB | 0 | FE Storage |
| 14 | 200GB | 200GB | 1,2 | FE Storage |
| 15 | 200GB | 200GB | 1,2 | FE Storage |

Fig. 7

| Tier# | Attribution | Internal Use Priority | External Use Priority | Storage# | Tier# | Capacity | Used Capacity | Limit Workload | Current Workload |
|---|---|---|---|---|---|---|---|---|---|
| 303-1-1 | 303-1-2 | 303-1-3 | 303-1-4 | 303-1-5 | 303-1-6 | 303-1-7 | 303-1-8 | 303-1-9 | 303-1-10 |
| 0 | SSD of 6th Gen. Storage or before | 1 | 1.5 | 0 | 0,1 | 1000GB | 298GB | 100Kiops | 23Kiops |
| | | | | 1 | None | 0GB | 0GB | 0Kiops | 0Kiops |
| | | | | 2 | None | 0GB | 0GB | 0Kiops | 0Kiops |
| 1 | SSD of 7th Gen. Storage or later | 0 | 1.5 | 0 | None | 0GB | 0GB | 0Kiops | 0Kiops |
| | | | | 1 | 0,1 | 1200GB | 337GB | 200Kiops | 117Kiops |
| | | | | 2 | 0,1 | 800GB | 279GB | 200Kiops | 85Kiops |
| 2 | 15Krpm HDD of All Gen. Storage | 2 | 4.5 | 0 | 2,5 | 4500GB | 2351GB | 8Kiops | 2.2Kiops |
| | | | | 1 | 2,5 | 4500GB | 1982GB | 8Kiops | 3.7Kiops |
| | | | | 2 | 2,5 | 7000GB | 3789GB | 12Kiops | 5.1Kiops |
| 3 | 7Krpm HDD of All Gen. Storage | 3 | 4.5 | 0 | 3,5 | 30000GB | 21277GB | 2Kiops | 0.2Kiops |
| | | | | 1 | 3,5 | 30000GB | 18236GB | 2Kiops | 0.3Kiops |
| | | | | 2 | 3,5 | 60000GB | 40721GB | 4Kiops | 0.1Kiops |
| 4 | External Storage | 4 | N/A | 0 | 4 | 30000GB | 14371GB | 3Kiops | 0.1Kiops |
| | | | | 1 | 4 | 30000GB | 12975GB | 3Kiops | 0.1Kiops |
| | | | | 2 | 4 | 30000GB | 13493GB | 3Kiops | 0.1Kiops |

| 303-2-1 | 303-2-2 | 303-2-3 | 303-2-4 | 303-2-5 | 303-2-6 | 303-2-7 | 303-2-8 | 303-2-9 |
|---|---|---|---|---|---|---|---|---|
| Storage# | Vol# | Connected Host# | Network Zone# | Tier# | Capacity | Used Capacity | Workload | Cache Hit Rate |
| 0 | 0 | 0 | 0 | 0,1 | 98GB | 55GB | 2.2Kiops | 1% |
|   | 1 | 1 | 0 | 0,1 | 31GB | 10GB | 2.7Kiops | 0% |
|   | 2 | 2 | 1 | 0,1 | 66GB | 46GB | 1.8Kiops | 2% |
|   | 3 | 3 | 2 | 0,1 | 13GB | 6GB | 2.3Kiops | 1% |
|   | 4 | 4 | 2 | 0,1,2,3 | 50GB | 22GB | 1.8Kiops | 3% |
| 1 | 0 | 5 | 0 | 0,1,2,3 | 75GB | 41GB | 1.7Kiops | 2% |
|   | 1 | 6 | 1 | 0,1,2,3 | 124GB | 74GB | 1.9Kiops | 1% |
|   | 2 | 7 | 2 | 2,3,4,5 | 293GB | 150GB | 0.7Kiops | 98% |
|   | 3 | 8 | 2 | 3,4,5 | 365GB | 160GB | 0.1Kiops | 2% |
|   | 4 | 9 | 2 | 0,1,2,3 | 114GB | 62GB | 1.7Kiops | 3% |
| 2 | 0 | 10 | 0 | 0,1,2,3 | 151GB | 70GB | 1.8Kiops | 1% |
|   | 1 | 11 | 0 | 0,1 | 35GB | 11GB | 3.3Kiops | 1% |
|   | 2 | 12 | 0 | 2,3,4,5 | 372GB | 142GB | 0.7Kiops | 97% |
|   | 3 | 13 | 1 | 2,3,4,5 | 282GB | 165GB | 0.2Kiops | 99% |
|   | 4 | 14 | 2 | 3,4,5 | 789GB | 312GB | 0.1Kiops | 0% |

| Index | Performance | Workload |
|---|---|---|
| Network Latency between a host and a frontend storage subsystem | 20us | - |
| Total network throughput among hosts and frontend storage subsystems | 1000GB/s | 376GB |
| Network latency between Frontend storage subsystems | 20us | - |
| Total network throughput among frontend storage subsystems | 1000GB/s | 376GB |
| Latency between a frontend and a backend storage subsystem | 35us | - |
| Total network throughput to backend storage subsystems | 1800GB/s | 251GB |

Integrated Storage Pool Tier Manager  (305-2)

Integrated Storage Pool (305-2-1)

- Tier 0: 2000GB, 500GB + 500GB, 78%
- Tier 1: 1000GB, 48%
- Tier 2: 4500GB, 62%
- Tier 3: 7000GB, 75%
- Tier 4: 6000GB, 35%

| Tier# | Priority | Storage Type | Media Type |
|---|---|---|---|
| 0 | 1 | HE (5th) | SSD |
| 1 | 0 | HE (7th and 8th) | SSD |
| 2 | 2 | HE (All) | 10Krpm HDD |
| 3 | 3 | HE (All) | 7Krpm HDD |
| 4 | 4 | LE (All) | All |

ISP Information (305-2-2)

- Status : Normal
- Total Capacity : 20500GB
- Used Capacity : 12180GB
- Used Rate : 59%
- Threshold 1 : 70%
- Threshold 2 : 80%
- Number of Tiers : 4

Integrated Storage Pool Tier

| Tier# | Priority | Storage Type | Media Type |
|---|---|---|---|
| 0 | 1 | High-end (5th Gen) | SSD |
| 1 | 0 | High-end (7th and 8th Gen) | SSD |
| 2 | 2 | High-end (All Gen) | 10Krpm HDD |
| 3 | 3 | High-end (All Gen) | 7Krpm HDD |
| 4 | 4 | Low-end (All Gen) | All |
| 5 | | | |

(305-0)

(305-2-3)

[Apply] (305-2-7)    [Cancel] (305-2-8)

Fig. 22

Integrated Storage Pool Volume Manager

Integrated Storage Pool (305-3-1)

Tier 0: 2000GB 78%
Tier 1: 1000GB 48%
Tier 2: 4500GB 62%
Tier 3: 7000GB 75%
Tier 4: 6000GB 35%

| Tier# | Priority | Storage Type | Media Type |
|---|---|---|---|
| 0 | | HE (5th) | SSD |
| 1 | | HE (7th and 8th) | SSD |
| 2 | | HE (All) | 10Krpm HDD |
| 3 | | HE (All) | 7Krpm HDD |
| 4 | | LE (All) | All |

ISP Information (305-3-2)

Status : Normal
Total Capacity : 20500GB
Used Capacity : 12180GB
Used Rate : 59%
Threshold 1 : 70%
Threshold 2 : 80%
Number of Tiers : 4

Virtual Volume (305-3-3)

| Vol# | Capacity | Host# | Tier# |
|---|---|---|---|
| 0 | 10GB | 0 | 1 |
| 1 | 30GB | 0 | 1,2 |
| 2 | 20GB | 0 | 3 |
| 3 | 60GB | 1 | N/A |
| 5 | 60GB | 1 | 2 |
| 6 | | | |

305-0

Apply (305-3-7)   Cancel (305-3-8)

TIERED STORAGE POOL MANAGEMENT AND CONTROL FOR LOOSELY COUPLED MULTIPLE STORAGE ENVIRONMENT

This application is a continuation of U.S. application Ser. No. 13/733,610, filed Jan. 3, 2013 which is a divisional of U.S. application Ser. No. 12/860,086, filed Aug. 20, 2010, now U.S. Pat. No. 8,356,147, the entire content of which is incorporated herein by reference.

BACKGROUND OF THE INVENTION

The present invention relates generally to storage systems and, more particularly, to tiered storage pool management and control for loose coupled multiple heterogeneous storage environment. The loosely coupled connection uses standardized network and not-wide (narrower than internal bus) network, and control of each device connected to the network is independent from that of other devices. By using the loosely coupled connection, one can consolidate heterogeneous (multi-vender, multi-type of product, and multi-generation of product) devices to one system.

Storage virtualization is a technology that is widely used. Examples include thin provisioning and page-based tiered storage. The use of storage virtualization technology can improve storage usability and efficiency. The improvement of usability is by concealment of the internal configuration (e.g., disk configuration, tier configuration, data location and so on). The improvement of efficiency is by sharing of the storage resources (e.g., disk workload, processor workload, internal bus workload, capacity and so on). Generally speaking, these storage virtualization techniques can be applied only in one storage controller. One exception is the case involving the "Mount of external volume" function, wherein the external volume mount function is suitable for the tiered management situation between a high performance storage subsystem and a low cost storage subsystem. However, it will cause a waste of resource and unnecessary overhead for performance by connecting a high performance storage subsystem to a high performance storage subsystem. Many users have a plurality of storage subsystems in their IT (Information Technology) system. Each storage subsystem is independent from the other storage subsystems. This causes difficult and troublesome storage system management for the system design and system operation. The result is a waste of resources in the overall storage system due to the difficulty of resource sharing between two high performance storages. It is difficult to manage the total resource amount and improve the efficiency in the environment involving multiple storage subsystems.

BRIEF SUMMARY OF THE INVENTION

Exemplary embodiments of the invention provide methods and apparatuses to improve the manageability of the overall storage system, in which the integrated storage pool management shows the resource amount of each tier. The integrated/system storage pool includes a plurality of storage subsystems. The amount of each tier is the sum of the tier capacity of the pool in each storage subsystem. To improve the control of the storage system, each storage subsystem manages its own resources. If a storage subsystem needs to use the resource of another storage subsystem, that storage subsystem accesses the resource with standard I/O interface. The storage subsystem can perform tier management control with the external resource, and the priority of the tier of the external resource depends on the network and external storage performance. To improve the efficiency of the storage resources, the integrated storage management can select a way to rebalance among a plurality of storage subsystems and the storage subsystem changes the assignment of resources and/or data according to the selection. Examples include lending capacity between storage subsystems, online volume migration between storage subsystems, and changing path to external volumes between storage subsystems. To avoid the circulation of resource allocation, the storage subsystem forbids allocating a page on the other storage subsystem resource for another storage subsystem, and the storage subsystem does not show a user the resource amount lending form the other storage subsystem.

In accordance with an aspect of the present invention, a system comprises a first storage system including a first storage controller, which receives input/output (I/O) commands from host computers and provides first storage volumes to the host computers; and a second storage system including a second storage controller which receives I/O commands from host computers and provides second storage volumes to the host computers. A first data storing region of one of the first storage volumes is allocated from a first pool by the first storage controller. A second data storing region of another one of the first storage volumes is allocated from a second pool by the first storage controller. A third data storing region of one of the second storage volumes is allocated from the first pool by the second storage controller. A fourth data storing region of another one of the second storage volumes is allocated from the second pool by the second storage controller.

In some embodiments, allocation of the second data storing region of said another one of the first storage volumes from the first pool by the second storage controller is prohibited. In response to allocation of the second data storing region of said another one of the first storage volumes from the second pool by the first storage controller, the second storage controller subtracts an amount allocated to the first volume from a capacity of the second pool. In response to allocation of the second data storing region of said another one of the first storage volumes from the second pool by the first storage controller, the second storage controller subtracts an amount allocated to the first volume from a capacity of the second pool. The first pool is managed using a plurality of first tiers; the second pool is managed using a plurality of second tiers; and a storage media allocated to the second pool, which was allocated to second data storing region, is managed as an independent tier from the plurality of first tiers. The independent tier is determined by network characteristics and access speed of the storage media used. If the storage media is same as a storage media used for the first pool, the storage media used for the first pool has a higher priority as compared to the independent tier.

In one embodiment, a management server selects to lend capacity from the second pool to the first storage system or change control from the second storage controller to the first storage controller against a storage media which is coupled to both the first and second storage controllers, based on load requirement of the system. In another embodiment, a management server selects to lend capacity from the second pool to the first storage system, migrate data from the first storage volume to the second storage volume, or change control from the second storage controller to the first storage controller against a storage media which is coupled to both the first and second storage controllers, based on load requirement of the system.

In accordance with another aspect of the invention, a system comprises a first storage system including a first storage controller, which receives input/output (I/O) commands from host computers and provides first storage volumes to the host computers; a second storage system including a second storage controller, which receives I/O commands from host computers and provisions second storage volumes to the host computers; and a storage media which is allocated to a first pool. A first data storing region of one of the first storage volumes is allocated from the first pool by the first storage controller. A second data storing region of one of the second storage volumes is allocated from a second pool by the second storage controller. In response to a command from a management server, the second storage controller allocates the storage media to the second pool and the first storage controller releases the storage media from the first pool.

In specific embodiments, a management server selects to migrate a first storage volume to a second storage volume, or change control from the second storage controller to the first storage controller against a storage media which is coupled to both the first and second storage controllers, based on load requirement of the system.

In accordance with another aspect of this invention, a system comprises a plurality of storage systems, each including a storage controller which receives input/output (I/O) commands from a host computer and provisions storage volumes from an individual pool; and a management server coupled to the plurality of storage systems. The individual pool of each of the plurality of storage systems is allocated to a plurality of storage media and comprises a plurality of individual tiers. The management server gathers information of storage media allocated to the plurality of storage systems, and dynamically determines a plurality of system tiers for a system pool, which includes storage media allocated to the plurality of storage systems, based on characteristics of the storage media in the gathered information.

In some embodiments, the management server informs determination results regarding the plurality of system tiers for the system pool to the plurality of storage systems. After a storage media is added to the system pool, the management server adjusts the plurality of individual tiers for a relevant individual pool of one of the plurality of storage systems which is affected by addition of the added storage media. In response to a user request, the management server changes the plurality of system tiers for the system pool. In response to a change of the plurality of system tiers for the system pool, the plurality of individual tiers are automatically adjusted. The management server determines at least one of configuration or location of the storage volumes based on conditions of the storage controllers for the plurality of storage systems.

In specific embodiments, in response to a request to release the individual pool of one of the storage systems, at least one of the following occurs in the system: internal storage volumes of the individual pool to be released are migrated to the individual pool of another storage system of the plurality of storage systems; storage media allocated and directly controlled by the storage controller of the first storage system are allocated to the storage controller of another storage system of the plurality of storage systems; and data of external volumes, which are controlled by the storage controller of another storage system of the plurality of storage systems, is migrated to a storage volume controlled by the storage controller of said another storage system controlling the data of the external volumes. The data of external volumes is migrated to an internal storage volume controlled by the storage controller of said another storage system controlling the data of the external volumes or is migrated to a storage volume within the individual pool of said another storage system controlling the data of the external volumes.

In another aspect of the present invention, a system comprises: a first storage system including a first storage controller, which receives input/output (I/O) commands from host computers and provides first storage volumes to the host computers; a second storage system including a second storage controller, which receives I/O commands from host computers and provisions second storage volumes to the host computers; and a storage media which is allocated to a first pool. A first data storing region of one of the first storage volumes is allocated from the first pool by the first storage controller and a second data storing region of one of the second storage volumes is allocated from a second pool by the second storage controller. In response to a command from a management server, the second storage controller allocates the storage media to the second pool and the first storage controller releases the storage media from the first pool. The system further comprises a management server which selects to migrate a first storage volume to a second storage volume, or change control from the second storage controller to the first storage controller against a storage media which is coupled to both the first and second storage controllers, based on load requirement of the system.

These and other features and advantages of the present invention will become apparent to those of ordinary skill in the art in view of the following detailed description of the specific embodiments.

BRIEF DESCRIPTION OF THE DRAWINGS

FIG. 5 illustrates an example of the Disk Management Table.

FIG. 6 illustrates an example of the Tier Management Table.

FIG. 7 illustrates an example of the Volume Management Table.

FIG. 11 illustrates an example of the table structure of Integrated Storage Pool Tier Management Table.

FIG. 12 illustrates an example of the table structure of the Storage Subsystem Management Table.

FIG. 13 illustrates an example of the table structure of the System Information Table.

FIG. 21 shows an example of the Integrated Storage Pool Tier Manager as an I/O interface for a user.

FIG. 22 shows an example of the Integrated Storage Pool Volume Manager as an I/O interface for a user.

DETAILED DESCRIPTION OF THE INVENTION

Figure 1:
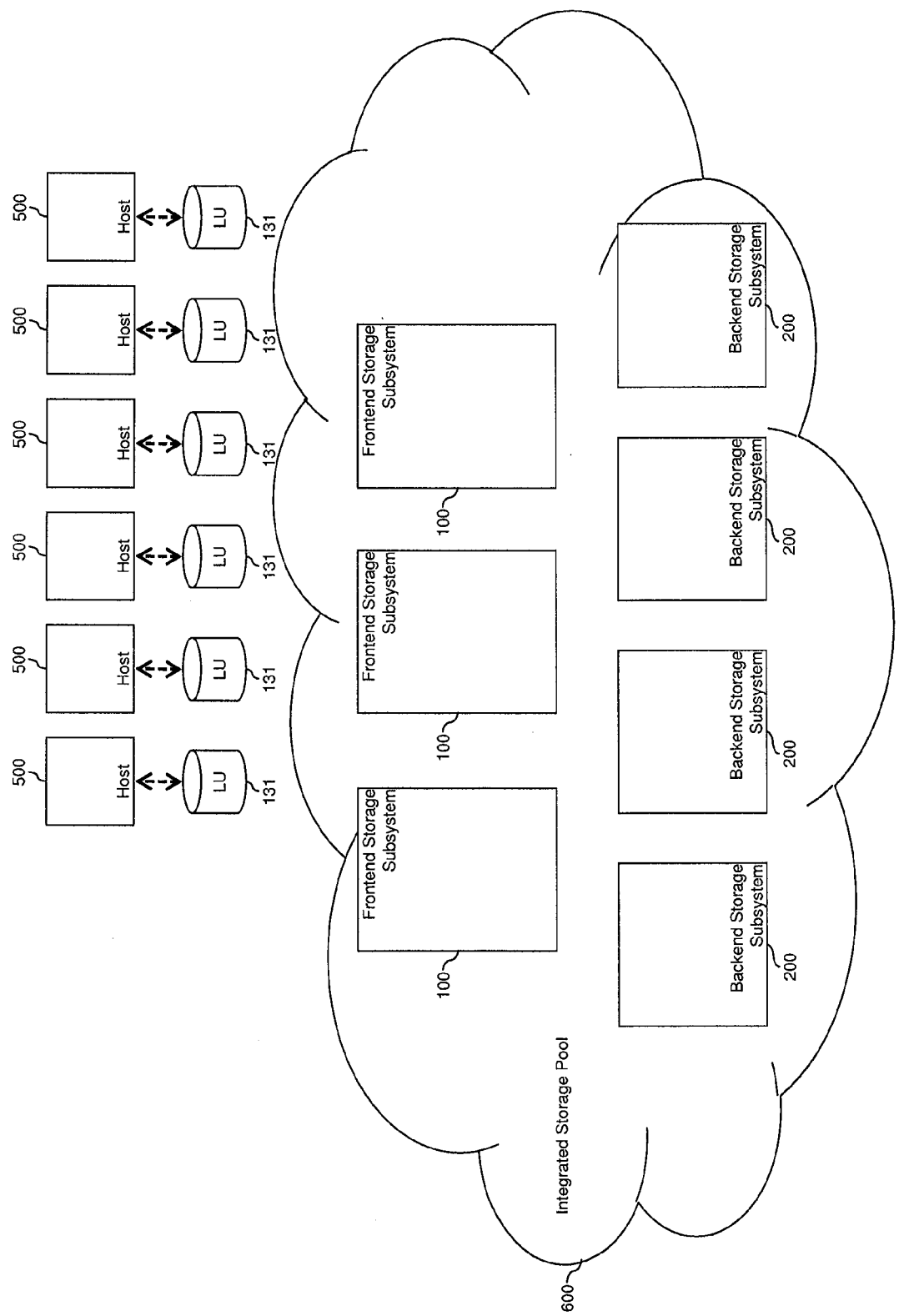
FIG. 1 illustrates an example of a management view of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for tiered storage pool management and control for lose coupled multiple storage environment.

Various aspects of this invention make use of the following storage system technologies: U.S. Pat. No. 6,823,442 to Cameron on thin provisioning; U.S. Pat. No. 7,711,896 to Yamamoto et al. on mounting external volumes; U.S. Publication No. US2007/0055713 by Nagai et al. on page-based tiered storage management; U.S. Patent Publication No. US2010/0070722 by Otani et al. on non-disruptive volume migration; and U.S. Patent Publication No. US2008/0184000 by Kawaguchi on mapping information migration between two storage modules. The entire disclosures of these are incorporated herein by reference.

A. Management View of the System

FIG. 1 illustrates an example of a management view of an information system in which the method and apparatus of the invention may be applied. The figure shows a summary of the configuration and functionality of the system. The information system includes a plurality of frontend storage subsystems 100 for storing data, a plurality of backend storage subsystems 200 for storage data, and a plurality of hosts 500. Each host 500 connects one or more host volumes 131 and sends I/Os to the host volumes 131. Some host volumes 131 may be shared by a plurality of hosts 500. Each host volume 131 provides a data storage area, and is provisioned from an integrated or system storage pool 600. The data of the host volume 131 is stored in the frontend storage subsystems 100 and/or backend storage subsystems 200.

The integrated storage pool 600 includes the frontend storage subsystems 100 and backend storage subsystems 200. The integrated storage pool 600 provides the host volumes 131 to the hosts 500. The relation between the host volumes 131 and the storage in which the data is located is concealed from the user by the integrated storage pool 600. The integrated storage pool 600 can add one or more frontend storage subsystems 100 and/or one or more backend storage subsystems 200 on demand. It can also remove one or more frontend storage subsystems 100 and/or one or more backend storage subsystems 200 on demand unless the resource of the integrated storage pool 600 is lacking after the removal. The integrated storage pool 600 can balance its own resource among the frontend storage subsystems 100 and backend storage subsystems 200. The balancing process is hidden from the hosts 500. As discussed in more detail below, the management server 300 gathers information of storage media allocated to the plurality of storage subsystems, and dynamically determines a plurality of system tiers for the system pool 600, which includes storage media allocated to the plurality of storage subsystems, based on characteristics of the storage media in the gathered information. As used herein, "dynamically" means that during the online operation by the management server 300 (e.g., in determining the system tiers), the plurality of storage subsystems are capable of receiving I/O requests from the host computer(s).

B. Configuration of the System

B1. Logical Configuration of the System

Figure 2:
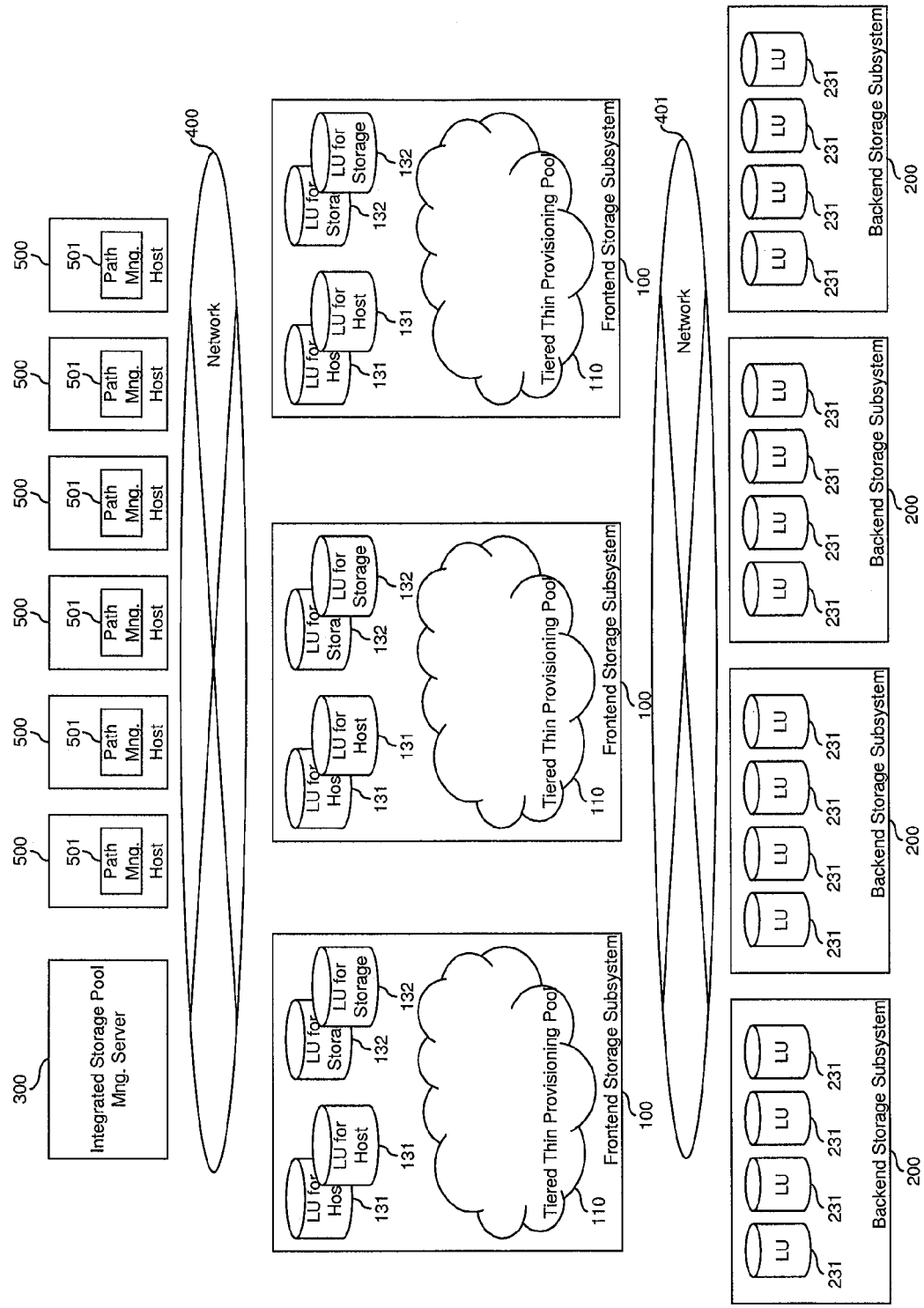
FIG. 2 illustrates an example of the logical configuration of the information system of FIG. 1.

FIG. 2 illustrates an example of the logical configuration of the information system of FIG. 1. The information system includes the frontend storage subsystems 100, the backend storage subsystems 200, the integrated storage pool management server 300, the networks 400 and 401, and the hosts 500.

The frontend storage subsystem 100 stores data. The data is in a tiered thin provisioning pool 110 as an individual pool. The frontend storage subsystem 100 provides host volumes 131 to the hosts 500 and provides cross mount volume 132 to other frontend storage subsystems 100. The frontend storage subsystem 100 is connected to the hosts 500 and the integrated storage pool management server 300. The frontend storage subsystem 100 can connect to the backend storage subsystems 200 and can transfer data to/from the backend storage subsystems 200 via the network 401. The detail explanation is provided in FIG. 4 as described below. The backend storage subsystem 200 is connected to the frontend storage subsystems 100, and provides backend volumes 231 to the frontend storage subsystems 200.

The integrated storage pool management server 300 connects to the frontend storage subsystems 100, the backend storage subsystems 200, and the hosts 500. The integrated storage pool management server 300 manages the storage resource and the configuration of the frontend storage subsystems 100 and backend storage subsystems 200, as well as the connection between the hosts 500 and the frontend storage subsystems 100. The detail explanation is provided in FIG. 10 as described below.

The network 400 transfers data, information, and order among the hosts 500, frontend storage subsystems 100, and integrated storage pool management server 300. The network 401 transfers data, information, and order among the frontend storage subsystems 100, backend storage subsystems 200, and integrated storage pool management server 300. The network 400 and network 401 can be consolidated. The hosts 500 are connected to the frontend storage subsystems 100. The path configuration for each host 500 is defined in the Path Management Module 501 of the host 500. The I/O path follows to the configuration.

Figure 3:
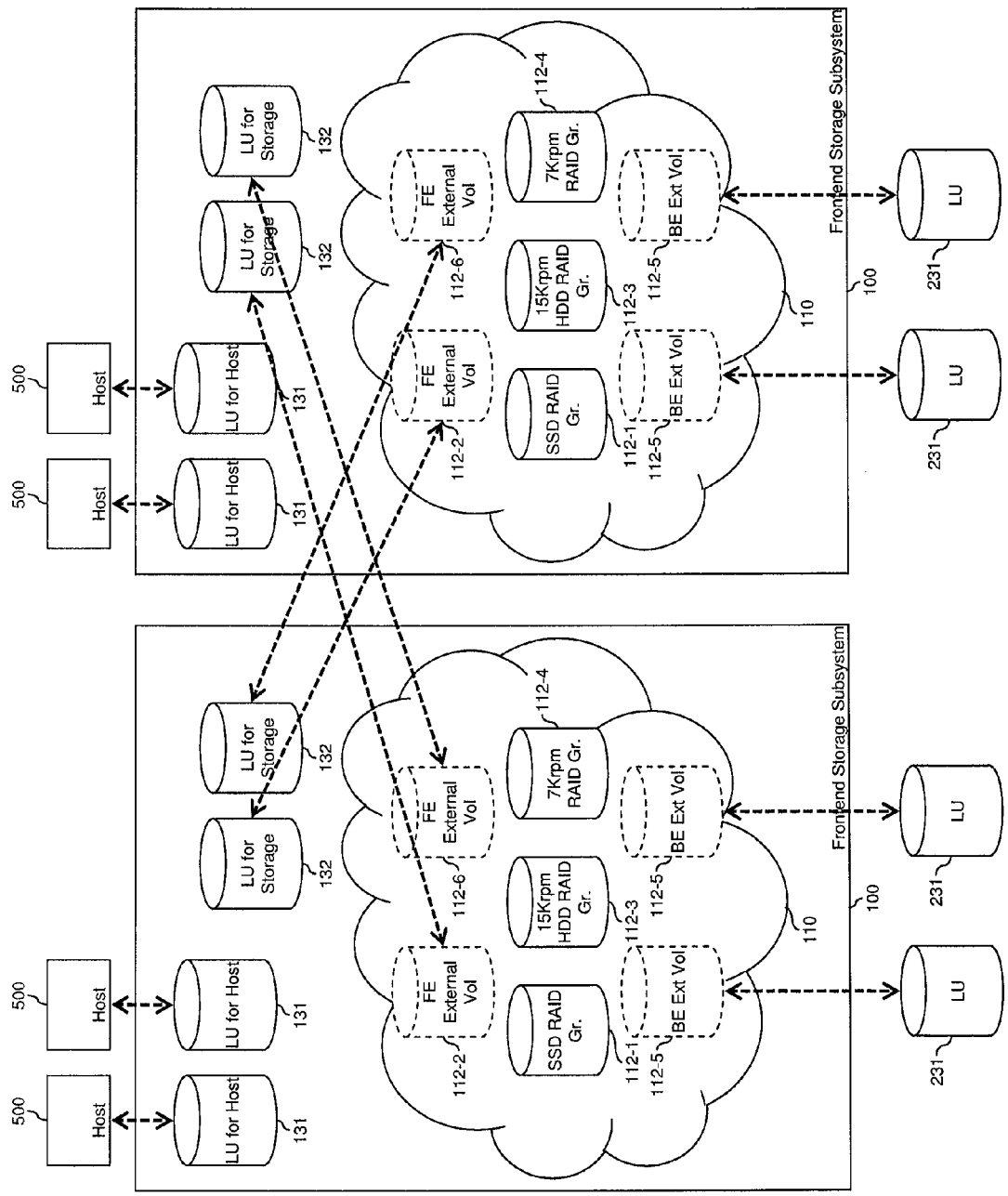
FIG. 3 illustrates the configuration of the tiered thin provisioning pool of each frontend storage subsystem and the relation between the frontend storage subsystems.

FIG. 3 illustrates the configuration of the tiered thin provisioning pool 110 of each frontend storage subsystem and the relation between the frontend storage subsystems 100. The tiered thin provisioning pool 110 includes one or more RAID groups 112. The RAID groups 112 can be categorized into one or more types of tier, such as RAID groups 112-1, 112-2, 112-3, 112-4, 112-6 and so on. Each type of RAID groups has certain characteristics in reliability, availability, performance, capacity, cost, connection protocol, and physicality. Examples include RAID Level, RPMs of HDD, type of media, location (internal/external) and so on. The frontend storage subsystem 100 can use volumes on an external storage subsystem as its own RAID group by an external volume mount function. As seen in FIG. 3, the backend volume 231 is mounted as RAID group 112-5 by the external volume mount function, and the cross mount volume 132 is mounted as RAID group 112-6 by the external volume mount function. The tiered thin provisioning pool 110 is divided to a plurality of tiers. The details of the configuration and control method are described in FIG. 8 and FIG. 9 as described below.

The host volume 131 and cross mount volume 132 are provisioned from the tiered thin provisioning pool 110 with tier configuration. The host volume 131 is connected by the host 500, and the cross mount volume 132 is connected by another frontend storage subsystem 100.

B2. Physical Configuration of Frontend Storage Subsystem

Figure 4:
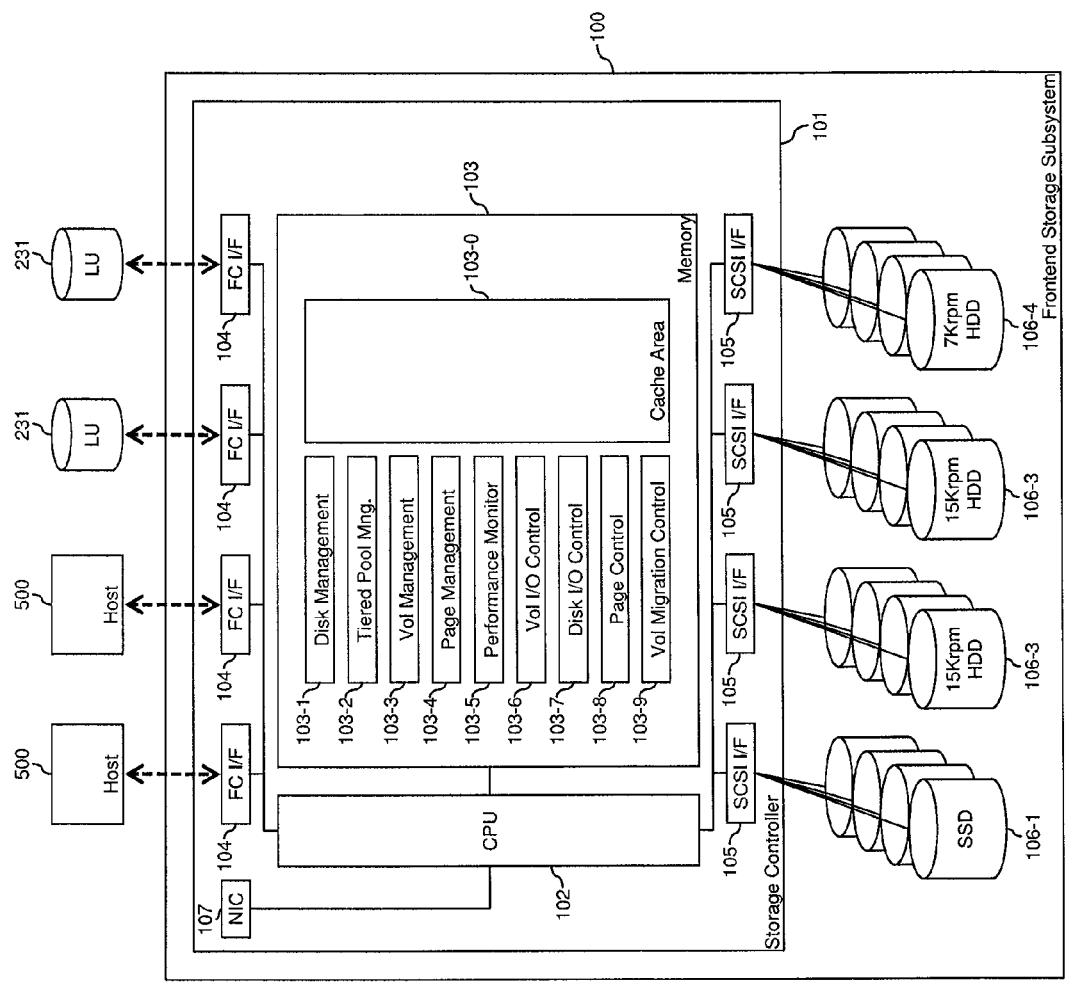
FIG. 4 illustrates an exemplary configuration of the frontend storage subsystem.

FIG. 4 illustrates an exemplary configuration of the frontend storage subsystem 100. It includes a storage controller 101 and disks 106. The storage controller 101 has a CPU 102, a memory 103, host interfaces 104, disk interfaces 105, a management server interface 107, and disks 106. The CPU 102 controls the storage subsystem using the control programs and control tables in the memory 103. The memory 103 stores data, programs, and tables, and includes cache area 103-0, Disk Management Table 103-1, Tiered Pool Management Table 103-2, Volume Management Table 103-3, Page Management Table 103-4, Performance Monitor Program 103-5, Volume I/O Control Program 103-6, Disk I/O Control Program 103-7, Page Control Program 103-8, and Volume Migration Control Program 103-9.

The memory 103 has a cache area 103-0 for storing read and write cache data. The Disk Management Table 103-1 manages the configuration of the RAID groups (see FIG. 5). The Tiered Pool Management Table 103-2 manages the configuration of the tiers in the tiered thin provisioning pool 110 (see FIG. 6). The Volume Management Table 103-3 manages the setting of the host volume 131 and cross mount volume 132 (see FIG. 7). The Page Management Table 103-4 manages the page allocation of the thin provisioning function. The Performance Monitor Program 103-5 gathers the storage configuration and workload information and sends them to the integrated storage pool management server 300. The Volume I/O Control Program 103-6 controls read and write I/Os from the hosts 500 and frontend storage subsystem 100. The Disk I/O Control Program 103-7 controls read and write I/Os to the disks 106, frontend storage subsystem 100, and backend storage subsystem 200. The Page Control Program 103-8 controls the allocation and reallocation of thin provisioning pages. When write I/O occurs, the page allocation process runs. When resource unbalancing occurs, the page reallocation process will run to rebalancing. When removal of RAID groups occurs, the page reallocation process will also run to cause the page to leave the removed RAID group. The Volume Migration Control Program 103-9 controls the volume data, volume configuration, and volume attribution migration from/to the frontend storage subsystem 100 to migrate a volume.

The host interface 104 is an interface to connect to the hosts 500, and receives host I/O from the host 500 and transfers it to the CPU 102. The disk interface 105 is an interface to connect to the disks 106, and sends disk I/O received from the CPU 102 to the disks 106. The management server interface 107 is an interface to connect to the integrated storage pool management server 300. It sends storage information received from the CPU 102 to the integrated storage pool management server 300, and receives orders from the integrated storage pool management server 300 and transfers them to the CPU 102.

The disks store storage data. There are multiple types of disks 106, including disks 106-1, disks 106-2, disks 106-3, and disks 106-4 as seen in FIG. 4. A plurality of disks 106 make up a RAID group. The RAID group is RAID group 112 in FIG. 3.

B3. Table Structure of Frontend Storage Subsystem

FIG. 5 illustrates an example of the Disk Management Table 103-1, which manages the configuration of the RAID group 112 in the frontend storage subsystem 100. The table has columns of RAID group ID 103-1-1, capacity information 103-1-2, attribution information 103-1-3, internal/external location information 103-1-4, RAID level information 103-1-5, and disk ID 103-1-6. The RAID group ID 103-1-1 is a unique number in the frontend storage subsystem 100. The capacity information 103-1-2 contains the usable capacity of the RAID group. The attribution information 103-1-3 provides the type of the RAID group and stores the media type and connection type of the RAID group. It indicates whether the RAID group is an external volume. The configuration, such as the type of the storage subsystem and the tier configuration of the mounted volume, is passed on from the integrated storage pool management server 300. The location information 103-1-4 shows information about the connection type (internal or external). The RAID level information 103-1-5 provides information on the RAID level. The disk ID includes the ID of each disk in the RAID group. If the disk is an internal disk, it stores the disk ID of the frontend storage subsystem 100. If the disk is an external volume, it stores the volume information which can be identified in the system including, for example, WWN (World Wide Name) or LUN (Logical Unit number).

FIG. 6 illustrates an example of the Tier Management Table 103-2, which manages the configuration of the tiers in the thin provisioning pool 110. The table has columns of tier ID 103-2-1, total capacity information 103-2-2, used capacity information 103-2-3, tier configuration setting 103-2-4, RAID group ID 103-2-5, and tier priority setting 103-2-6. The tier ID 103-2-1 is a unique number in the tiered thin provisioning pool 110. The total capacity information 103-2-2 provides the total capacity of the RAID groups which belong to this tier. The used capacity information 103-2-3 provides the allocated page capacity from the tier to the host volume 131 and cross mount volume 132. The tier configuration setting 103-2-4 is the definition of the tier and contains information on the types of RAID groups which belong to the tier. The RAID group ID 103-2-5 contains the IDs of the RAID groups which belong to the tier. The selection is based on the information in the tier configuration setting 103-2-4. The tier priority setting 103-2-6 contains the configuration of tier priority. The Page Control Program 103-8 allocates and reallocates a page based on this information and the Volume Management Table 103-3.

FIG. 7 illustrates an example of the Volume Management Table 103-3, which manages the setting of the host volume 131 and cross mount volume 132. The table has columns of volume ID 103-3-1, volume capacity 103-3-2, allocated capacity 103-3-3, usable tier setting 103-3-4, and volume type information 103-3-5. The volume ID 103-3-1 is the ID of the volume. The volume capacity 103-3-2 provides the capacity of the volume. The allocated capacity 103-3-3 is the total capacity of allocated pages to the volume. The tier setting 103-3-4 is the tier from which the volume can allocate page (s). If the volume is the cross mount volume 132, it can prevent circular page allocation among a plurality of frontend storage subsystems 100 by preventing the cross mount volume 132 from using tiers which have external volume(s) that another frontend storage subsystem provides. The volume type information 103-3-5 contains device information which accesses the volume.

B4. Logical Configuration of Tiered Thin Provisioning Function

Figure 8:
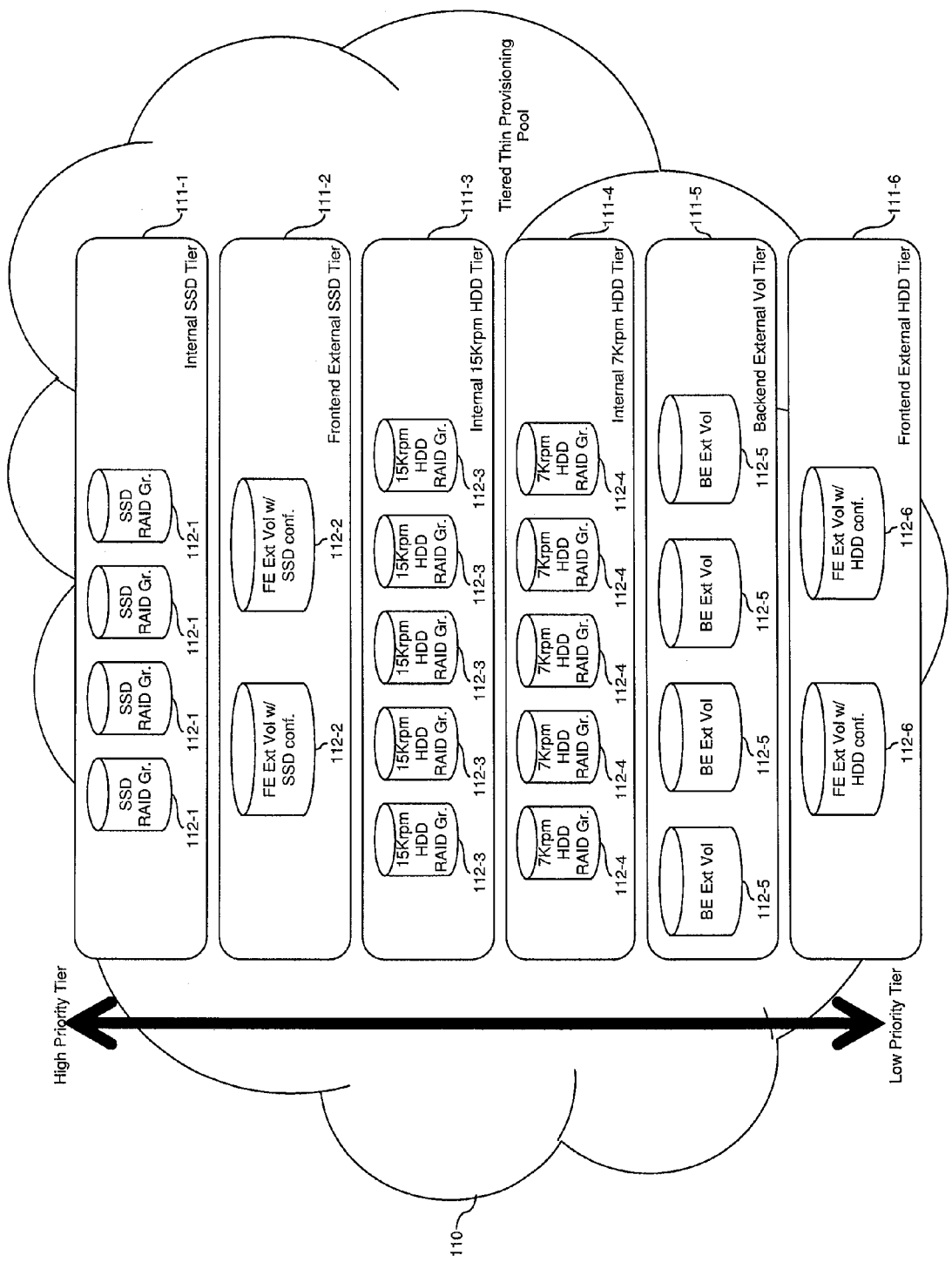
FIG. 8 illustrates an example of the relation of the tiered thin provisioning pool, RAID groups, and tiers.

FIG. 8 illustrates an example of the relation of the tiered thin provisioning pool 110, RAID groups 112, and tiers 111. The tiered thin provisioning pool 110 includes a plurality of tiers 111. Each tier 111 is a group of RAID groups which are listed in the RAID group ID 103-2-5. The selection of RAID group is based on the information in the tier configuration setting 103-3-4. FIG. 8 shows several tiers with different types of media: Tier 111-1, Tier 111-2, Tier 111-3, Tier 111-4, Tier 111-5, Tier 111-6 and so on. Each tier has a priority setting. The information is stored in the tier priority setting 103-2-5.

Figure 9:
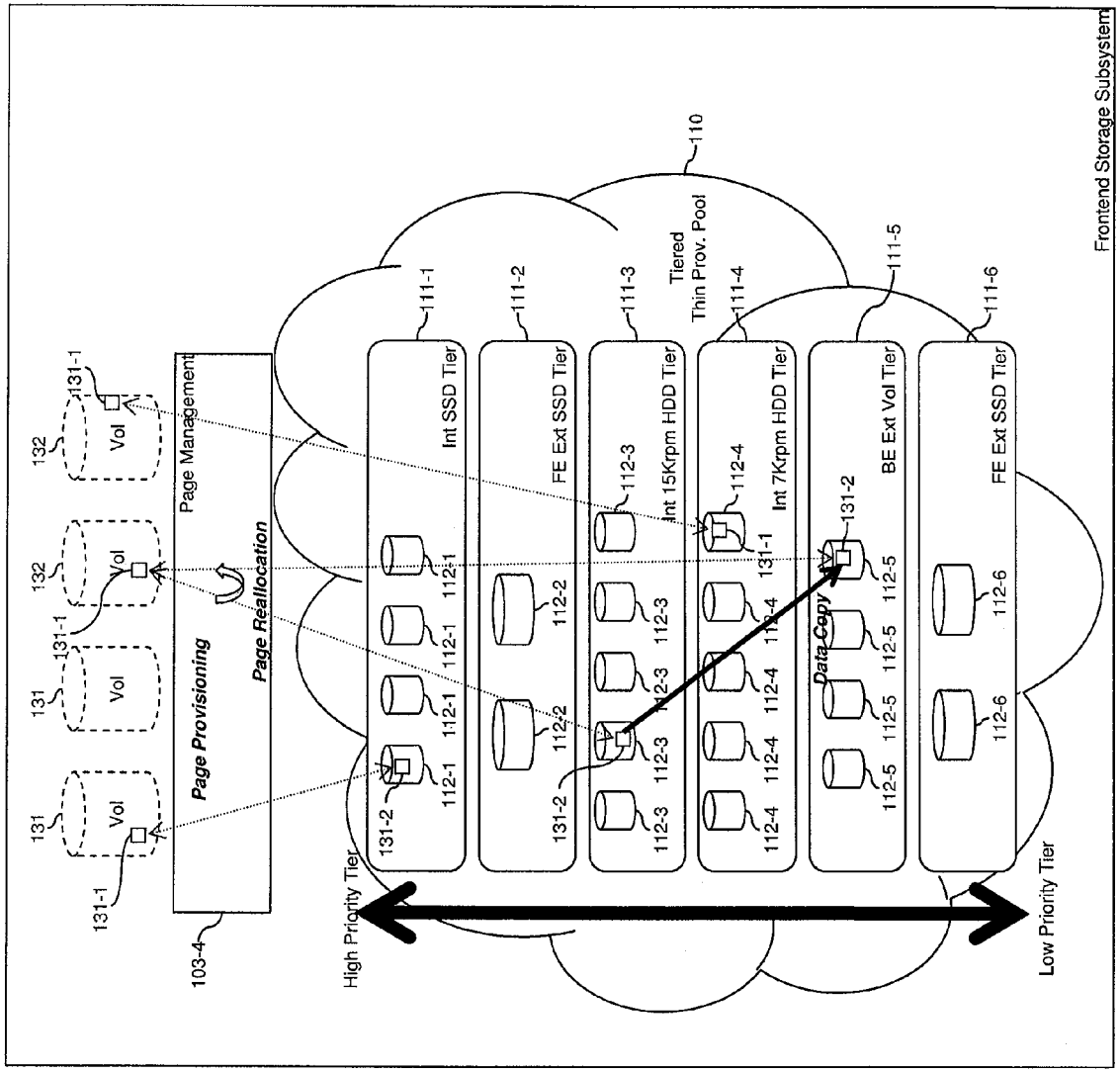
FIG. 9 illustrates an example of the relation of the host volumes, cross mount volumes, tiered thin provisioning, and pages.

FIG. 9 illustrates an example of the relation of the host volumes 131, cross mount volumes 132, tiered thin provisioning 110, and pages. When a volume uses a thin provisioning function, the volume allocates a capacity page 131-2 from the tiered thin provisioning pool 110 to a volume page 131-1 which covers the address where write I/O occurred. The relation between a volume page 131-1 and a capacity page 131-2 is stored in the Page Management Table 103-4. The allocation can be changed by data copy between an allocated capacity page 131-2 to another capacity page and changing the mapping information between the volume page 131-1 and the capacity page 131-2. The frontend storage subsystem 100 automatically changes the allocation that depends on the performance information, workload information, storage configuration, remaining tier capacity, tier priority setting in the tier priority setting 103-2-5, and volume QoS setting in the volume type information 103-3-5.

B5. Physical Configuration of Integrated Storage Pool Management Server

Figure 10:
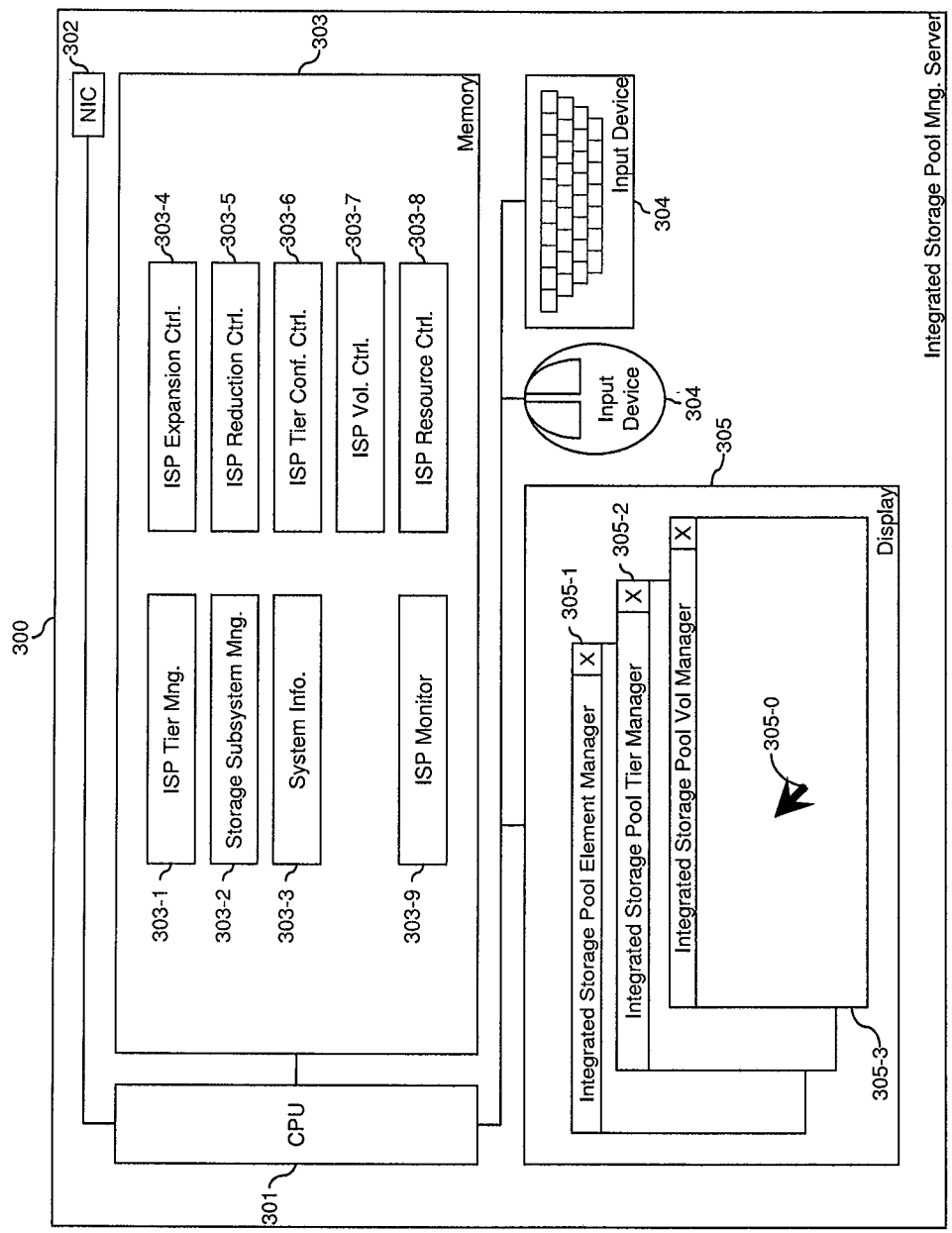
FIG. 10 illustrates an example of the configuration of the integrated storage pool management server.

FIG. 10 illustrates an example of the configuration of the integrated storage pool management server 300. It includes a CPU 301, a system management interface 302, a memory 303, input devices 304, and a display 305. The CPU 310 controls the server 300 by using the control programs and control tables in the memory 303. The system management interface 302 is an interface to connect the frontend storage subsystem 100, backend storage subsystem 200, and hosts 500. It sends commands to the frontend storage subsystem 100, backend storage subsystem 200, and hosts 500 to change that configuration. It receives storage performance and workload and configuration information from the frontend storage subsystem 100 and backend storage subsystem 200.

Figure 14:
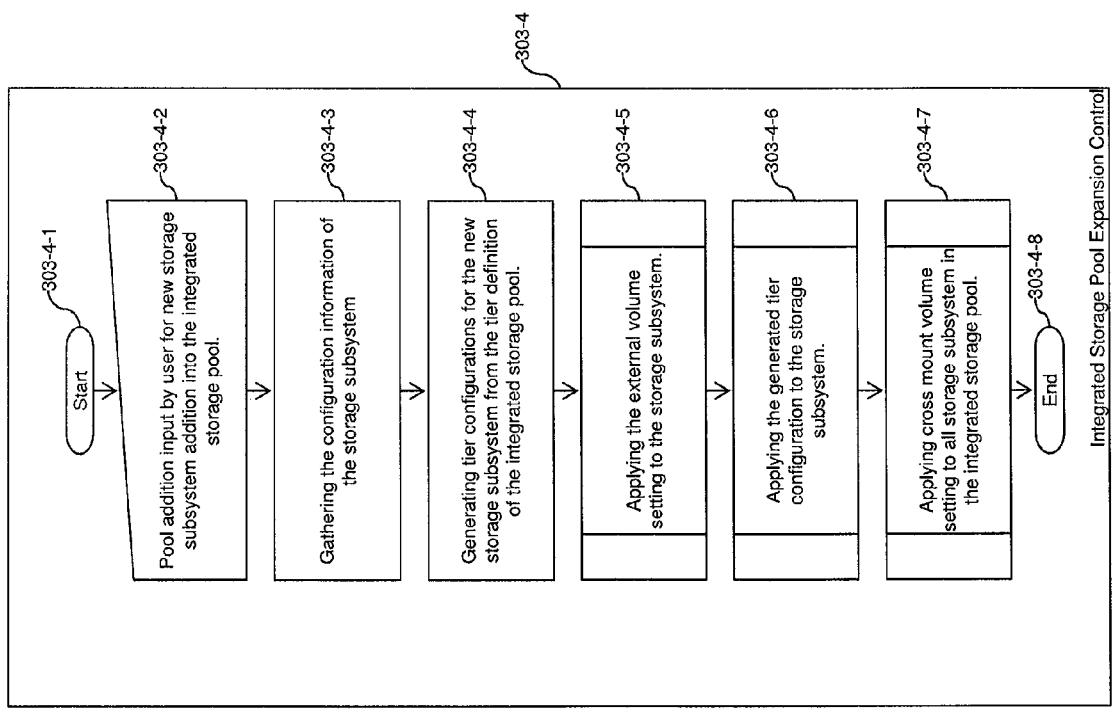
FIG. 14 is an example of a flow diagram illustrating the process of the Integrated Storage Pool Expansion Control Program.
Figure 15:
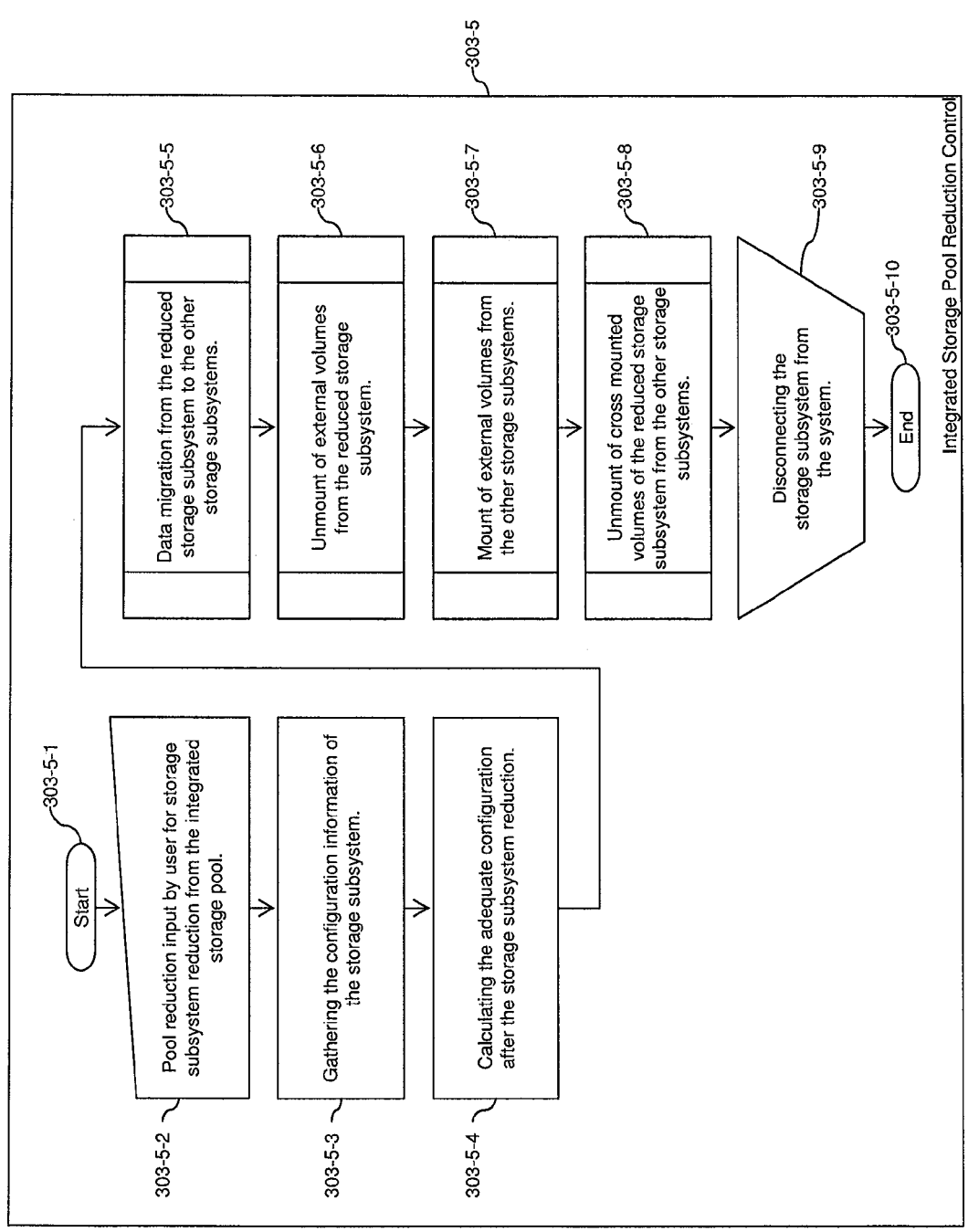
FIG. 15 is an example of a flow diagram illustrating the process of the Integrated Storage Pool Reduction Control Program.
Figure 16:
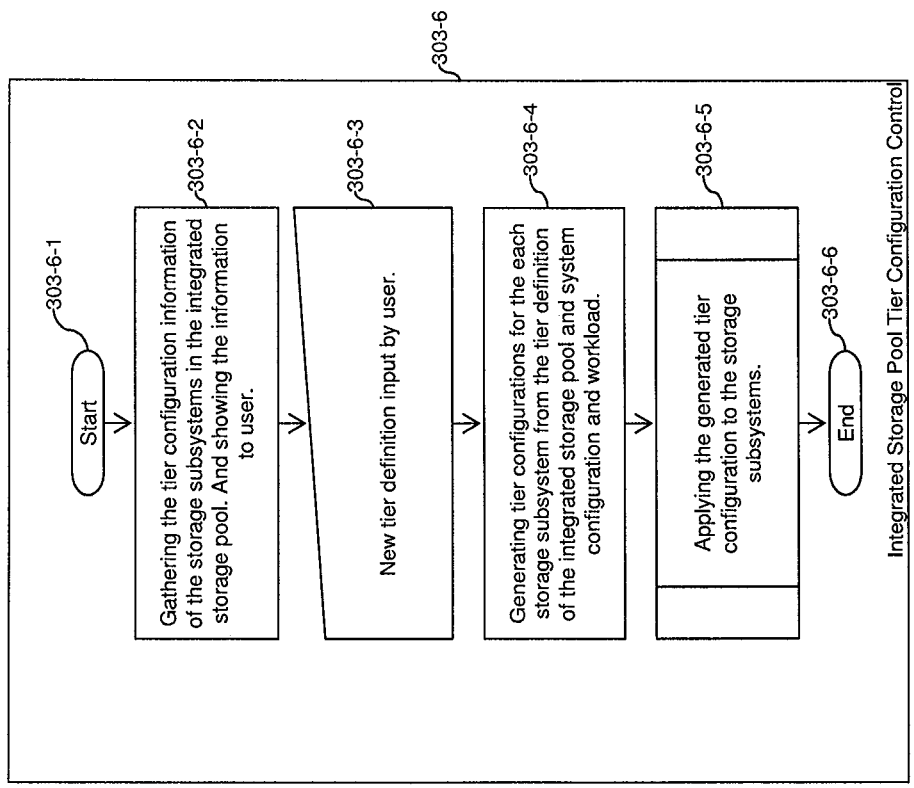
FIG. 16 is an example of a flow diagram illustrating the process of the Integrated Storage Pool Tier Configuration Control Program.
Figure 17:
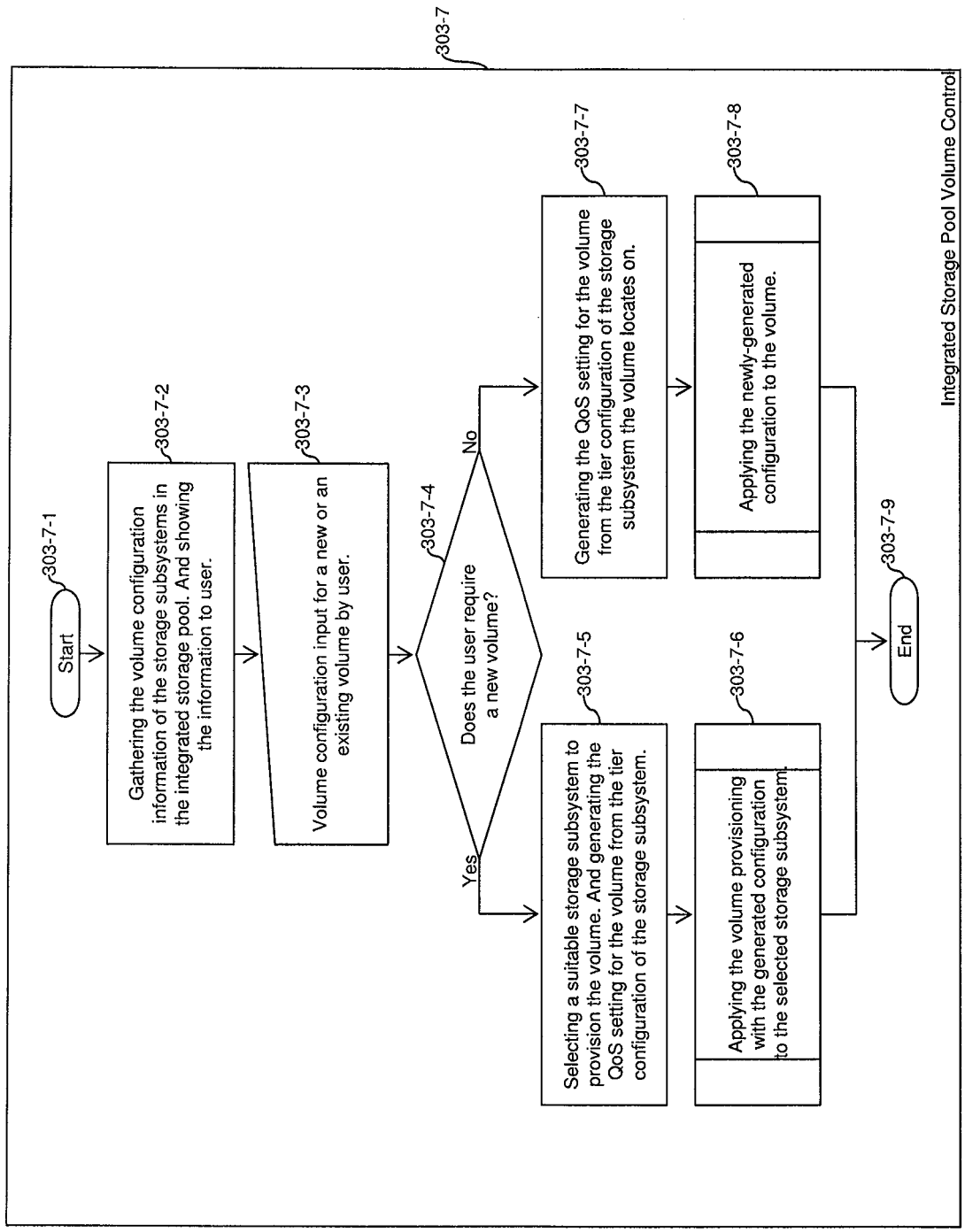
FIG. 17 is an example of a flow diagram illustrating the process of the Integrated Storage Pool Volume Control Program.
Figure 18:
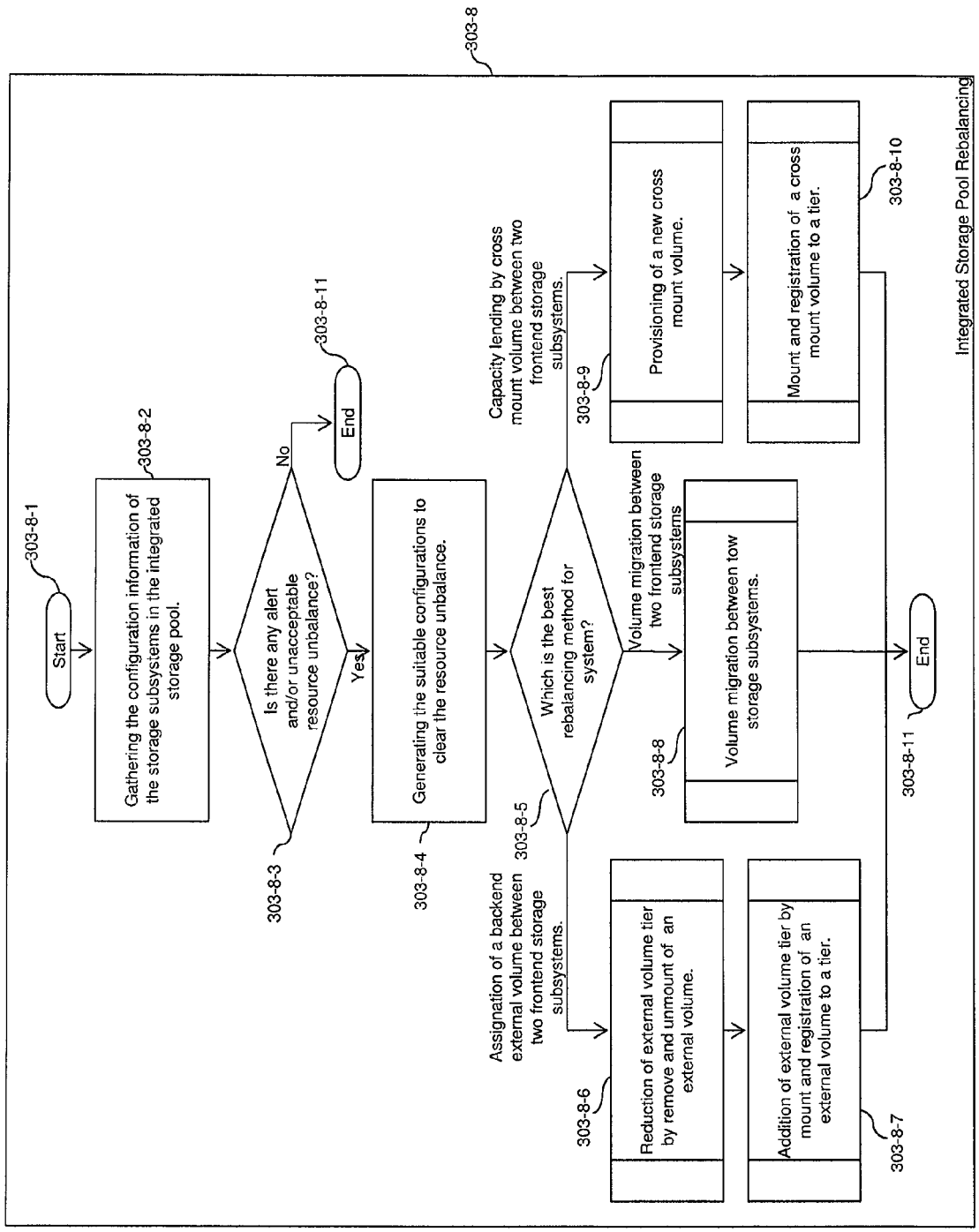
FIG. 18 is an example of a flow diagram illustrating the process of Integrated Storage Pool Rebalancing Control Program.

The memory 303 stores data, programs, and tables. An Integrated Storage Pool Tier Management Table 303-1 stores the tier configuration and status information of the integrated storage pool 600. The details of the structure are shown in FIG. 11. A Storage Subsystem Management Table 303-2 stores the configuration and status information of each frontend storage subsystems 100 and backend storage subsystems 200. The details of the structure are shown in FIG. 12. A System Information Table 303-3 stores the configuration, performance, and workload information of IT devices in the system except storage devices. The details of the structure are shown in FIG. 13. An Integrated Storage Pool Expansion Control Program 303-4 installs new frontend storage subsystem 100 and backend storage subsystem 200 into the integrated storage pool 600. This program sets up the tier configuration to the frontend storage subsystem 100 based on the information in the Integrated Storage Pool Tier Management Table 303-1, and sets up external volume mount and cross mount configuration. The details of the process are shown in FIG. 14. An Integrated Storage Pool Reduction Control Program 303-5 removes old frontend storage subsystem 100 and backend storage subsystem 200 from the integrated storage pool 600. This program orders the removed frontend storage subsystem 100 to release the storage resources, and orders the non-removed frontend storage subsystems 100 to take over the data and resources of the removed frontend storage subsystem 100. The details of the process are shown in FIG. 15. An Integrated Storage Pool Tier Configuration Control Program 303-6 sets up and/or changes the tier configuration of each frontend storage subsystem 100 based on the information in the Integrated Storage Pool Tier Management Table 303-1. The details of the process are shown in FIG. 16. An Integrated Storage Pool Volume Control Program 303-7 selects the frontend storage subsystem 100 and orders the frontend storage subsystem 100 to provision a volume with QoS setting and host path setting. The details of the process are shown in FIG. 17. An Integrated Storage Pool Resource Control Program 303-8 checks the resource to find unacceptable resource unbalance. If the program finds unbalance, it orders the frontend storage subsystems 100 to rebalance the resource in the integrated storage pool 600. The details of the process are shown in FIG. 18. An Integrated Storage Pool Monitor Program 303-9 gathers configuration, performance, and workload information, and alerts each frontend storage subsystem 100 and backend storage subsystem 200.

Figure 20:
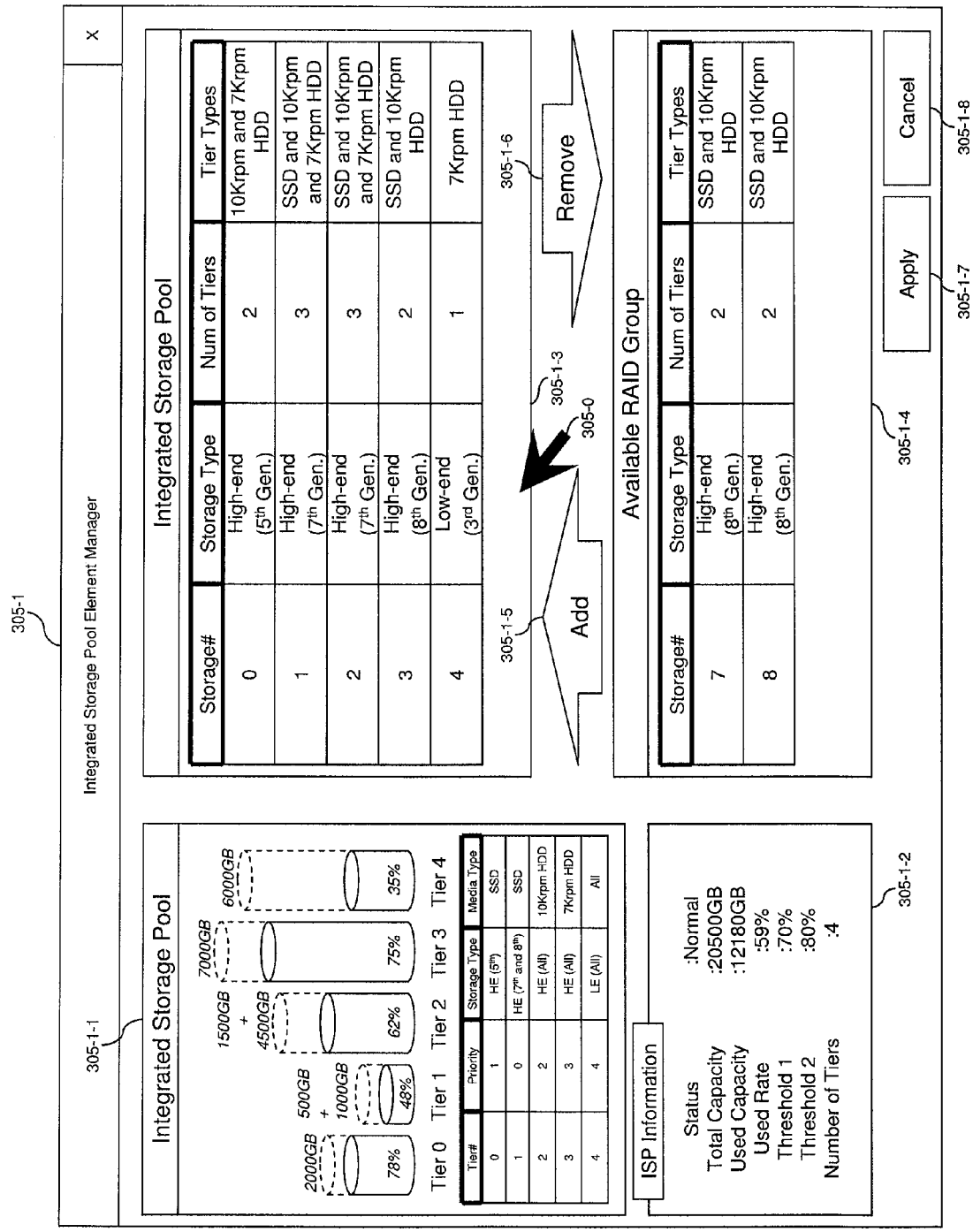
FIG. 20 shows an example of the Integrated Storage Pool Element Manager as an input/output (I/O) interface for a user.

The input devices 304 allow the user to input storage configuration setting. The display 305 is an output device for the user, and a pointer 305-0 shows the current input area to the user. The display 305 shows a number of managers. An Integrated Storage Pool Element Manager 305-1 presents a window as a user interface to order the installation of new frontend storage subsystem 100 and backend storage subsystem 200 into the integrated storage pool 600. The detailed image of the window is shown in FIG. 20. An Integrated Storage Pool Tier Manager 305-2 presents a window as a user interface to set the configuration of tier of the integrated storage pool 600. The detailed image of the window is shown in FIG. 21. An Integrated Storage Pool Volume Manager 305-3 presents a window as a user interface to provision new host volume 131 and change the configuration of existing host volume 131 of the integrated storage pool 600.

B6. Table Structure of Integrated Storage Pool Management Server

FIG. 11 illustrates an example of the table structure of Integrated Storage Pool Tier Management Table 303-1. This table manages the configuration of each tier in the integrated storage pool 600. The Integrated Storage Pool Expansion Control 303-4 generates the configuration of tiers in the tiered thin provisioning pool 110 in a new frontend storage subsystem 100 from this table at registration. The Integrated Storage Pool Volume Control 303-7 generates the configuration and location of the volume at volume provisioning.

The Integrated Storage Pool Tier Management Table 303-1 has the following columns. The tier ID 303-1-1 is an ID of the tier which is a unique number in the integrated storage pool 600. The tier configuration setting 303-1-2 provides definition of the tier, including the types of tiers which belong to the thin provisioning pools 110 in the frontend storage subsystems 100. The user inputs these settings from the Integrated Storage Pool Tier Manager 305-2. The internal tier priority setting 303-1-3 provides priority information of tier use when the frontend storage subsystem 100 uses internal RAID groups or external volumes of the backend storage subsystems 200. The user inputs these settings from the Integrated Storage Pool Tier Manager 305-2. When the integrated storage pool management server 300 changes or applies tier setting to internal RAID group tier of the tiered thin provisioning pool 110, the priority setting of the tier is based on this information and the external tier priority setting 303-1-4. The external tier priority setting 303-1-4 provides priority information of tier use when the frontend storage subsystem 100 uses external volumes of other frontend storage subsystems 100. The integrated storage pool management server 300 calculates this value with priority information in the internal tier priority setting 303-1-3 and latency and workload information in the System Information Table 303-3. When the integrated storage pool management server 300 changes or applies tier setting to the tier of the tiered thin provisioning pool 110 which consists of external volume tier from the frontend storage subsystem 100, the priority setting of the tier is based on this information and the external tier priority setting 303-1-4.

The storage subsystem ID 303-1-5 provides the ID of the frontend storage subsystems 100 which belongs to the integrated storage pool 600. This information is registered by the Integrated Storage Pool Expansion Control 303-4. The thin provisioning pool tier ID 303-1-6 provides the ID of tier in the thin provisioning pools 110 which relates to the tier of the integrated storage pool 600. This information is registered by the Integrated Storage Pool Expansion Control 303-4. The storage subsystem tier total capacity 303-1-7 provides the total capacity of the tier of the tiered thin provisioning pool 110 except the external volume tier of the frontend storage subsystems 100. This information is gathered and stored by the Integrated Storage Pool Monitor Program 303-9. The storage subsystem tier used capacity 303-1-8 provides the used capacity of the tier of the tiered thin provisioning pool 110 except the external volume tier of the frontend storage subsystems 100. This information is gathered and stored by the Integrated Storage Pool Monitor Program 303-9. The Storage Subsystem Tier Limit Workload 303-1-9 provides the performance information of the tier of the tiered thin provisioning pool 110. This information is calculated from the configuration of the tier such as, for example, numbers of disk, type of media, RAID level, and the like. The configuration information is gathered and stored by the Integrated Storage Pool Monitor Program 303-9. The Storage Subsystem Tier Current Workload 303-1-10 provides workload information of the tier of the tiered thin provisioning pool 110. This information is gathered and stored by the Integrated Storage Pool Monitor Program 303-9.

FIG. 12 illustrates an example of the table structure of the Storage Subsystem Management Table 303-2. This table manages the configuration and status of the frontend storage subsystems 100, volumes 133 in the frontend storage subsystems 100, the hosts 500 which connect to the volumes, and the network 400 which links the hosts and the volumes. The Volume Capacity Information 303-2-6, Volume Used Capacity Information 303-2-7, Volume Workload Information 303-2-8, and Cache Hit Rate Information 303-2-9 are important to select volumes for resource rebalancing among the frontend storage subsystems 100.

The Storage Subsystem Management Table 303-2 has the following columns. The storage ID 303-2-1 provides the ID of the frontend storage subsystem 100 as a unique number in the system. The volume ID 303-2-2 provides the ID of the host volume 131 as a unique number in the frontend storage subsystem 100. The host ID 303-2-3 provides the ID of the host 500 which connects to the volume as a unique number in the system. The network zone ID 303-2-4 provides the ID of network zone that the host and the volume uses as a unique number in the system. The tier ID 303-2-5 provides the ID of tier in the tiered thin provisioning pool 110 from which the volume can allocate/relocate pages as a unique number in the tiered thin provisioning pool 110. The Volume Capacity Information 303-2-6 provides capacity information of the volume, and is gathered and stored by the Integrated Storage Pool Monitor Program 303-9. The Volume Used Capacity Information 303-2-7 provides used capacity information of the volume, and is gathered and stored by the Integrated Storage Pool Monitor Program 303-9. The Volume Workload Information 303-2-8 provides Workload information of the volume, and is gathered and stored by the Integrated Storage Pool Monitor Program 303-9. The Cache Hit Rate Information 303-2-9 provides cache hit/miss information of the volume, and is gathered and stored by the Integrated Storage Pool Monitor Program 303-9.

FIG. 13 illustrates an example of the table structure of the System Information Table 303-3. This table stores information about the actual performance and current workload of the system except storage. This information is useful for selecting the method to rebalance the storage resource among the frontend storage subsystems 100 and backend storage subsystems 200.

The System Information Table 303-3 has the following columns. The index 303-3-1 provides the index of the performance of the system. The Performance Information 303-3-2 provides information on actual performance. This value can be informed by the user. The Workload Information 303-3-3 provides current workload of the component. This value is gathered by the Integrated Storage Pool Monitor Program 303-9, inputted by the host 500 and network 400, or calculated.

B7. Process of Programs of Integrated Storage Pool Management Server

FIG. 14 is an example of a flow diagram illustrating the process of the Integrated Storage Pool Expansion Control Program 303-4. This program runs when a user adds a new storage subsystem to the integrated storage pool 600. The operation instruction comes from the Integrated Storage Pool Element Manager 305-1.

The program start at step 303-4-1. In step 303-4-2, the user provides pool addition input for new storage subsystem information to the Storage Pool Element Manager 305-1. In step 303-4-3, the program gathers the configuration information of the new storage subsystem (e.g., RAID group configuration). The program refers to the Integrated Storage Tier Management Table 303-1 and categorizes the RAID groups in the new storage subsystem to tiers. In step 303-4-4, the program generates the configuration of the new storage subsystem from the gathered information. If the storage subsystem is suitable to the backend storage subsystem 200, the program selects the frontend storage subsystems 100 to connect. In step 303-4-5, the program applies the external volume setting to the new storage subsystem. If the new storage subsystem is a backend Storage Subsystem 200, the program orders the frontend storage subsystems 100 to mount volumes as external volumes and install to the tiered thin provisioning pools 110. In step 303-4-6, the program applies the generated tier configuration to the new storage subsystem. If the new storage subsystem is a frontend storage subsystem 100, the program orders the new storage subsystem to set up the generated tier for its thin provisioning pool 110. In step 303-4-7, the program applies the cross mount volume setting to all storage subsystems in the integrated storage pool. If the new storage subsystem is a frontend storage subsystem 100, the program orders to establish cross mount volumes 132 with QoS setting, and orders the other frontend storage subsystems 100 to mount the cross mount volumes 132 of the new frontend storage subsystem 100 as external volumes. The program ends at step 303-4-8.

FIG. 15 is an example of a flow diagram illustrating the process of the Integrated Storage Pool Reduction Control Program 303-5. This program runs when a user remove an existing storage subsystem from the integrated storage pool 600. The operation instruction comes from the Integrated Storage Pool Element Manager 305-1.

The program starts at step 303-5-1. In step 303-5-2, the user provides a pool reduction input of the information of the removed storage subsystem to the Storage Pool Element Manager 305-1. In step 303-5-3, the program gathers the configuration information of the new storage subsystem (e.g., RAID group configuration and volume configuration). The program refers to the Integrated Storage Tier Management Table 303-1 to know the current configuration of the integrated storage pool 600. In step 303-5-4, the program generates the configuration of each remaining storage subsystem from the gathered information. In step 303-5-5, the program orders the removed storage subsystems and remaining storage subsystems to migrate data among them. More specifically, data is migrated from the reduced storage subsystem to the other storage subsystems. The Volume Migration Control Program 103-9 and/or Page Control Program 103-8 will be run in the frontend storage subsystems 100 by this operation. In step 303-5-6, the program orders the removed storage subsystem to unmount the external volume if the removed storage subsystem is the frontend storage 100 and it mounts volumes of the backend storage subsystem 200. In step 303-5-7, the program orders the remaining storage subsystem(s) to mount volumes of the backend storage subsystems 200 that the removed storage subsystem had mounted if the removed storage subsystem is a frontend storage subsystem. In step 303-5-8, the program orders the remaining storage subsystem (s) to unmount cross mount volumes provided by the removed storage subsystem if the removed storage subsystem is a frontend storage subsystem. The Page Control Program 103-8 will be run in the remaining storage subsystems by this operation. In step 303-5-9, the user disconnects the removed storage subsystem from the network and removes it. The program ends at step 303-5-10.

FIG. 16 is an example of a flow diagram illustrating the process of the Integrated Storage Pool Tier Configuration Control Program 303-6. This program runs when a user changes the tier configuration of the integrated storage pool 600. The operation instruction comes from the Integrated Storage Pool Tier Manager 305-2.

The program starts at step 303-6-1. In step 303-6-2, the program gathers the configuration information of each storage subsystem. The program refers to the Integrated Storage Tier Management Table 303-1 to obtain the current configuration of the integrated storage pool 600. The program shows a user the total information of the integrated storage pool 600. The amount of tier resource (e.g., capacity) of the integrated storage pool 600 is the sum of the amount of related tiers in the tiered thin provisioning pool 110 of each frontend storage subsystems 100. In this way, the user can know the amount of total resource and remaining resource for each tier in the system. In step 303-6-3, the user inputs the new tier configuration of the integrated storage pool 600 from the Storage Pool Tier Manager 305-2. In step 303-6-4, the program generates the configuration for the new setting, such as tier priority and categorization. In step 303-6-5, the program orders each frontend storage subsystems 100 to change the tier configuration of the tiered thin provisioning pool 110. The Page Control Program 103-8 will be run in the frontend storage subsystems 100 by this operation. The program ends at step 303-6-6.

FIG. 17 is an example of a flow diagram illustrating the process of the Integrated Storage Pool Volume Control Program 303-7. This program runs when a user provisions new volume of changes configuration of existing volumes in the integrated storage pool 600. The operation instruction comes from the Integrated Storage Pool Volume Manager 305-3.

The program starts at step 303-7-1. It refers to the Integrated Storage Tier Management Table 303-1 to obtain the current configuration of the integrated storage pool 600. In step 303-7-2, the program shows a user the total information of the integrated storage pool 600. The amount of tier resource (e.g., capacity) of the integrated storage pool 600 is the sum of amount of related tiers in the tiered thin provisioning pool 110 of each frontend storage subsystems 100. In this way, the user can know the amount of total resource and remaining resource for each tier in the system. In step 303-7-3, the user inputs the new volume configuration of the integrated storage pool 600 from the Storage Pool Volume Manager 305-3, including, for example, capacity of the volume, host which connects to the volume, and QoS settings. In step 303-7-4, the program checks which operation occurs. If it is volume provisioning, the program proceeds to step 303-7-5. If it is volume reconfiguration, the program proceeds to step 303-7-7. In step 303-7-5, the program selects a suitable frontend storage subsystem 100 to provision a host volume 131. The selection is generated from the remaining resource, convertibility of network, and requirement for the volume. This program generates the QoS setting (using tier setting) based on the input from the Storage Pool Volume Manager 305-3 and current configuration of the selected frontend storage subsystem 100. In step 303-7-6, the program orders the frontend storage subsystem 100 to provision a host volume 131 with capacity and QoS settings. The program orders the host 500 to connect to the provisioned host volume 131. In step 303-7-7, the program generates the QoS setting (using tier setting) based on the input from the Storage Pool Volume Manager 305-3 and current configuration of the selected frontend storage subsystem 100. In step 303-7-8, the program orders the frontend storage subsystem 100 to change capacity and QoS settings of the host volume 131. If the connecting host 500 is changed, the program orders the current host 500 to disconnect from the volume and orders the selected host to connect to the volume. The program ends at step 303-7-9.

FIG. 18 is an example of a flow diagram illustrating the process of Integrated Storage Pool Rebalancing Control Program 303-8. This program runs periodically. The program starts at step 303-8-1. In step 303-8-2, the program refers to the Integrated Storage Tier Management Table 303-1 and Storage Subsystem Management Table 303-2 to obtain the current configuration and usage of the integrated storage pool 600. In step 303-8-3, the program checks for unacceptable-unbalanced usage of tier in the integrated storage pool 600. If it is balanced, the program ends at step 303-8-11. Otherwise, in step 303-8-4, the program generates the following rebalancing ways to resolve the unbalance.

Figure 39:
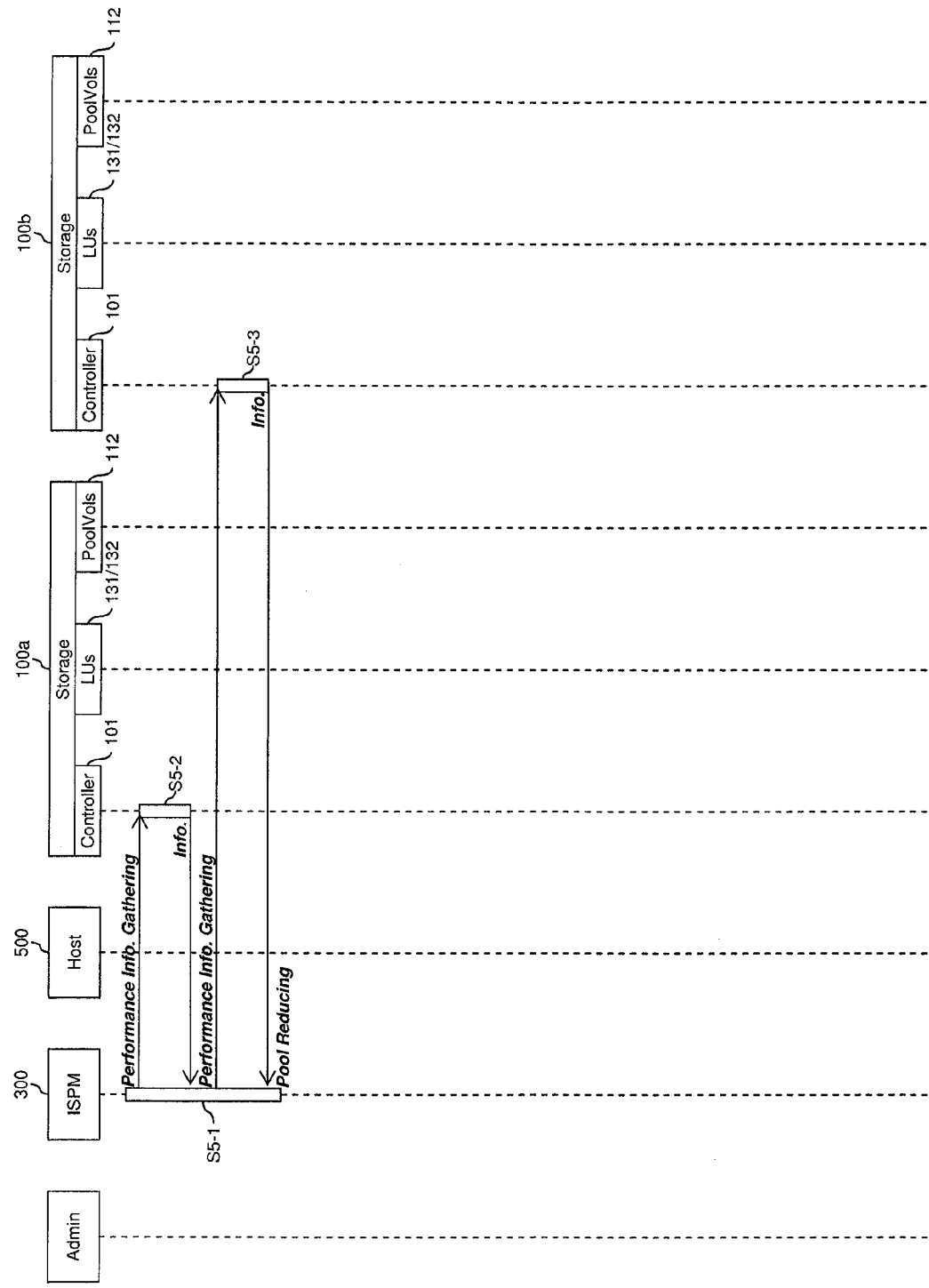
FIG. 39 shows an example of the sequence of resource information gathering from each frontend storage subsystem.

One approach is the assignation of a backend external volume between two frontend storage subsystems (see FIG. 39). Another is volume migration between two frontend storage subsystems (see FIG. 46). Yet another approach involves capacity lending by cross mount volume between two frontend storage subsystems. (see FIG. 43). In step 303-8-5, the program selects the best way out of those in Step 303-8-4. The selection is decided based on effect, system workload, and changing time. The parameters are generated from the System Information Table 303-3, Integrated Storage Tier Management Table 303-1, and Storage Subsystem Management Table 303-2. In step 303-8-6 (first selection), the program orders a resource-sufficient frontend storage subsystem 100 to unmount an external volume of a backend storage subsystem 200. By this unmount operation, the Page Control Program 103-8 will run in the resource-absent frontend storage subsystem 100 to evacuate allocated capacity pages 131-2 to other RAID groups. In step 303-8-7, the program orders to a resource-absent frontend storage subsystem 100 to mount the unmounted volume as an external volume and to install the mounted volume to a suitable tier. In step 303-8-8 (second selection), the program orders a resource-absent frontend storage subsystem 100 to migrate a host volume 131 to a resource-sufficient frontend storage subsystem 100. By this migration operation, the Volume Migration Control Program 103-9 will run in the resource-absent frontend storage subsystem 100 and resource-sufficient frontend storage subsystem 100. In step 303-8-9 (third selection), the program orders a resource-sufficient frontend storage subsystem 100 to provision a cross mount volume 132 to provide a capacity to a resource-absent frontend storage subsystem 100. In step 303-8-10, the program orders a resource-sufficient frontend storage subsystem 100 to mount the cross mount volume 132 which the resource-sufficient frontend storage subsystem 100 has provisioned. The program ends at step 303-8-11.

Figure 19:
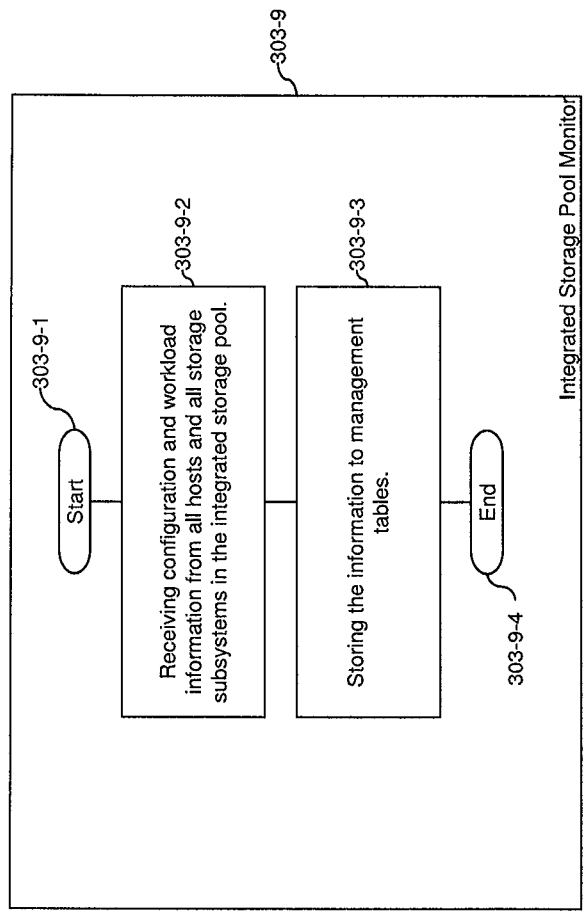
FIG. 19 is an example of a flow diagram illustrating the process of the Integrated Storage Pool Monitor Program.

FIG. 19 is an example of a flow diagram illustrating the process of the Integrated Storage Pool Monitor Program 303-8. This program runs periodically. The program starts at step 303-9-1. In step 303-9-2, the program receives the configuration and workload information from the frontend storage subsystems 100 and backend storage subsystems 200. In step 303-9-3, the program stores the received information to the System Information Table 303-3, Integrated Storage Tier Management Table 303-1, and Storage Subsystem Management Table 303-2. The program ends at step 303-9-4.

B8. Display Image of Integrated Storage Pool Management Server

FIG. 20 shows an example of the Integrated Storage Pool Element Manager 305-1 as an input/output (I/O) interface for a user. Using this I/O interface, the user can input a new storage subsystem to be added to the integrated storage pool 600, can input an existing storage subsystem to be removed from the integrated storage pool 600, and can check the current resource information and resource information after modification of the integrated storage pool 600. The I/O interface includes the following features. A Pool Tier Resource Information Panel 305-1-1 shows a user the current resource amount of each tier. When the user sets addition and/or removal of a storage subsystem to/from the integrated storage pool 600, the panel shows the resource information after the modification. A Pool Status Information Panel 305-1-2 shows the current status of the integrated storage pool 600. A Pool Configuration Information Panel 305-1-3 shows a user a list of storage subsystems in the integrated storage pool 600. A user can select storage subsystems from this list to remove from the integrated storage pool 600. A Storage Subsystem Information Panel 305-1-4 shows a user a list of storage subsystems which is not in the integrated storage pool 600 but can be added to it. A user can select storage subsystems from this list to add to the integrated storage pool 600. Using an Add Button 305-1-4, a user can set addition of storage subsystems to the integrated storage pool 600 by pushing this button after the selection of storage subsystems from the Storage Subsystem Information Panel 305-1-4. Using a Remove Button 305-1-5, a user can set removal of storage subsystems from the integrated storage pool 600 by pushing this button after the selection of storage subsystems from Pool Configuration Information Panel 305-1-3. Using an Apply Button 305-1-7, a user can send orders of the Integrated Storage Pool Expansion Control Program 303-4 to add storage subsystems to the integrated storage pool 600 by pushing this button; additionally or alternatively, a user can send orders of the Integrated Storage Pool Reduction Control Program 303-5 to add storage subsystems to the integrated storage pool 600 by pushing this button. A user gets back the configuration to current state by pushing a Cancel Button 305-1-8.

FIG. 21 shows an example of the Integrated Storage Pool Tier Manager 305-2 as an I/O interface for a user. The user can input tier configuration of the integrated storage pool 600 and can check the current resource information and resource information after modification of the integrated storage pool 600 with this interface. The interface includes the following features. A Pool Tier Resource Information Panel 305-2-1 shows a user the current resource amount of each tier. When the user sets tier configuration change to the integrated storage pool 600, this panel shows the resource information after the modification. A Pool Status Information Panel 305-1-2 shows the current status of the integrated storage pool 600. A Tier Configuration Information Panel 305-2-3 shows the user a list of tiers in the integrated storage pool 600. The user can change the tier configuration of the integrated storage pool 600. The user can send orders of the Integrated Storage Pool Tier Configuration Control Program 303-6 to change the tier configuration of the integrated storage pool 600 by pushing an Apply Button 305-2-7. The user can get back the configuration to current status by pushing a Cancel Button 305-2-8.

FIG. 22 shows an example of the Integrated Storage Pool Volume Manager 305-3 as an I/O interface for a user. The user can input volume configuration of the integrated storage pool 600 and can check the current resource information of the integrated storage pool 600 with this interface. The interface includes the following features. A Pool Tier Resource Information Panel 305-3-1 shows the user the current resource amount of each tier. A Pool Status Information Panel 305-3-2 shows the current status of the integrated storage pool 600. A Volume Configuration Information Panel 305-3-3 shows the user a list of volumes in the integrated storage pool 600. the user can change the volume configuration of the integrated storage pool 600. The user can send orders of the Integrated Storage Pool Volume Control Program 303-6 to change the volume configuration of the integrated storage pool 600 by pushing an Apply Button 305-3-7n. The user can get back the configuration to current status by pushing a Cancel Button 305-3-8.

Figure 23:
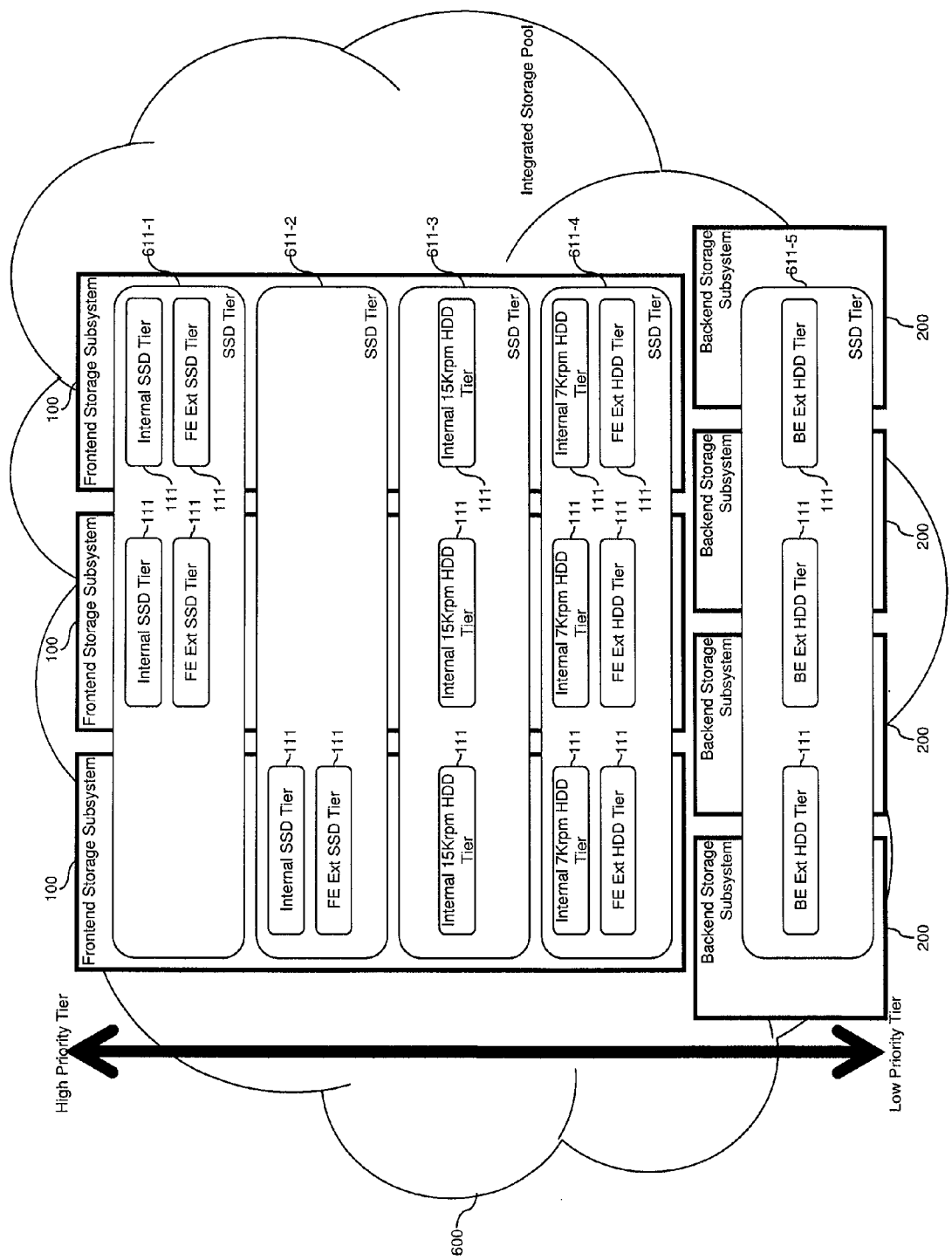
FIG. 23 illustrates the relation between tiers in the thin provisioning pools and a tier in the integrated storage pool.

B9. Relation Between Thin Provisioning Pool Tier and Integrated Storage Pool Tier FIG. 23 illustrates the relation between tiers in the thin provisioning pools 110 and a tier in the integrated storage pool 600. The integrated storage pool 600 has tiers 611, which are categorized by the media type, RAID levels, cost, and so on. They are categorized to Tier 611-1, Tier 611-2, Tier 611-3, Tier 611-4, Tier 611-5, and so on. The categorization is based on the setting in the Integrated Storage Pool Tier Management Table 303-1. Each tier 611 in the integrated storage pool 600 has the tiers 111 of each thin provisioning pool 110 of the frontend storage subsystem 100. Each tier 611 has priority settings which are from the Integrated Storage Pool Tier Management Table 303-1.

C. Operational Procedure of the System

C1. Integrated Storage Pool Expansion

Figure 24:
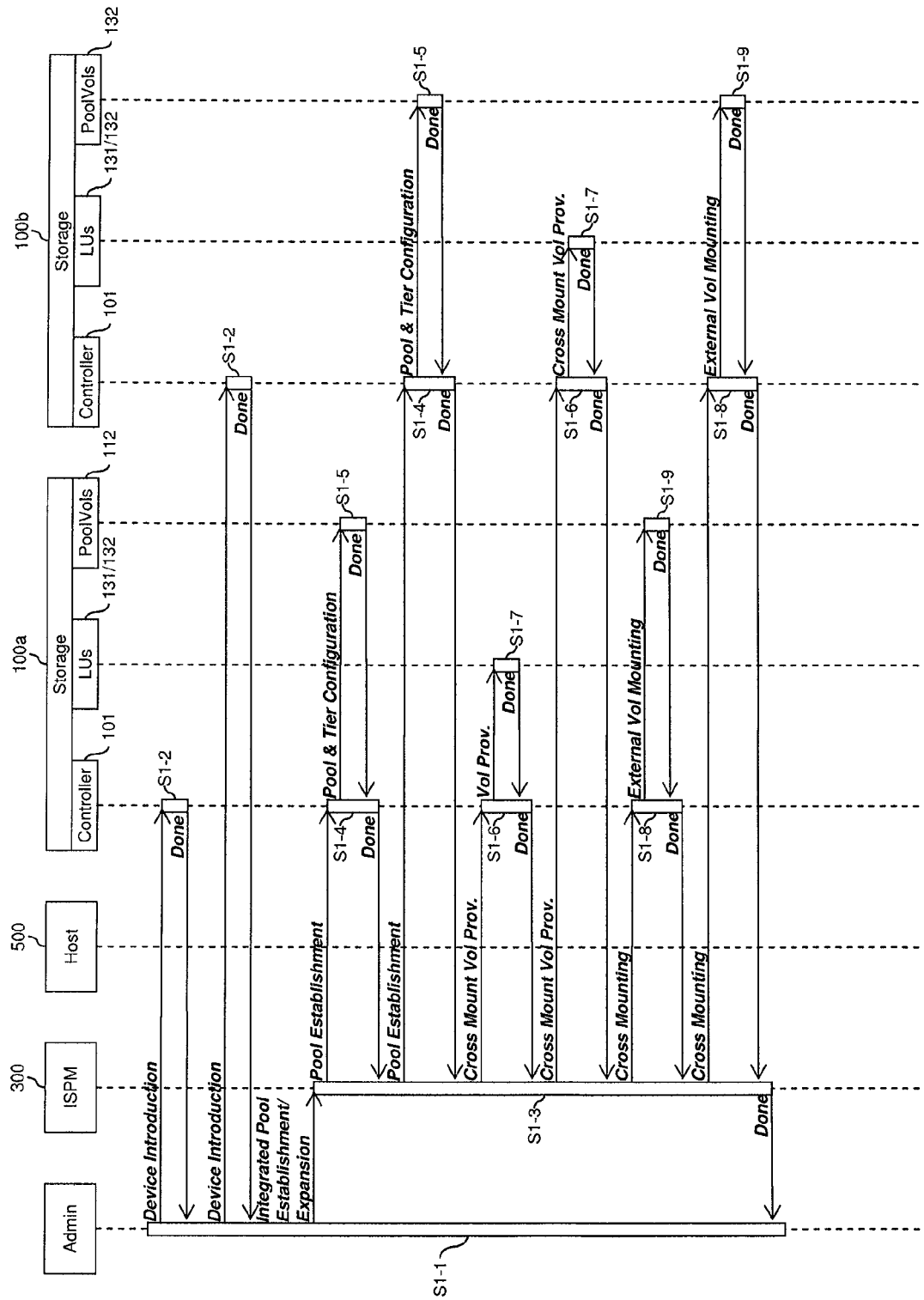
FIG. 24 shows an example of the sequence of installation of storage subsystems and expansion of the integrated storage pool.

FIG. 24 shows an example of the sequence of installation of storage subsystems and expansion of the integrated storage pool 600. The sequence has the following procedures. In procedure S1-1, the user introduces new frontend storage subsystems 100a and 100b and sets up RAID group configuration and network configuration of the frontend storage subsystems 100a and 100b. By this procedure, the frontend storage subsystems 100a and 100b change the configuration in S1-2. The user orders the integrated storage pool 600 to expand with the frontend storage subsystems 100a and 100b. By this procedure, the integrated storage pool 600 changes the configuration in S1-3. In procedure S1-2, the frontend storage subsystem 100 establishes RAID groups 112 and gets network information and login to the network. In procedure S1-3, first, the integrated storage pool management server 300 orders the frontend storage subsystems 100a and 100b, proceeding to S1-4, to mount external volumes of the backend storage subsystems 100, to establish the tiered thin provisioning pool 110, and to establish tiers in the tiered thin provisioning pool 110 and proceed to S-14. Next, the integrated storage pool management server 300 orders the frontend storage subsystems (proceeding to S1-6) to provision cross mount volumes 132 from the tiered thin provisioning pool 110 with QoS setting. Next, the integrated storage pool management server 300 orders the frontend storage subsystems (proceeding to S1-6) to mount the provisioned cross mount volume 132 of another frontend storage subsystem 100 and proceed to S1-8.

In procedure S1-4, the frontend storage subsystem 100 establishes a tiered thin provisioning pool 110. The frontend storage subsystem 100 mounts designated external volumes of the backend storage subsystems 200 and installs the external volumes to the tiered thin provisioning pool 110. The frontend storage subsystem 100 sets the designated configuration of tiers 111. In procedure S1-5, the RAID groups 112 in the tiered thin provisioning pool 110 are categorized to the tiers 111. In procedure S1-6, the frontend storage subsystem 100 makes cross mount volumes 132 with the designated QoS setting. In procedure S1-7, the cross mount volumes 132 are provisioned. In procedure S1-8, the frontend storage subsystem 100 mounts the designated cross mount volumes 132 of some other frontend storage subsystem 100. In procedure S1-9, external volumes of the cross mount volume 132 are mounted as RAID groups.

Figure 25:
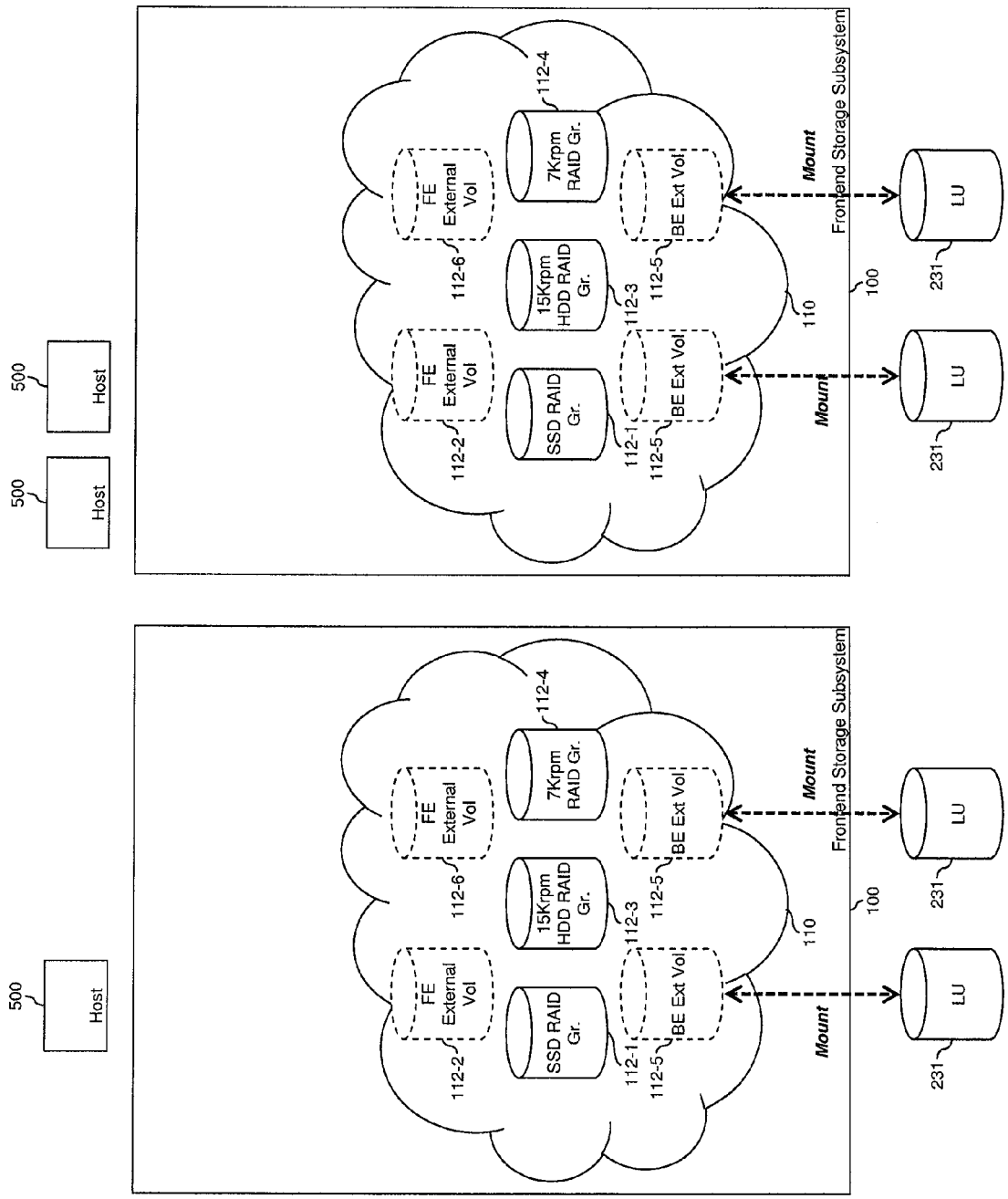
FIG. 25 shows the state of the system after procedure S1-5 in FIG. 24.

FIG. 25 shows the state of the system after procedure S1-5. The external volumes 231 of the backend storage subsystem 200 are mounted by the frontend storage subsystems 100. Each frontend storage subsystem 100 has a tiered thin provisioning pool 110 with internal RAID groups 112 and mounted external volumes 231.

Figure 26:
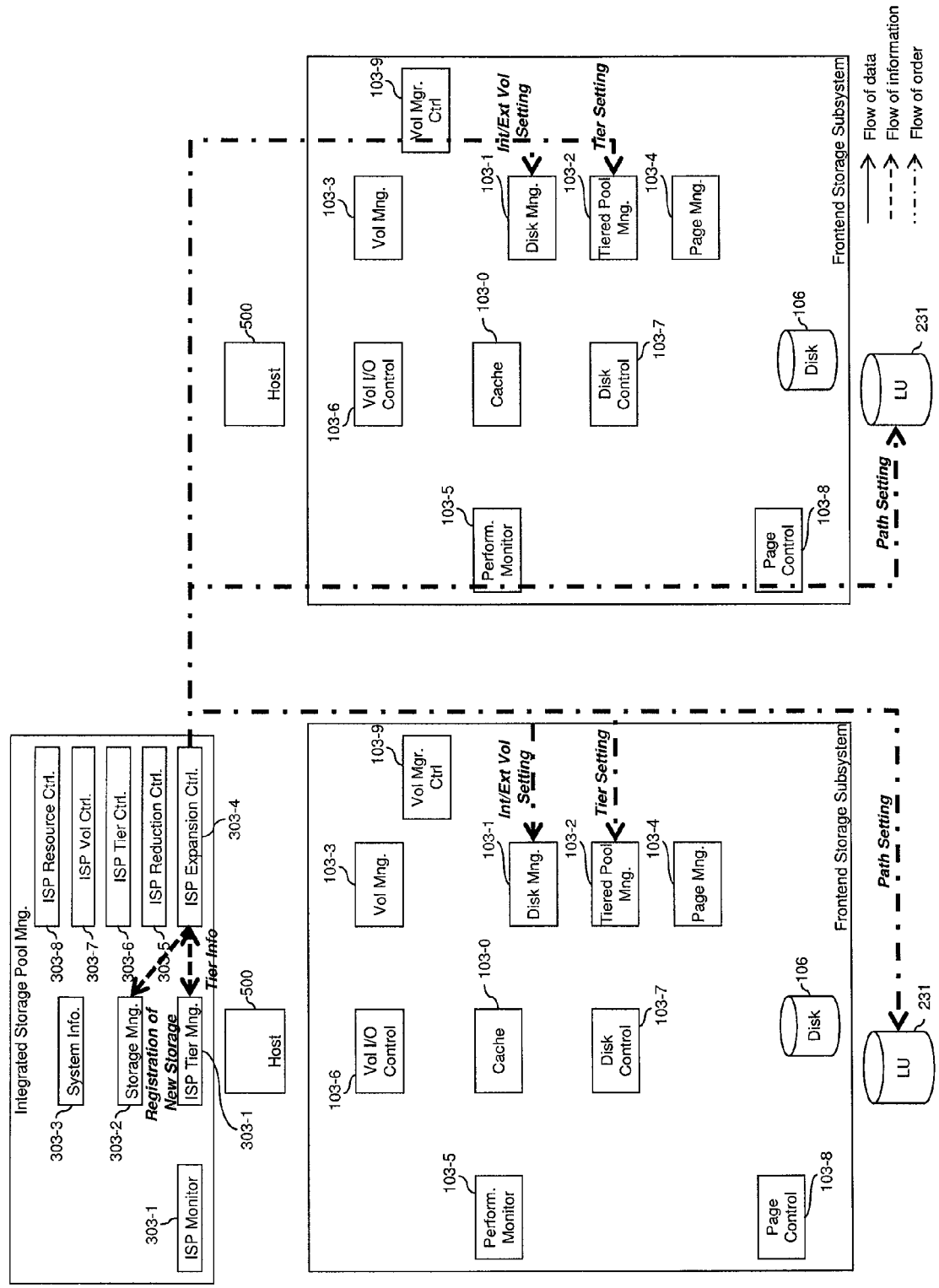
FIG. 26 illustrates the flow of data, information, and order to achieve the status in FIG. 25.

FIG. 26 illustrates the flow of data, information, and order to achieve the status in FIG. 25. The Integrated Storage Pool Expansion Control Program 303-4 obtains the current configuration of the integrated storage pool 600 from the Storage Subsystem Management Table 303-2 and Integrated Storage Pool Tier Management table 303-1. The Integrated Storage Pool Expansion Control Program 303-4 generates the new configuration of the integrated storage pool 600 and stores the new configuration to each table. The Integrated Storage Pool Expansion Control Program 303-4 orders the Tiered Pool Management Tables 103-2 to set the information of the tiered thin provisioning pool 110 as the generated new setting. The Integrated Storage Pool Expansion Control Program 303-4 orders the Disk Management Table 103-1 to set the mounted external volume as the generated new setting. The Integrated Storage Pool Expansion Control Program 303-4 orders the volume 231 of the backend storage subsystem 200 to allow the I/O from the mounting frontend storage subsystem 100.

Figure 27:
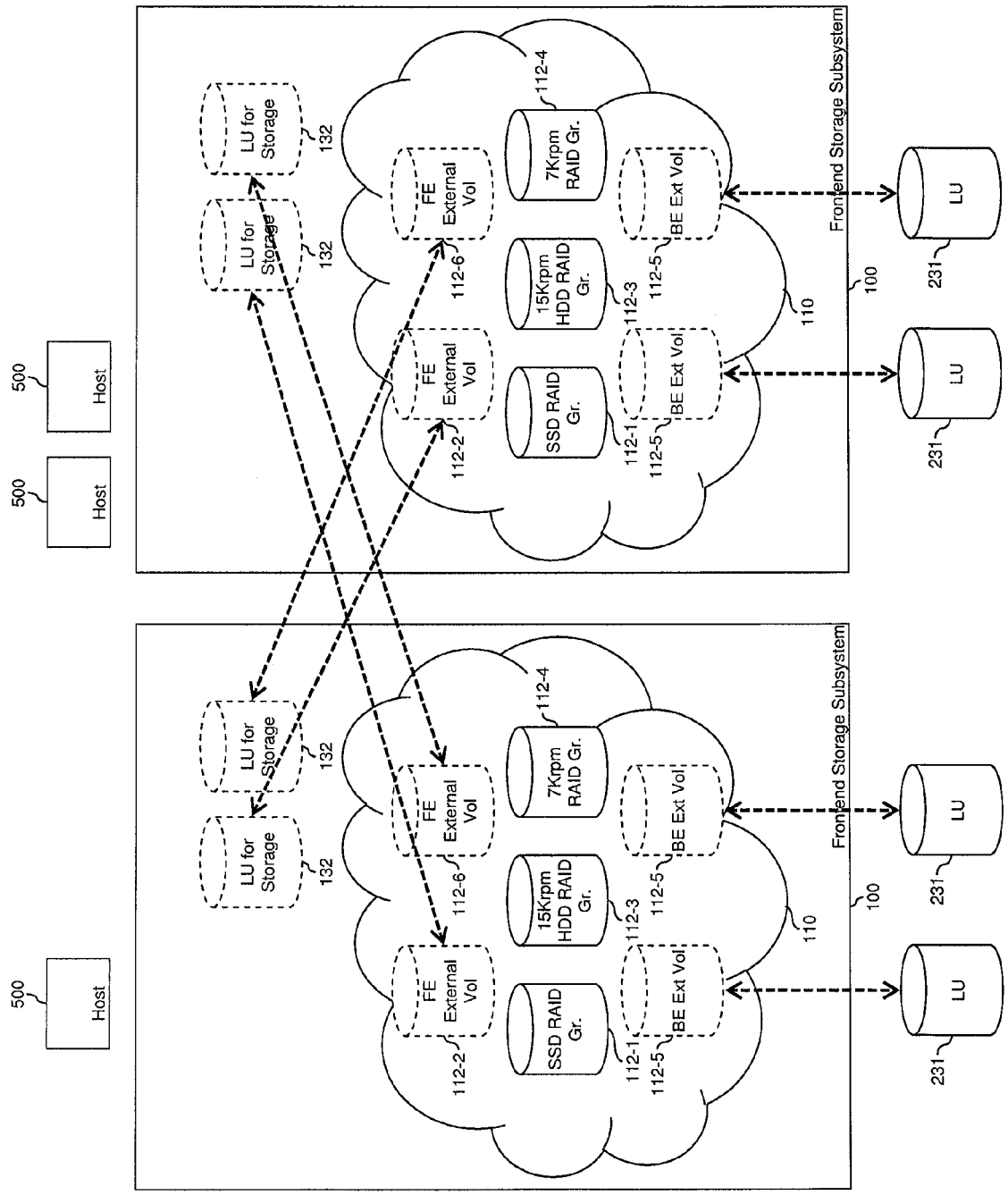
FIG. 27 shows the state of the system after procedure S1-9 in FIG. 24.

FIG. 27 shows the state of the system after procedure S1-9. The cross mount volumes 132 of the frontend storage subsystem 100 are provisioned from the tiered thin provisioning pool 110. The cross mount volumes 132 of the frontend storage subsystem 100 are mounted by other frontend storage subsystems 100.

Figure 28:
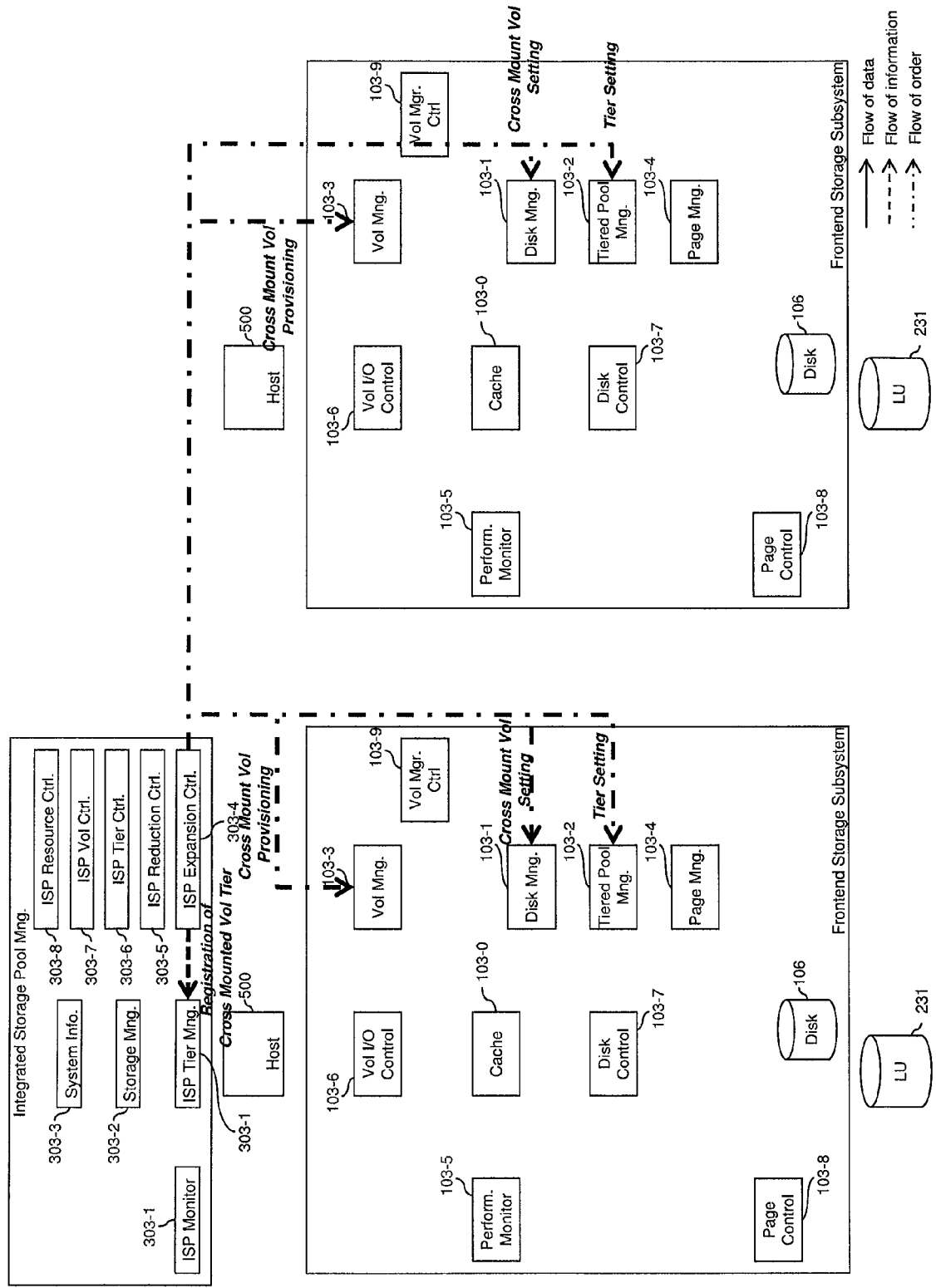
FIG. 28 shows the flow of data, information, and order to achieve the status in FIG. 27.

FIG. 28 shows the flow of data, information, and order to achieve the status in FIG. 27. The Integrated Storage Pool Expansion Control Program 303-4 obtains the current configuration of Integrated Storage Pool 600 from the Storage Subsystem Management Table 303-2 and Integrated Storage Pool Tier Management Table 303-1. The Integrated Storage Pool Expansion Control Program 303-4 generates the new configuration of the integrated storage pool 600 and stores the new configuration to the Integrated Storage Pool Tier Management Table 303-1. The Integrated Storage Pool Expansion Control Program 303-4 orders the Volume Management Tables 103-3 to set the provisioned cross mount volumes 132. The Integrated Storage Pool Expansion Control Program 303-4 orders the Disk Management Tables 103-1 to set the mounted cross mount volumes 132 of the other frontend storage subsystem 100. The Integrated Storage Pool Expansion Control Program 303-4 orders the Tiered Pool Management Table 103-2 to set the tier of the mounted cross mount volumes 132.

C2. Integrated Storage Pool Volume Provisioning

Figure 29:
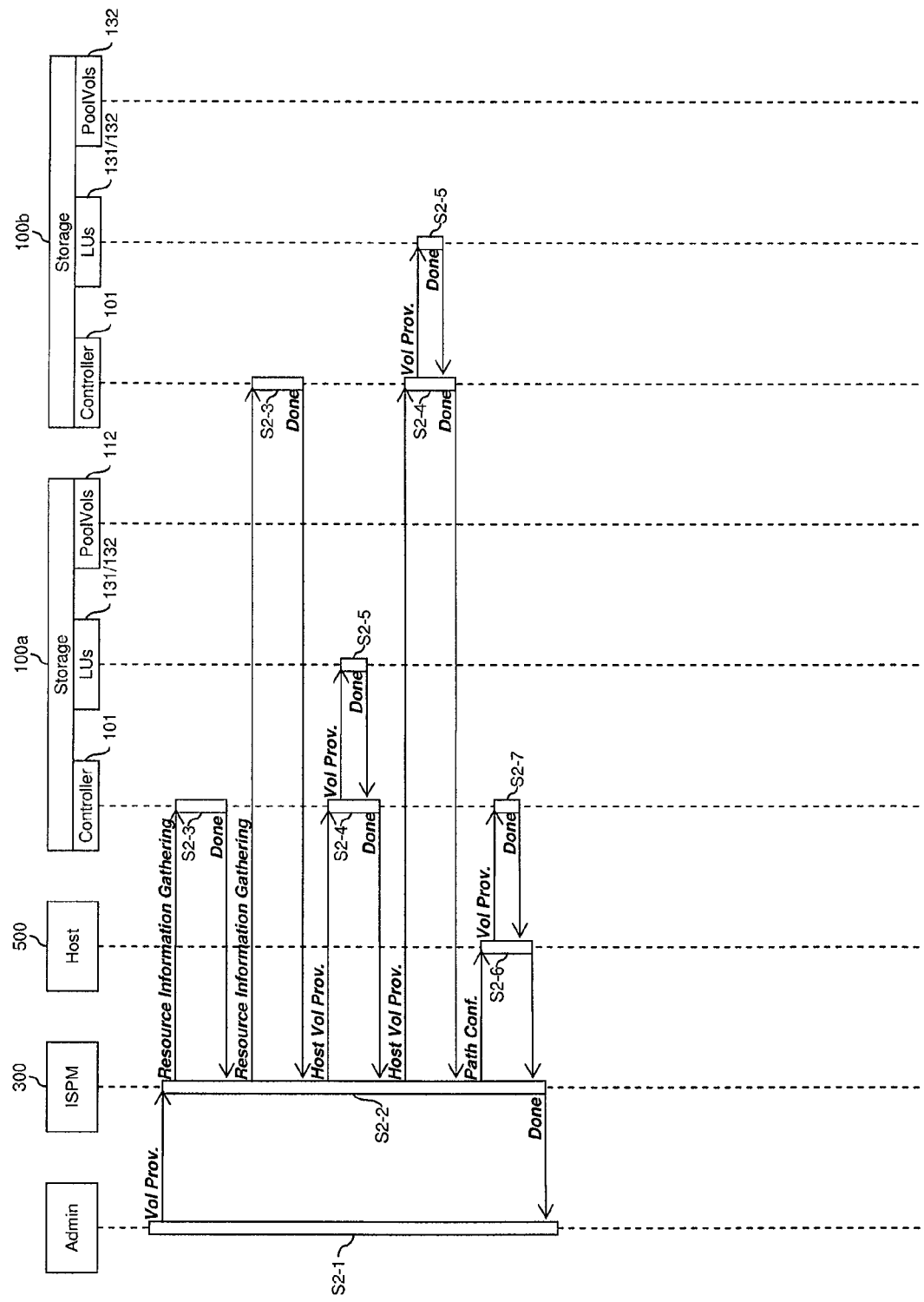
FIG. 29 shows an example of the sequence of volume provisioning from the integrated storage pool.

FIG. 29 shows an example of the sequence of volume provisioning from the integrated storage pool 600. The sequence includes the following procedures. In procedure S2-1, the user inputs volume configuration to the integrated storage pool management server 300, including, for example, capacity, QoS (Tier 611 selection), and connected host configuration. In procedure S2-2, the integrated storage pool management server 300 selects the setting of network zone, suitable storage subsystem, and suitable tier (Tier 111) from the current resource status of each frontend storage subsystem 100. The integrated storage pool management server 300 orders the frontend storage subsystems 100a and 100b to provision host volumes 131 with configuration of the aforesaid generated configuration. The integrated storage pool management server 300 orders the host 500 to mount the provisioned host volumes 131. In procedure S2-3, the frontend storage subsystem 100 transfers the configuration information of the tiered thin provisioning pool 110. In procedure S2-4, the frontend storage subsystem 100 establishes the host volumes 131 with the designated configuration. In procedure S2-5, the host volumes 131 are provisioned. In procedure S2-6, the host 500 establishes a volume connection with the designated host volume 131.

Figure 30:
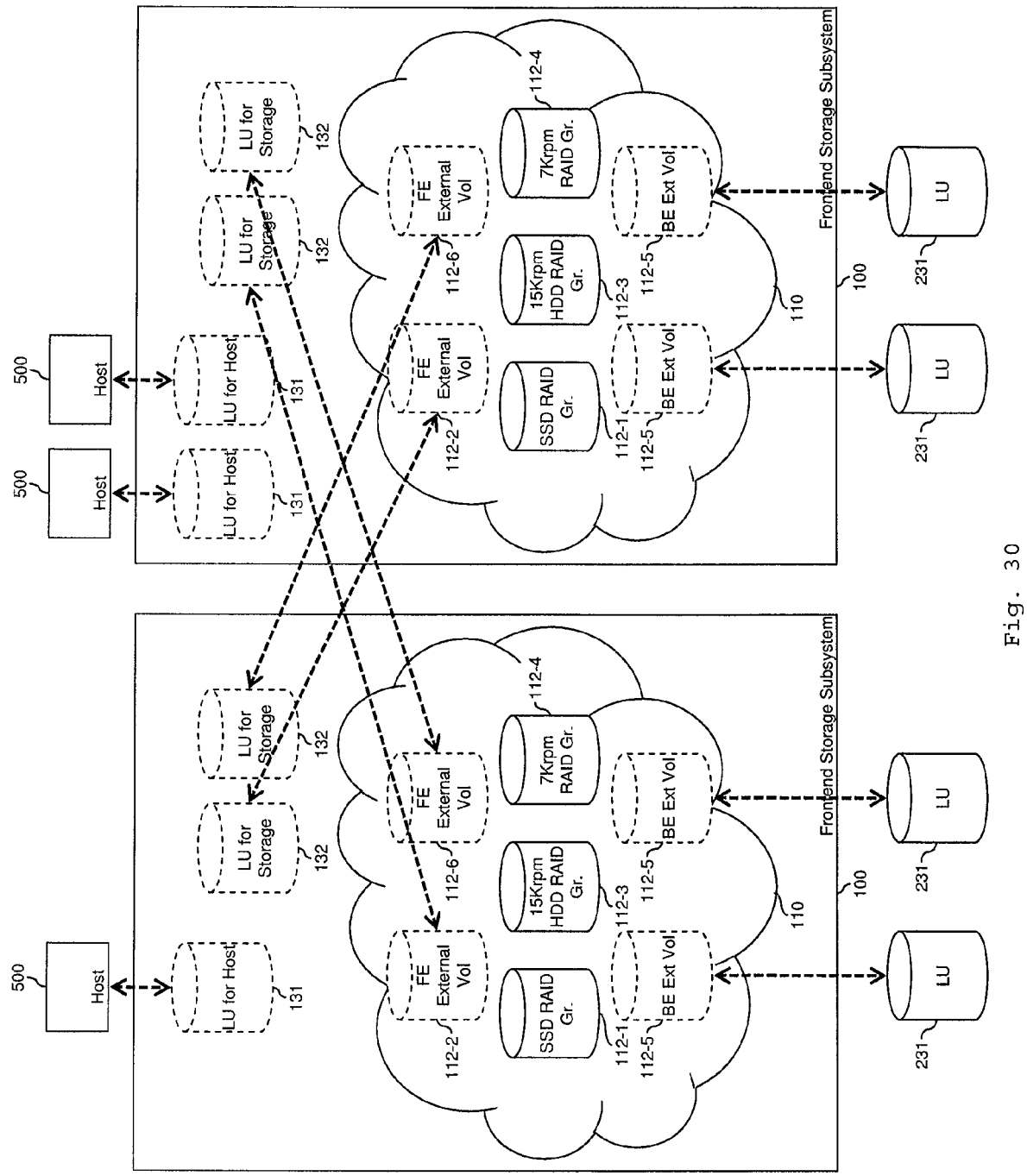
FIG. 30 shows the state of the system after the sequence in FIG. 29.

FIG. 30 shows the state of the system after the sequence in FIG. 29. The host volumes 131 of the frontend storage subsystem 100 are provisioned from the tiered thin provisioning pool 110. The host volumes 131 of the frontend storage subsystem 100 are connected from the host 500.

Figure 31:
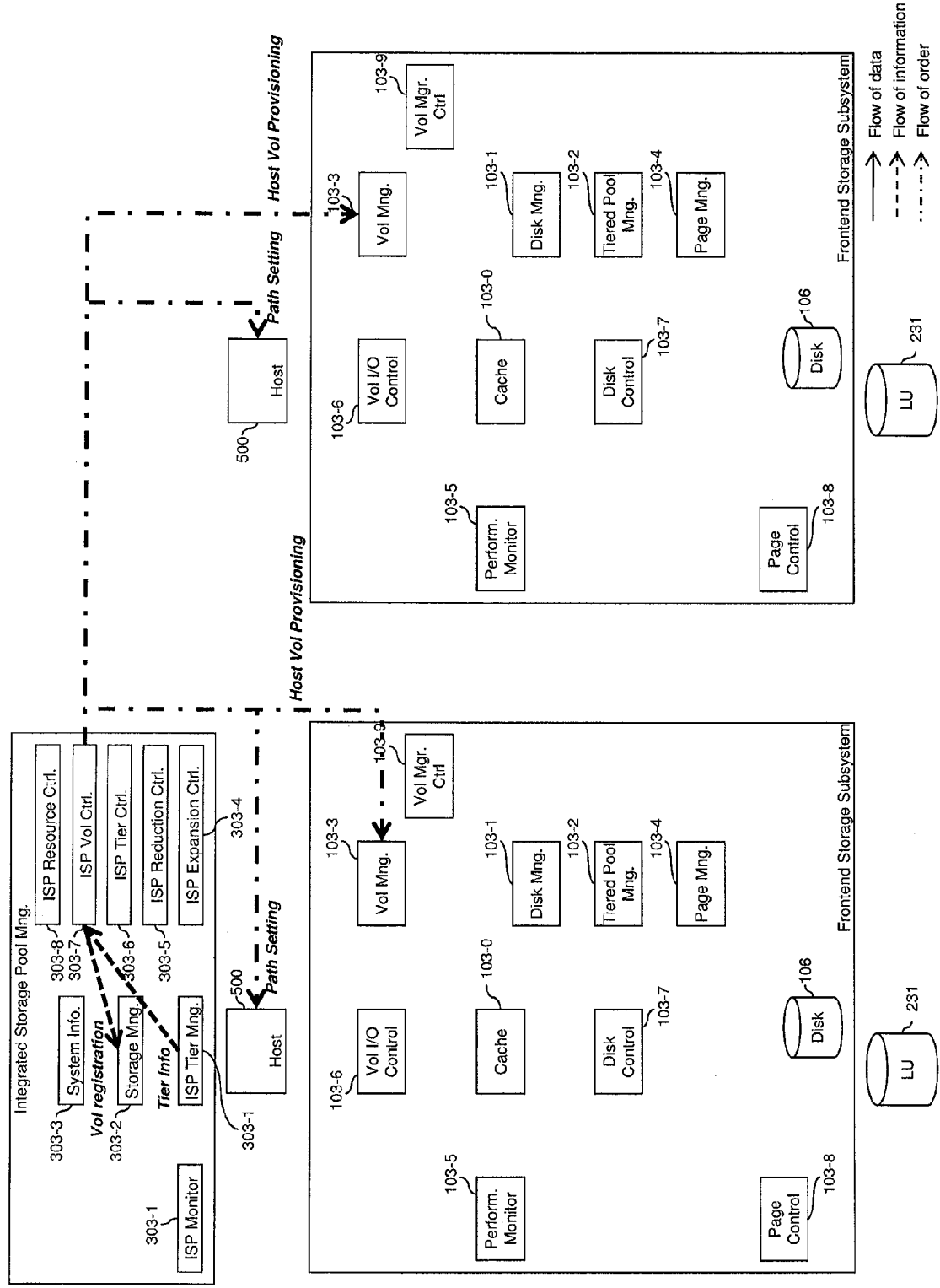
FIG. 31 shows the flow of data, information, and order to achieve the status in FIG. 30.

FIG. 31 shows the flow of data, information, and order to achieve the status in FIG. 30. The Integrated Storage Pool Volume Control Program 303-7 obtains the resource configuration from the Storage Subsystem Management Table 303-2 and Integrated Storage Pool Tier Management 303-1. The Integrated Storage Pool Volume Control Program 303-7 stores the information of the provisioned host volume 131 to the Storage Subsystem Management Table 303-2. The Integrated Storage Pool Volume Control Program 303-7 orders the Volume Management Tables 103-3 to set the provisioned host volume 131. The Integrated Storage Pool Expansion Control Program 303-4 orders the Path Management Module 501 to set the connection to the host volumes 131.

C3. Host I/O

Figure 32:
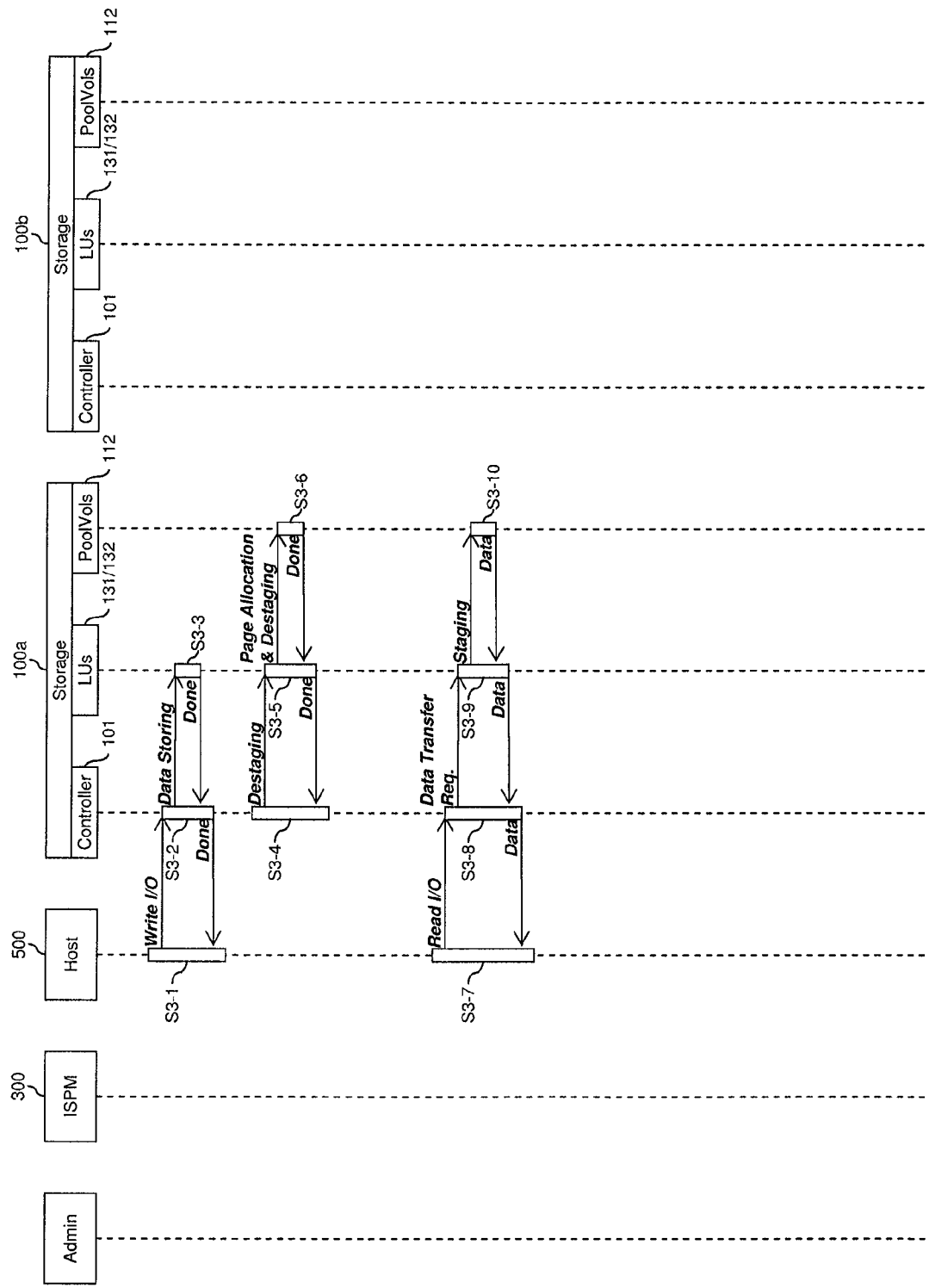
FIG. 32 shows an example of the sequence of I/Os from the host to the host volume.

FIG. 32 shows an example of the sequence of I/Os from the host 500 to the host volume 131. The sequence includes the following procedures. In procedure S3-1, the host 500 sends write I/O to the host volume 131 of the frontend storage subsystem 100. In procedure S3-2, the frontend storage subsystem 100 receives the data. In procedure S3-3, the host volume 131 stores the received data to the cache area. In procedure S3-4, periodically, the frontend storage subsystem 100 checks the cache status, and if it finds the un-destaged data, the frontend storage subsystem 100 stores the data to disks. If the frontend storage subsystem 100 has not allocated a capacity page for the data yet, it allocates a new capacity page. In procedure S3-5, the host volume 131 destages the data with capacity page allocation, if it is needed. In procedure S3-6, the RAID group 112 stores the write data to disks. In procedure S3-7, the host 500 sends read I/O to the host volume 131 of the frontend storage subsystem 100. In procedure S3-8, the frontend storage subsystem 100 sends the data. In procedure S3-9, the host volume 131 stages the read data from the disks to the cache area. In procedure S3-10, the RAID group 112 transfers the data from the disks to the cache area.

Figure 33:
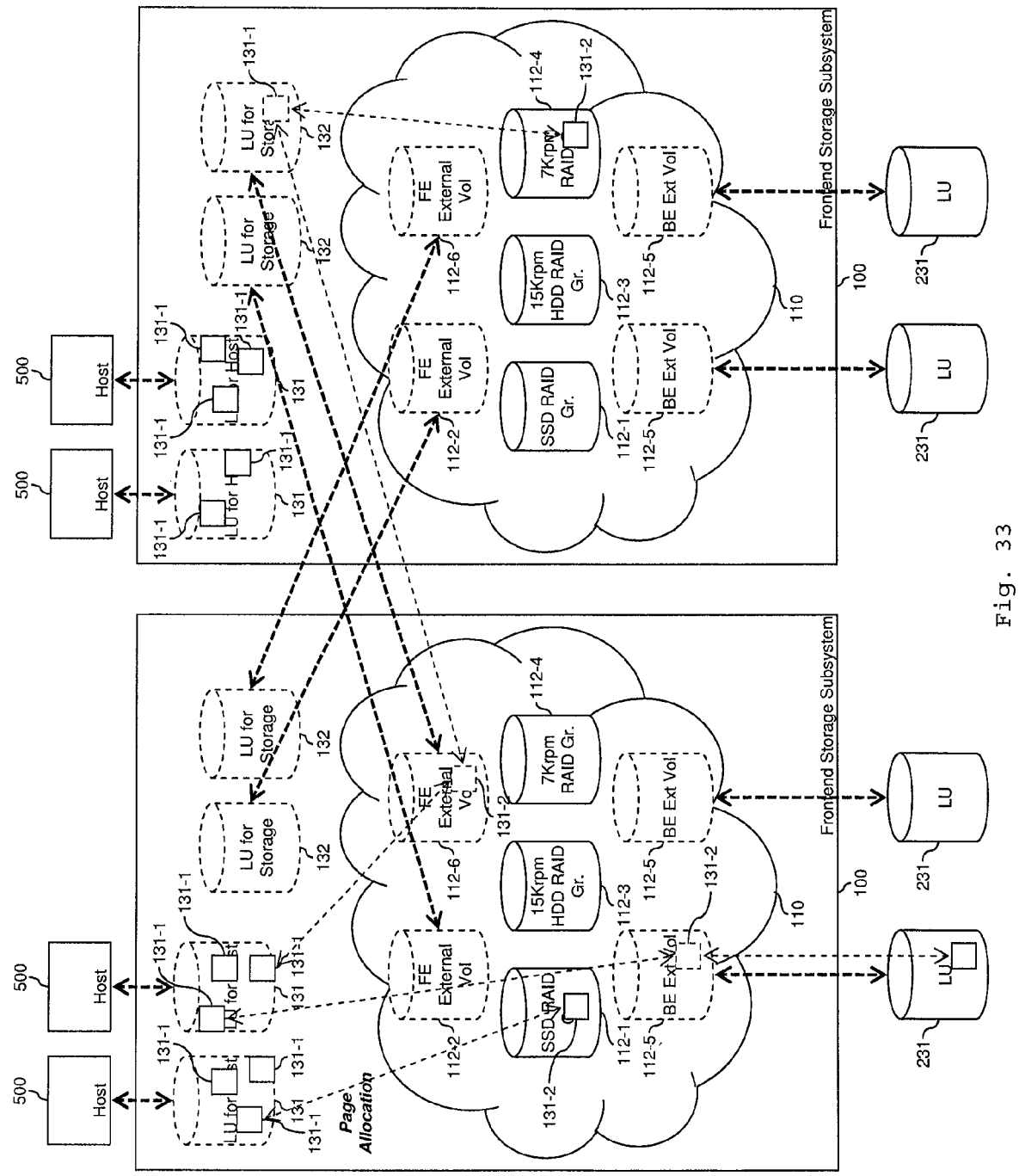
FIG. 33 shows the state of the system after the write I/O in FIG. 32.

FIG. 33 shows the state of the system after the write I/O in FIG. 32. The volume page 131-1 on the host volume 131 is allocated a capacity page 131-2. The entity of the capacity page 131-2 is in the internal RAID group 112-4, external volume 231, or internal RAID group 112-4 of another frontend storage subsystem 100.

Figure 34:
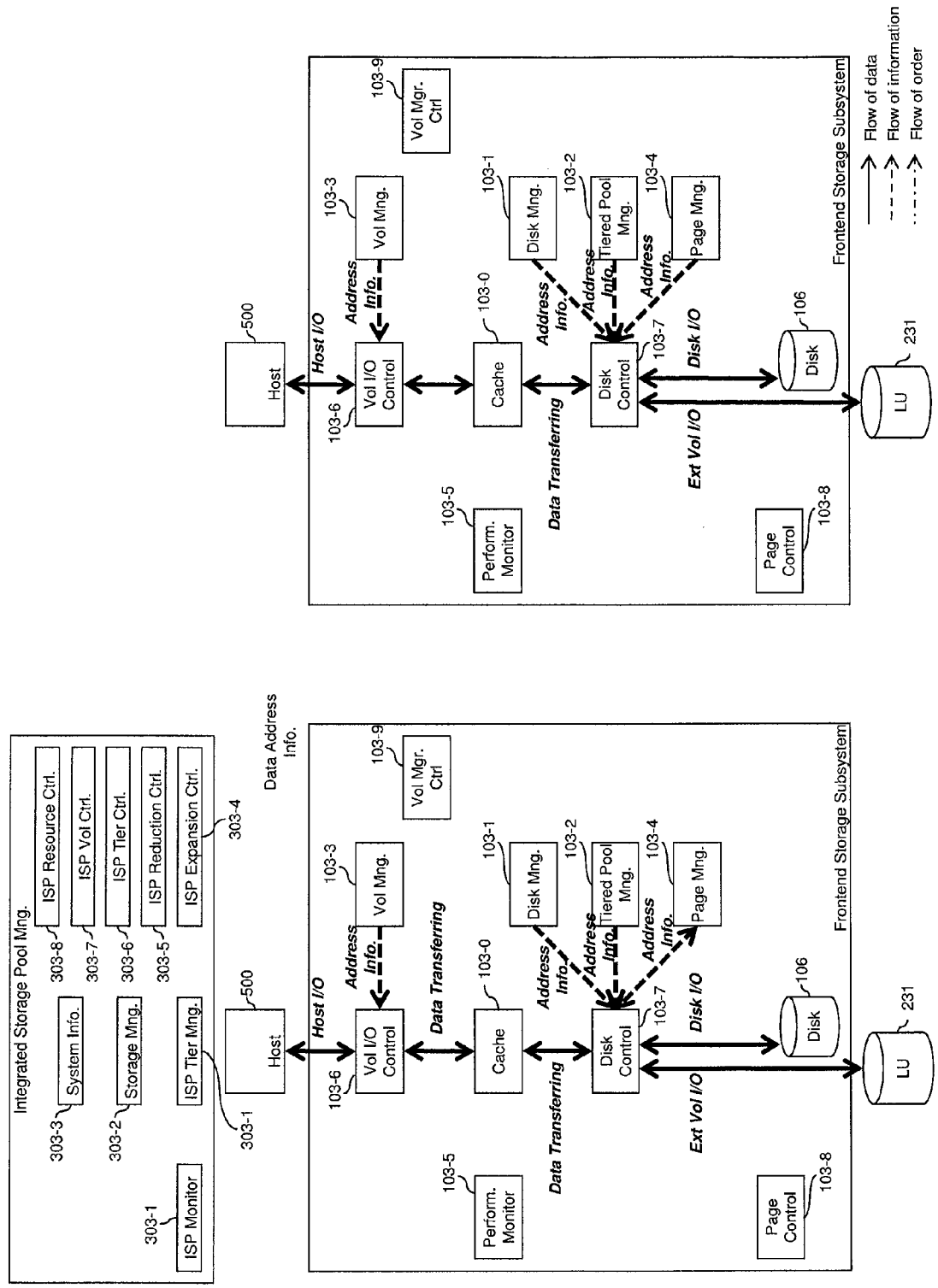
FIG. 34 shows the flow of data, information, and order to achieve the status in FIG. 33.

FIG. 34 shows the flow of data, information, and order to achieve the status in FIG. 33. The host 500 sends I/O request and data to the Volume I/O Control Program 103-6. The Volume I/O Control Program 103-6 refers to Volume Management Table 103-3 to obtain the volume configuration. The Volume I/O Control Program 103-6 stores the data into the cache area 103-0. The Disk Control Program 103-7 checks the status of the cache area 103-0 to find dirty data. The Disk Control Program 103-7 refers to the Page Management Table 103-4 to judge whether the area needs to allocate a capacity page. If it does, the Disk Control Program 103-7 refers to Tiered Pool Management Table 103-2 to find the tier from which a capacity page should be allocated. It further stores the relation information between a volume page and a capacity page into the Page Management Table 103-4. The Disk Control Program 103-7 finds disks and address information of the dirty data from the Page Management Table 103-4 and Disk Management Table 103-1, and transfers the data to the disks 106 or an external volume 231.

C4. Automated Tiered Storage Management in Frontend Storage Subsystem

Figure 35:
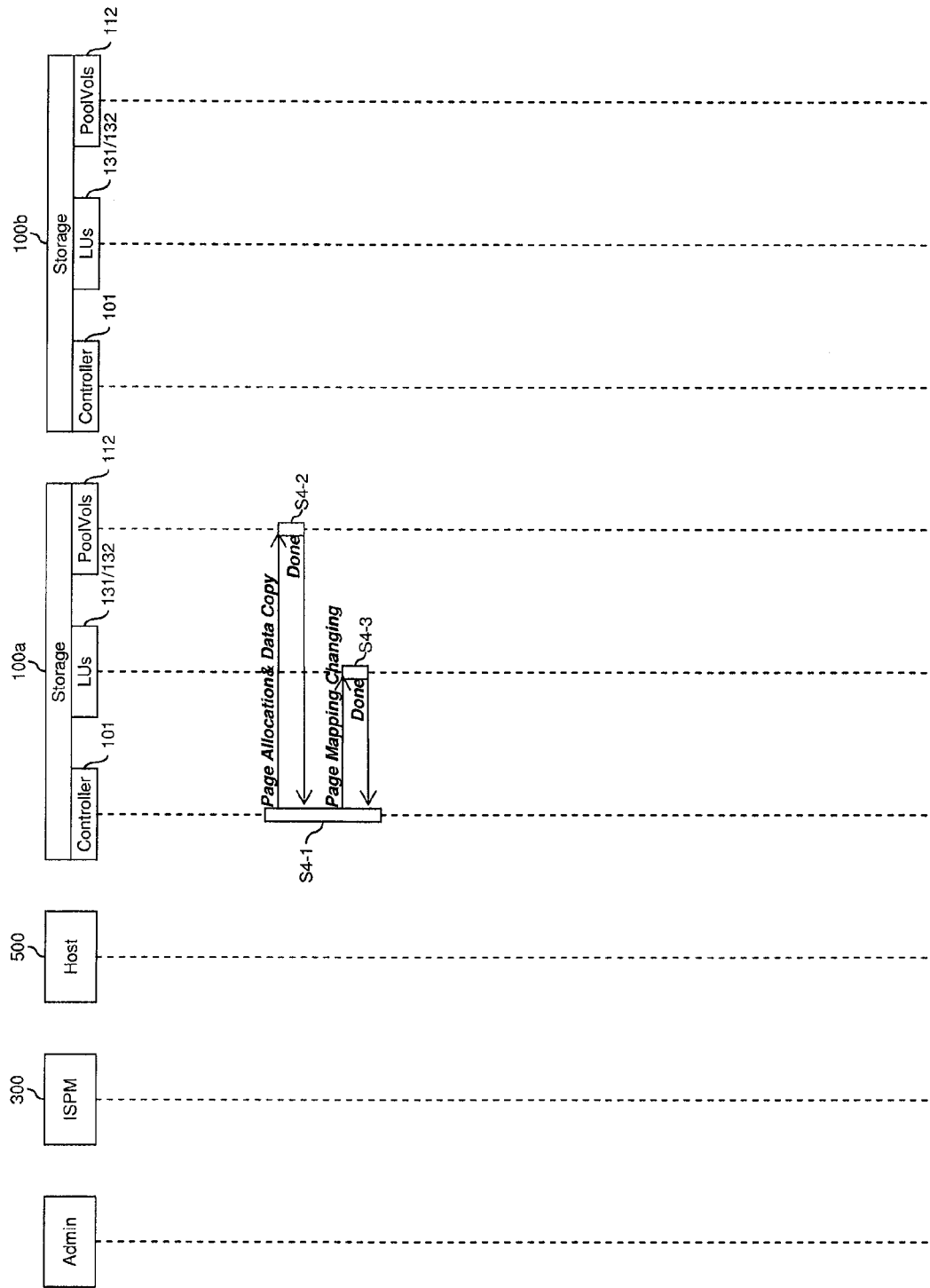
FIG. 35 shows an example of the sequence of tiered storage management.

FIG. 35 shows an example of the sequence of tiered storage management. In procedure S4-1, the frontend storage subsystem 100 checks periodically the tier configuration of each allocated volume page. It changes the allocated tier subsequent to I/O workload alternation and/or user requirement (i.e., changing of tier configuration). The method of reallocation involves selecting a new capacity page, copying data on capacity page from an existing capacity page to the newly allocated capacity page, and changing the mapping information on the Page Management Table 103-4 to the newly allocated capacity page. In procedure S4-2, the RAID group 112 copies the data. In procedure S4-3, the host Volume 132 changes the mapping information of the volume page.

Figure 36:
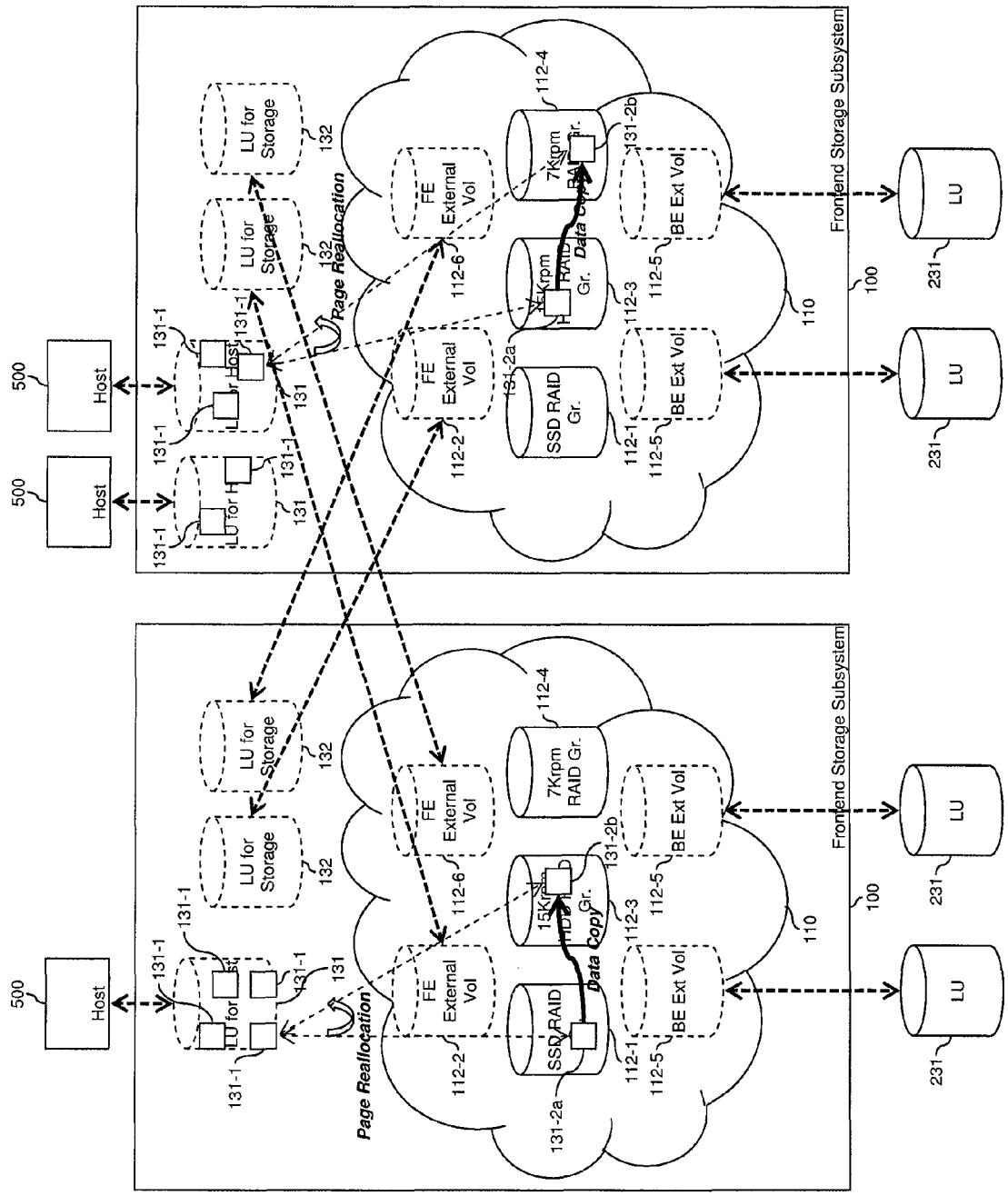
FIG. 36 shows the state of the system during page migration in FIG. 35.

FIG. 36 shows the state of the system during page migration. The data on the capacity page 131-2a is copied to another capacity page 131-2b. The volume page 131-1 changes the mapping from data on the capacity page 131-2a to data on the capacity page 131-2b.

Figure 37:
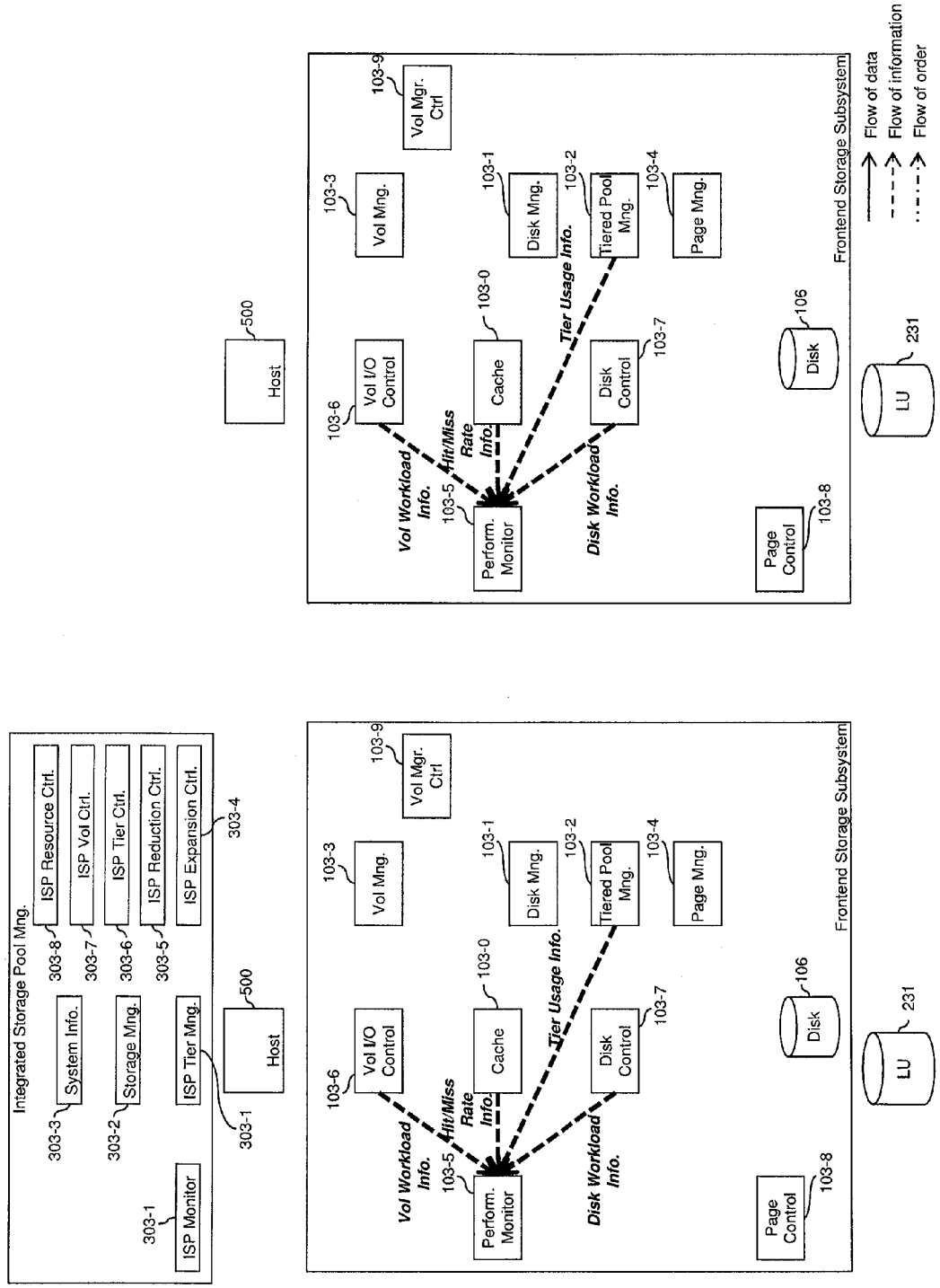
FIG. 37 shows the flow of data, information, and order to find necessity of tier alternation.

FIG. 37 shows the flow of data, information, and order to find necessity of tier alternation. The Performance Monitor Program 103-5 checks workload and performance information from the Volume I/O Control Program 103-6, cache area 103-0, Disk Control Program 103-7, and Tiered Pool Management Table 103-2. The Volume I/O Control Program 103-6 provides the I/O workload and I/O latency information and Read/Write rate. The cache area 103-0 provides cache hit rate information. The Disk Control Program 103-7 provides disk workload and disk latency information. The Tiered Pool Management Table 103-2 provides tier status and usage information.

Figure 38:
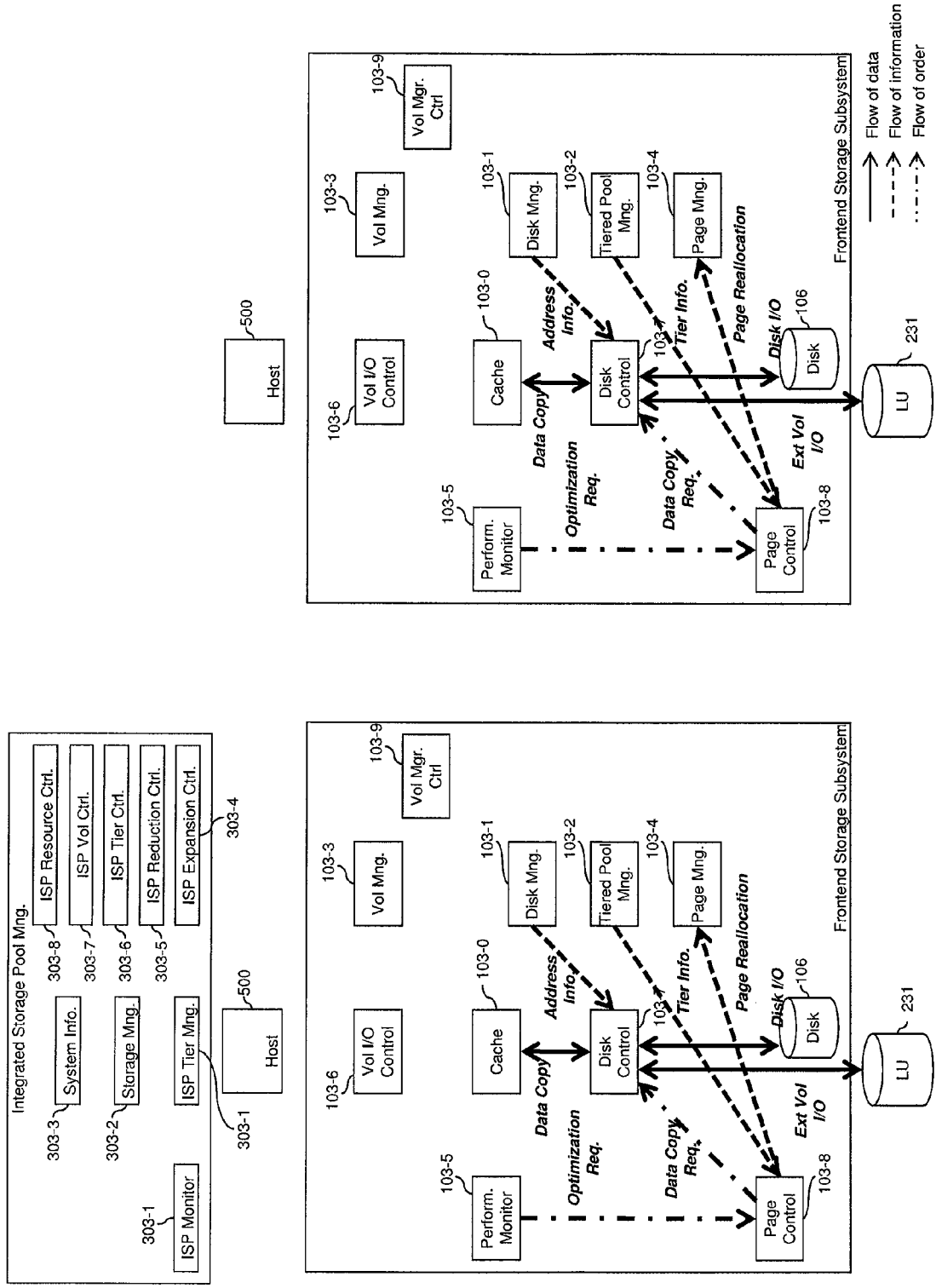
FIG. 38 show the flow of data, information, and order to migrate capacity pages to change the tier.

FIG. 38 show the flow of data, information, and order to migrate capacity pages to change the tier. The Performance Monitor Program 103-5 notifies or instructs the Page Control Program 103-8 to start migration. The Page Control Program 103-8 allocates a new capacity page from a suitable tier by checking the Tiered Pool Management Table 103-2. It orders the Disk Control Program 103-7 to copy the data between two capacity pages and changes the mapping information on the Page Management Table 103-4. The Disk Control Program 103-7 copies the data. It refers to the Disk Management Table 103-1 to obtain the configuration of the RAID groups. The copy process uses the cache area 103-0 to transfer the data. The Disk Control Program 103-7 stores data to the disk 106 or external volume 231.

C5. Resource Information Gathering

FIG. 39 shows an example of the sequence of resource information gathering from each frontend storage subsystem 100. In procedure S5-1, the integrated storage pool management server 300 periodically requests resource information from each frontend storage subsystem 100. In procedure S5-2, the frontend storage subsystem 100 reports the resource information to the integrated storage pool management server 300. The information includes I/O workload (transaction and so on), tier usage (capacity, I/O locality and so on), and I/O performance (I/O rate, cache hit rate and so on).

Figure 40:
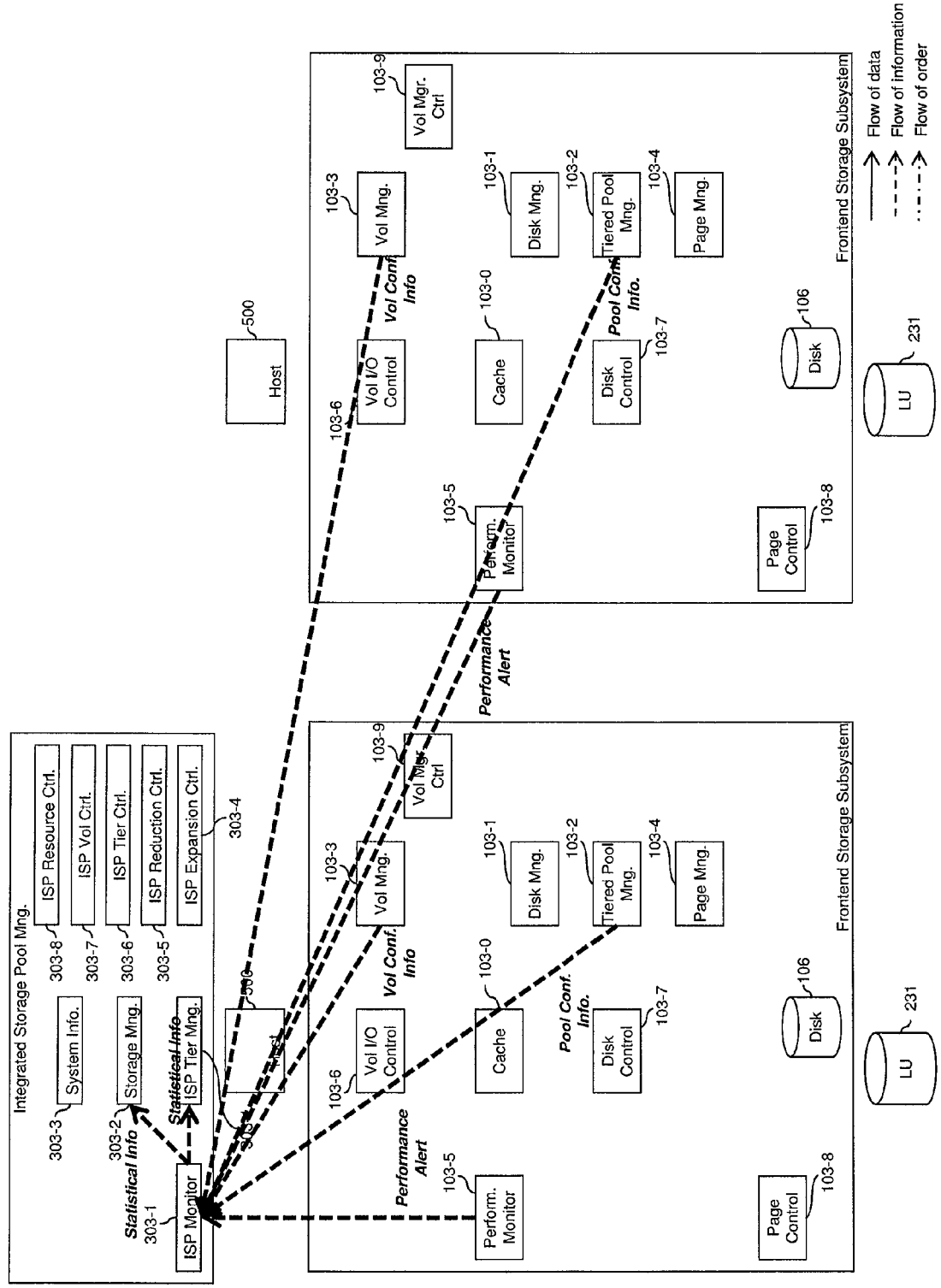
FIG. 40 shows the flow of data, information, and order to migrate capacity pages to change the tier.

FIG. 40 shows the flow of data, information, and order to migrate capacity pages to change the tier. The Performance Monitor Program 103-5 reports workload and actual performance information to the Integrated Storage Pool Monitor Program 303-1. The information includes I/O workload, I/O latency, read/write rate, hit rate, and disk latency. The Tiered Pool Management Table 103-2 reports resource usage information of each tier to Integrated Storage Pool Monitor Program 303-1. The information includes tier status and tier usage. The Volume Management Table 103-3 reports resource usage information of each volume to the Integrated Storage Pool Monitor Program 303-1. The information includes volume status, volume usage, and volume workload.

C6. Remount an External Volume by Other Storage Subsystem

Figure 41:
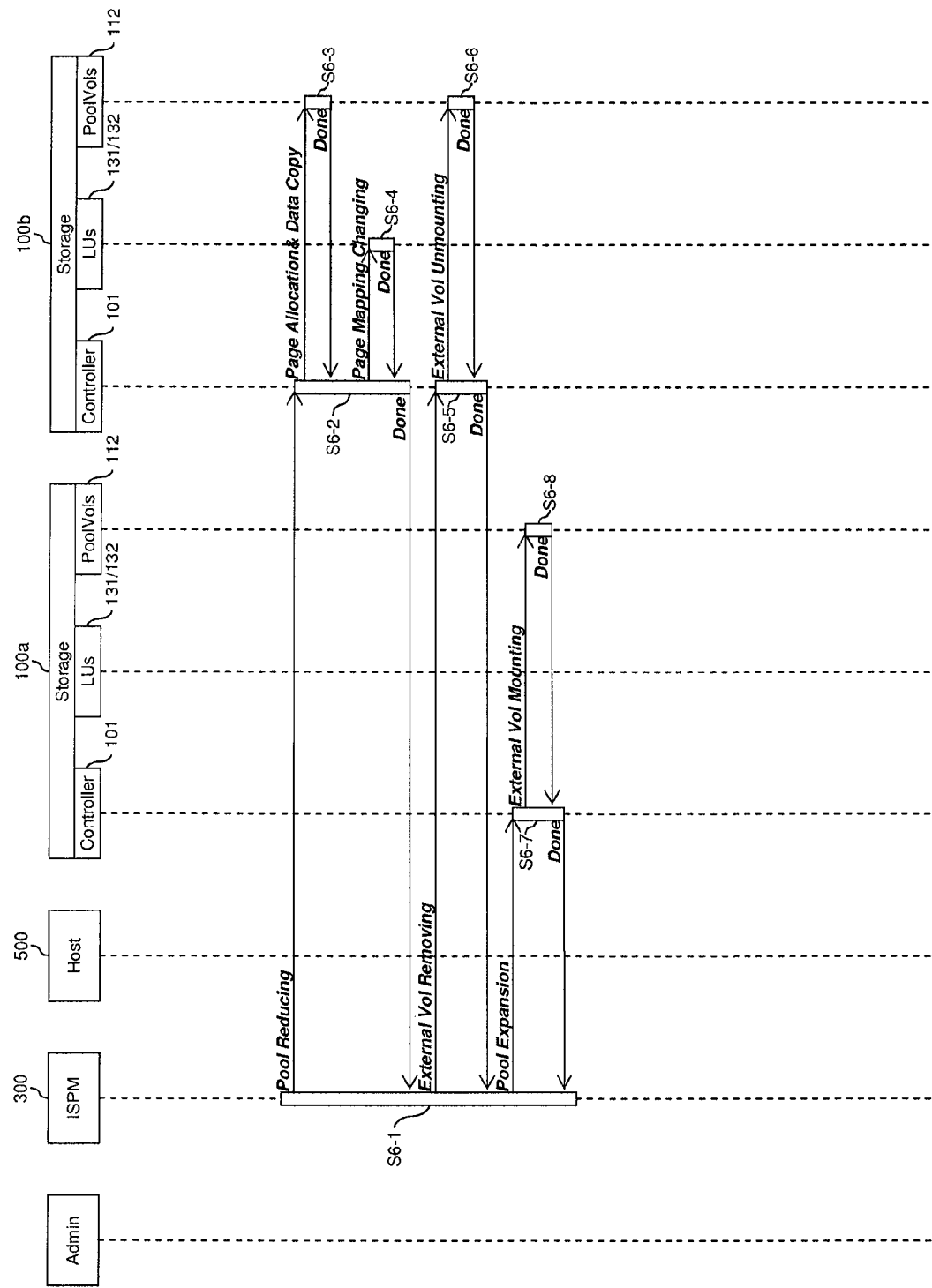
FIG. 41 shows an example of the sequence of changing the mount of external volume between frontend storage subsystems.

FIG. 41 shows an example of the sequence of changing the mount of external volume between frontend storage subsystems 100. This sequence runs at step 303-8-6 and step 303-8-7. In procedure S6-1, the integrated storage pool management server 300 selects external volumes 231 to change the mounting frontend storage subsystem 100b and selects the remounting frontend storage subsystem 100a. The integrated storage pool management server 300 orders the frontend storage subsystem 100b to remove the external volumes 231. After the remove operation, the integrated storage pool management server 300 orders the frontend storage subsystem 100a to mount the unmounted external volume 231 and to install its tiered thin provisioning pool 110. In procedure S6-2, the frontend storage subsystem 100b migrates the already-allocated capacity pages on the designated external volume 231 to other RAID groups. In procedure S6-3, the RAID group 132 which includes the external volume copies data from the designated external volume 231 to other RAID groups. In procedure S6-4, the host volume 131 and cross mount volume 132 change the mapping information of the copied capacity pages. In procedure S6-5, the frontend storage subsystem 100b unmounts the designated external volume 231. In procedure S6-6, the unmounted external volume 231 leaves from the tiered thin provisioning pool 110. In procedure S6-7, the frontend storage subsystem 100a mounts the unmounted external volume 231. In procedure S6-8, the mounted external volume 231 joins to the tiered thin provisioning pool 110.

Figure 42:
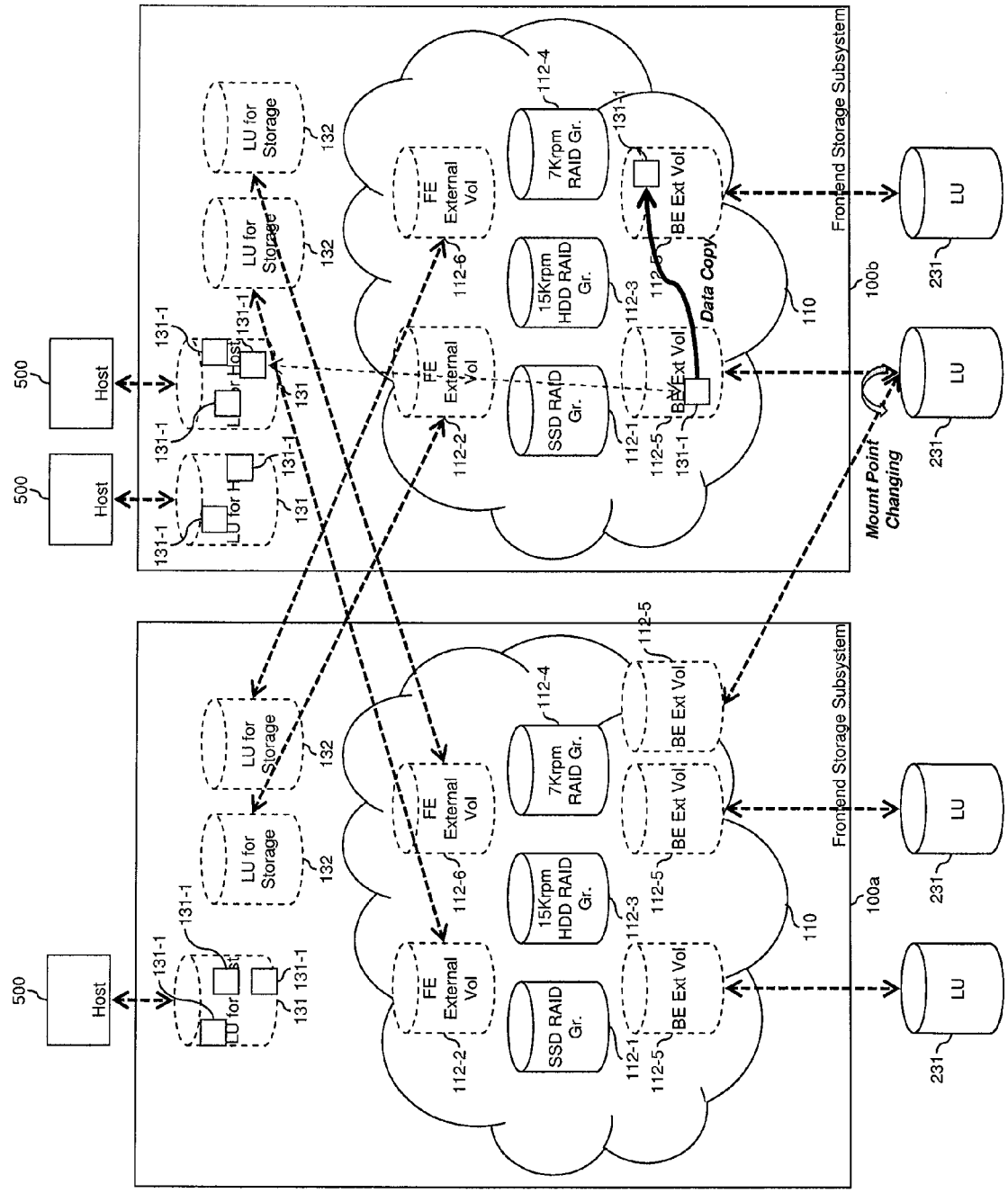
FIG. 42 shows the state of the system during the remount process in FIG. 41.

FIG. 42 shows the state of the system during the remount process. The frontend storage subsystem 100b migrates the capacity page 131-1 which is on the RAID group 112-5 mounting the external volume 231 to another RAID group 112 and unmounts the external volume 231. The frontend storage subsystem 100a mounts the external volume 231 and sets it to the tiered thin provisioning pool 110.

Figure 43:
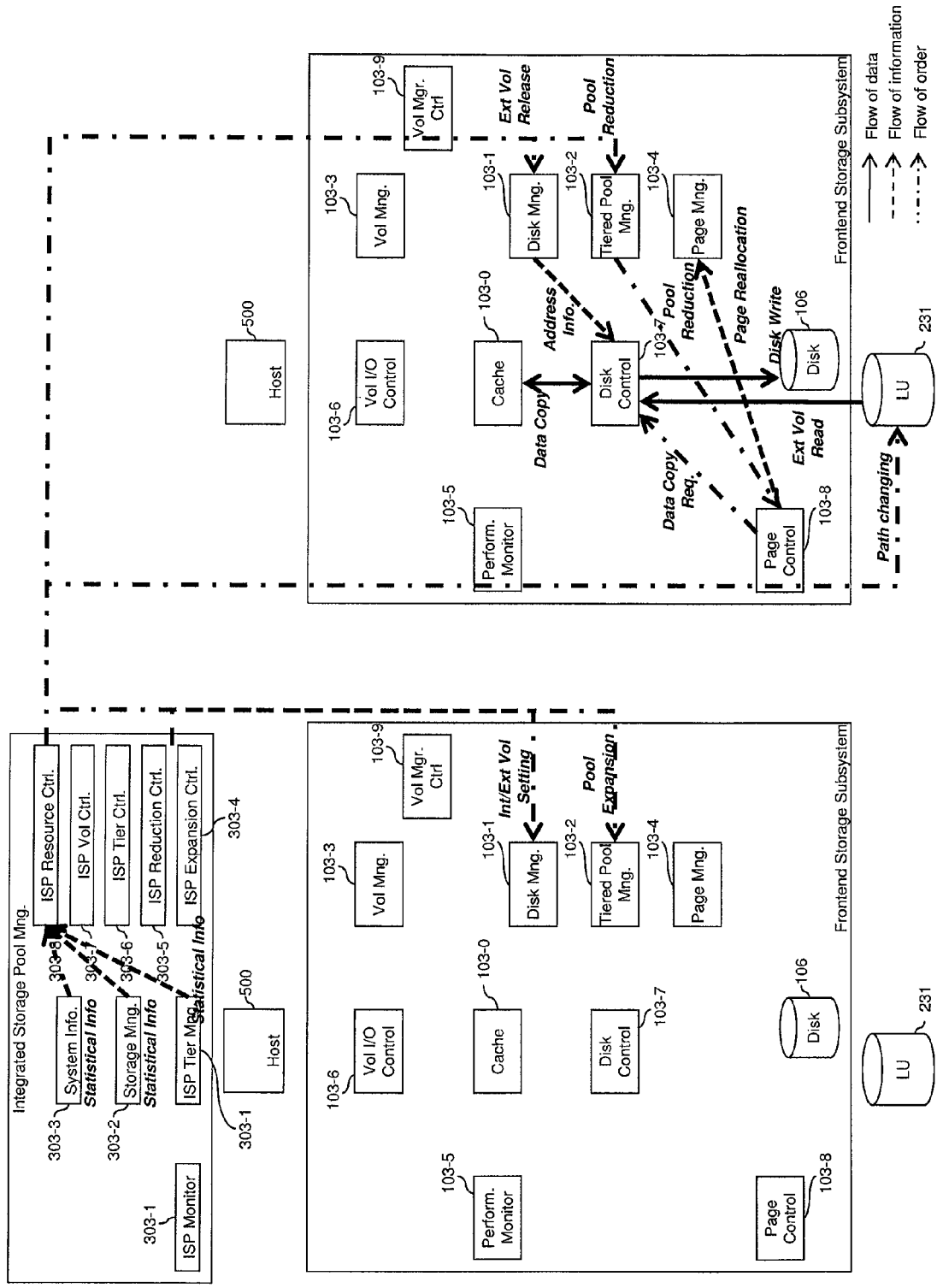
FIG. 43 shows the flow of data, information, and order to remount the external volume.

FIG. 43 shows the flow of data, information, and order to remount the external volume 231. The Integrated Storage Resource Control Program 303-8 finds the unbalance of resource by checking the Storage Subsystem Management Table 303-2. It considers the best way to rebalance by referring to the Storage Subsystem Management Table 303-2, Integrated Storage Tier Management Table 303-1, and System Information table 303-3. As a result, it selects the way to change the mount of an external volume from the frontend storage subsystem 100b to the frontend storage subsystem 100a. The Integrated Storage Resource Control Program 303-8 orders the Tiered Pool Management Table 103-2 on the frontend storage subsystem 100b to remove the RAID group 112 mounting the external volume 231 from the tiered thin provisioning pool 110. The Integrated Storage Resource Control Program 303-8 orders the Disk Management Table 103-1 on the frontend storage subsystem 100b to unmount the external volume 231. The Page Control Program 103-8 on the frontend storage subsystem 100b allocates a new capacity page from a suitable tier by checking the Tiered Pool Management Table 103-2. It orders the Disk Control Program 103-7 to copy the data between the two capacity pages and changes the mapping information on the Page Management Table 103-4.

The Disk Control Program 103-7 on the frontend storage subsystem 100b copies the data by referring to the Disk Management table 103-1 to obtain the configuration of the RAID groups, using the cache area 103-0 to transfer the data, and storing the data to the disk 106 or external volume 231. The Integrated Storage Resource Control Program 303-8 orders the external volume 231 to change the path from the frontend storage subsystem 100b to the frontend storage subsystem 100a. The Integrated Storage Resource Control Program 303-8 orders the frontend storage subsystem 100a and the Disk Management Table 103-1 to mount the external volume 231 as a RAID group 112. The Integrated Storage Resource Control Program 303-8 orders the frontend storage subsystem 100a and the Tiered Pool Management Table 103-2 to make a RAID group 112 mounting external volume 231 join the tiered thin provisioning pool 110.

C7. Addition of Lending Capacity from Other Storage

Figure 44:
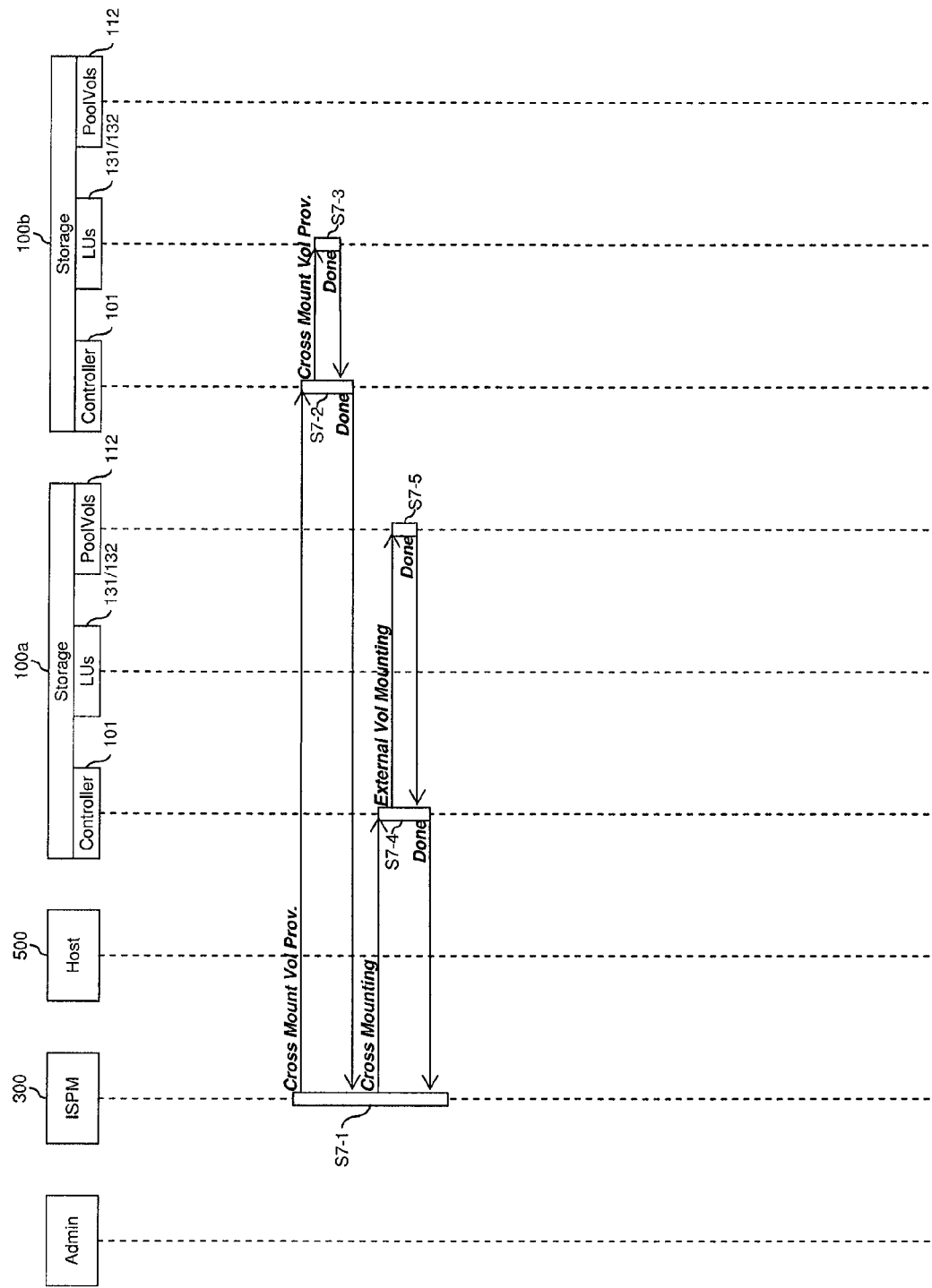
FIG. 44 shows an example of the sequence of increment for mounting capacity from another frontend storage subsystem

FIG. 44 shows an example of the sequence of increment for mounting capacity from another frontend storage subsystem 100. This sequence runs at step 303-8-9 and step 303-8-10. The sequence includes the following procedures. In procedure S7-1, the integrated storage pool management server 300 selects the frontend storage subsystem 100b to lend the capacity to the frontend storage subsystem 100a. The integrated storage pool management server 300 orders the frontend storage subsystem 100b to provision a cross mount volume 132. After the provisioning operation, the integrated storage pool management server 300 order the frontend storage subsystem 100a to mount the cross mount volume 132 and to install its tiered thin provisioning pool 110. In procedure S7-2, the frontend storage subsystem 100b provisions a cross mount volume 132 from its tiered thin provisioning pool 110 with QoS setting for the cross mount volume 132. In procedure S7-3, the cross mount volume 132 is established. In procedure S7-4, the frontend storage subsystem 100a mounts the provisioned cross mount volume 132 of the frontend storage subsystem 100b as the RAID group 112-6, and installs the RAID group 112-6 to the tiered thin provisioning pool 110. In procedure S7-5, the RAID group 112-6 mounting the cross mount volume 132 is joined to the tiered thin provisioning pool 110.

Figure 45:
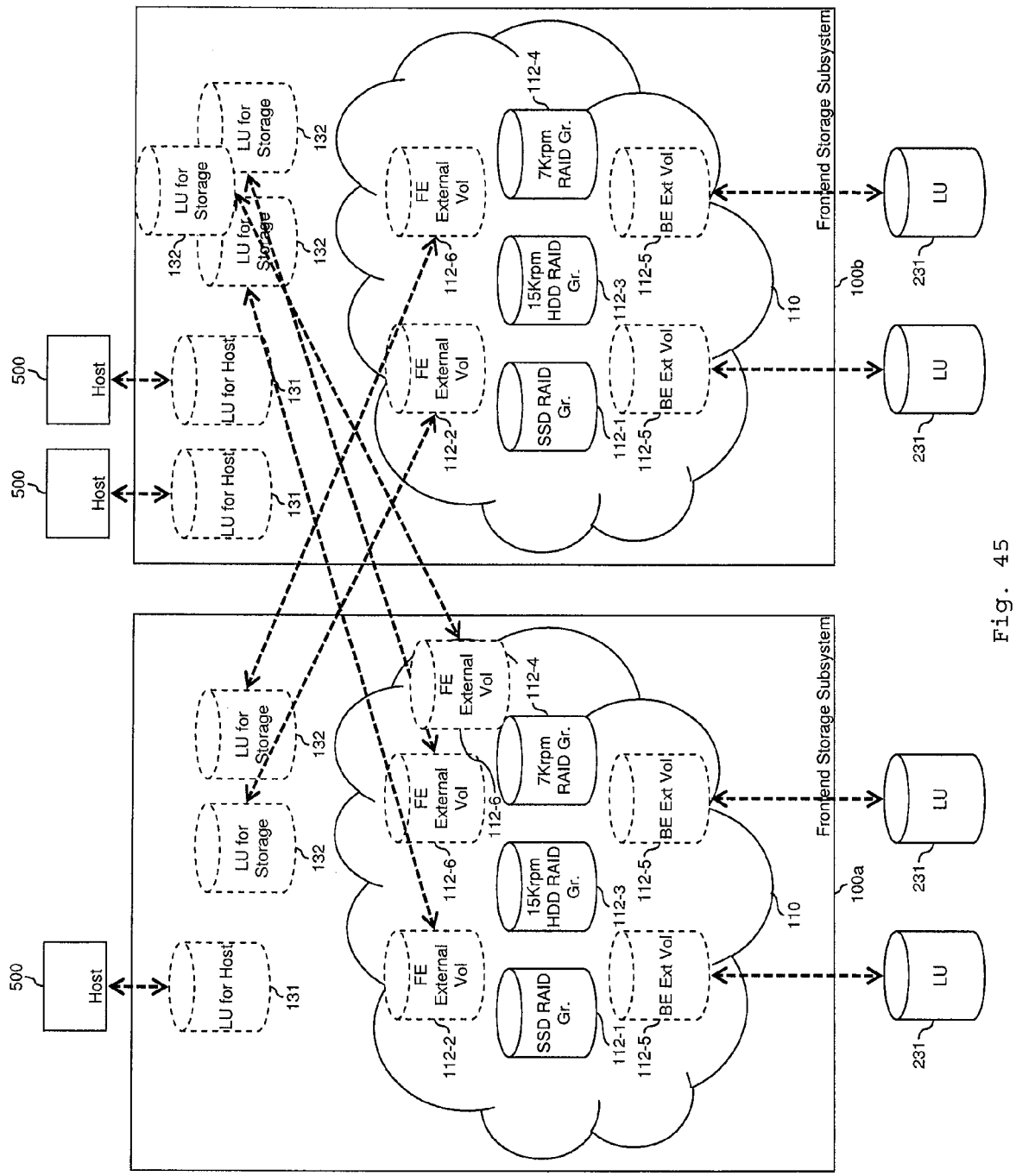
FIG. 45 shows the state of the system during the remount process in FIG. 44.

FIG. 45 shows the state of the system after the addition process. The frontend storage subsystem 100a mounts a cross mount volume 132 of the frontend storage subsystem 100b. The frontend storage subsystem 100a uses the mounted cross mount volume 132 for resource of the tiered thin provisioning pool 110.

Figure 46:
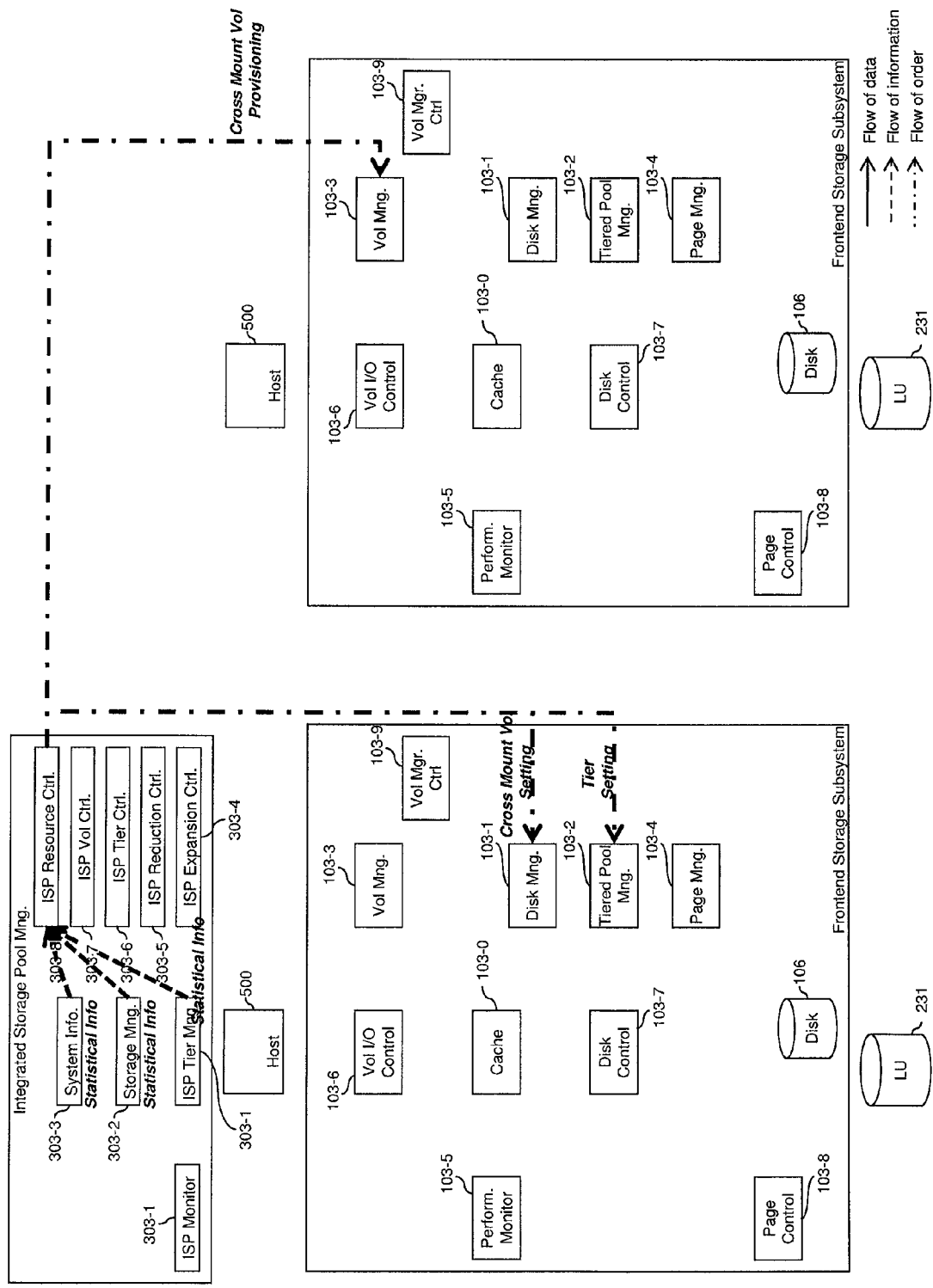
FIG. 46 shows the flow of data, information, and order to remount the external volume.

FIG. 46 shows the flow of data, information, and order to remount the external volume 231. The Integrated Storage Resource Control Program 303-8 finds the unbalance of resource by checking the Storage Subsystem Management Table 303-2. It considers the best way to rebalance by referring to the Storage Subsystem Management Table 303-2, Integrated Storage Tier Management Table 303-1, and System Information table 303-3. As a result, it selects the way to lend the capacity from the frontend storage subsystem 100b to the frontend storage subsystem 100a. The Integrated Storage Resource Control Program 303-8 orders the Volume Management Table 103-3 on the frontend storage subsystem 100b to provision a cross mount volume 231. The Integrated Storage Resource Control Program 303-8 orders the Disk Management Table 103-1 on the frontend storage subsystem 100a to mount the cross mount volume on the frontend storage subsystem 100b and to join the mounted cross mount volume 132 to the tiered thin provisioning pool 110.

C8. Volume Migration to Other Storage

Figure 47:
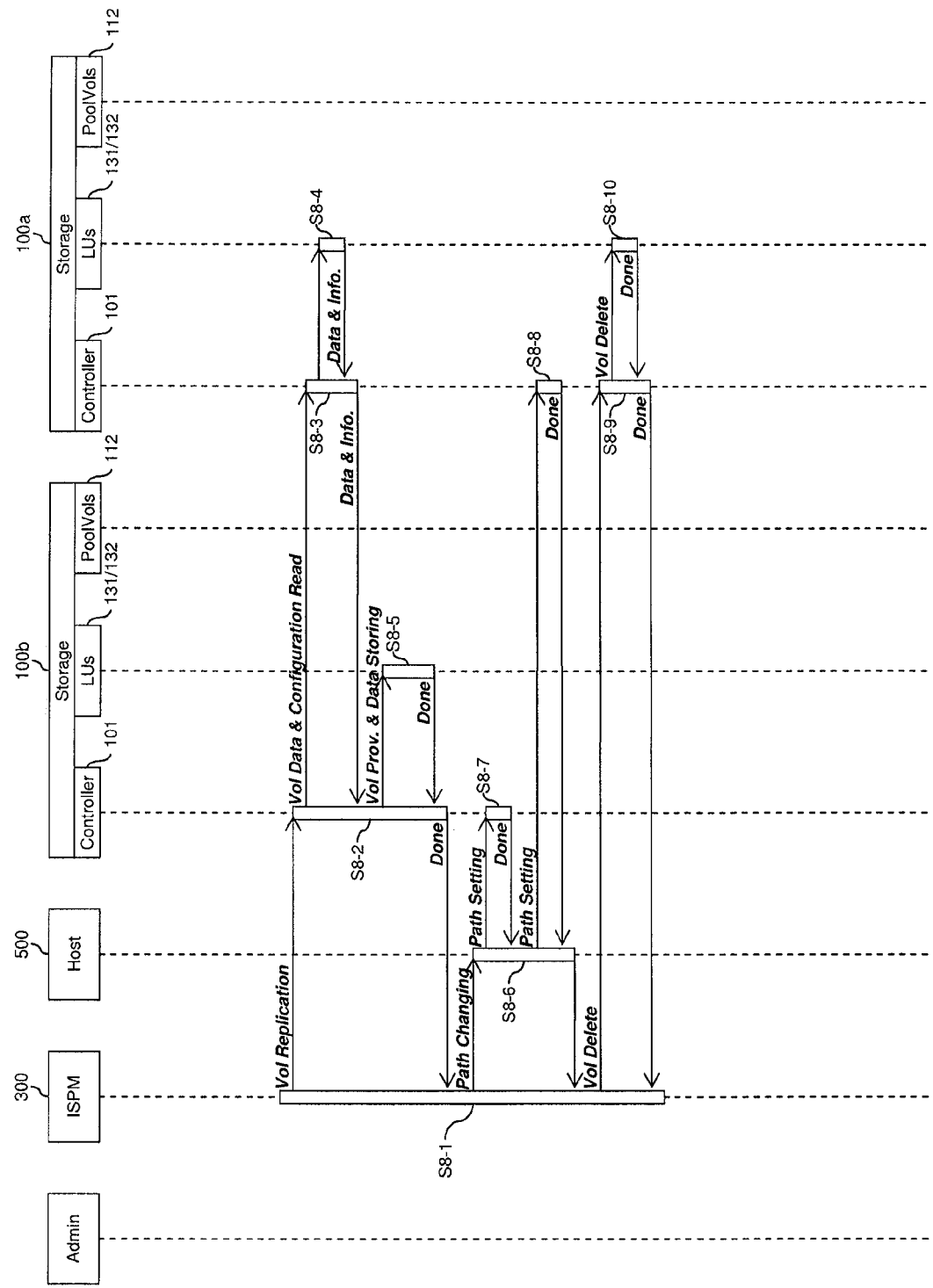
FIG. 47 shows an example of the sequence of volume migration between two storage subsystems.

FIG. 47 shows an example of the sequence of volume migration between two storage subsystems. This sequence runs at step 303-8-8. In procedure S8-1, the integrated storage pool management server 300 selects host volumes 131 to migrate from the frontend storage subsystem 100a to the frontend storage subsystem 100b. The integrated storage pool management server 300 orders to migrate from the frontend storage subsystem 100a to the frontend storage subsystem 100b. In procedure S8-2, the frontend storage subsystem 100b copies the configurations and data of the designated host volumes 131 on the frontend storage subsystem 100a. In procedure S8-3, the frontend storage subsystem 100a transfers the data and configuration of the host volume 131. In procedure S8-4, the host volume 131 on the frontend storage subsystem 100a transfers the data. In procedure S8-5, the host volume 131 on the frontend storage subsystem 100b is provisioned and stores the data. In procedure S8-6, the host 500 changes the path from the host volume 131 on the frontend storage subsystem 100a to the host volume 131 on the frontend storage subsystem 100b. In procedure S8-7, the frontend storage subsystem 100a disconnects the host path. In procedure S8-8, the frontend storage subsystem 100b connects the host path. In procedure S8-9, the frontend storage subsystem 100a deletes the migrated host volume 131. In procedure S8-10, the migrated host volume 131 releases the allocated capacity pages.

Figure 48:
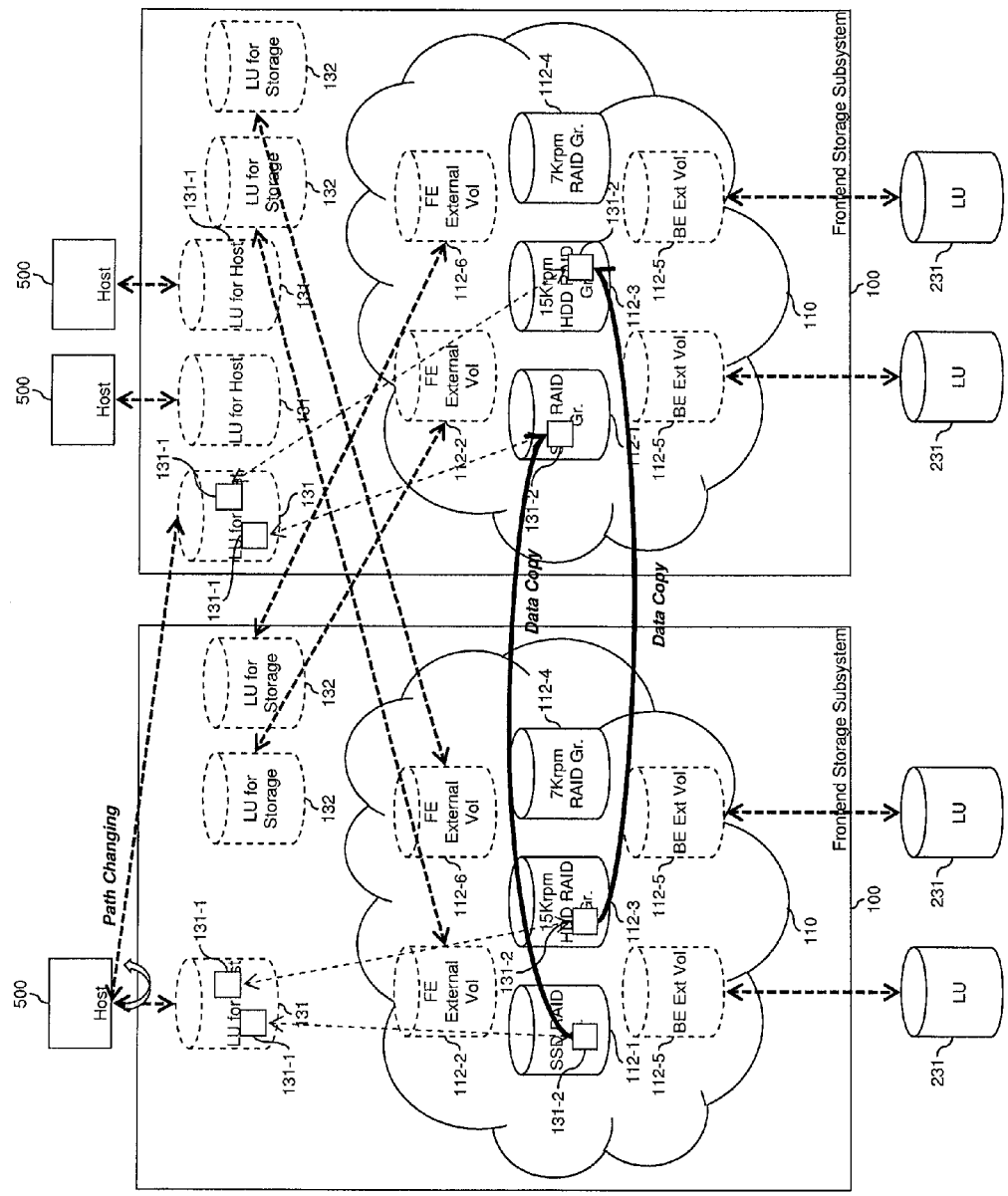
FIG. 48 shows the state of the system during the migration process in FIG. 47.

FIG. 48 shows the state of the system during the migration process. The frontend storage subsystem 100a migrates a host volume 131 to the frontend storage subsystem 100b. The host 500 changes the path from the frontend storage subsystem 100a to the frontend storage subsystem 100b.

Figure 49:
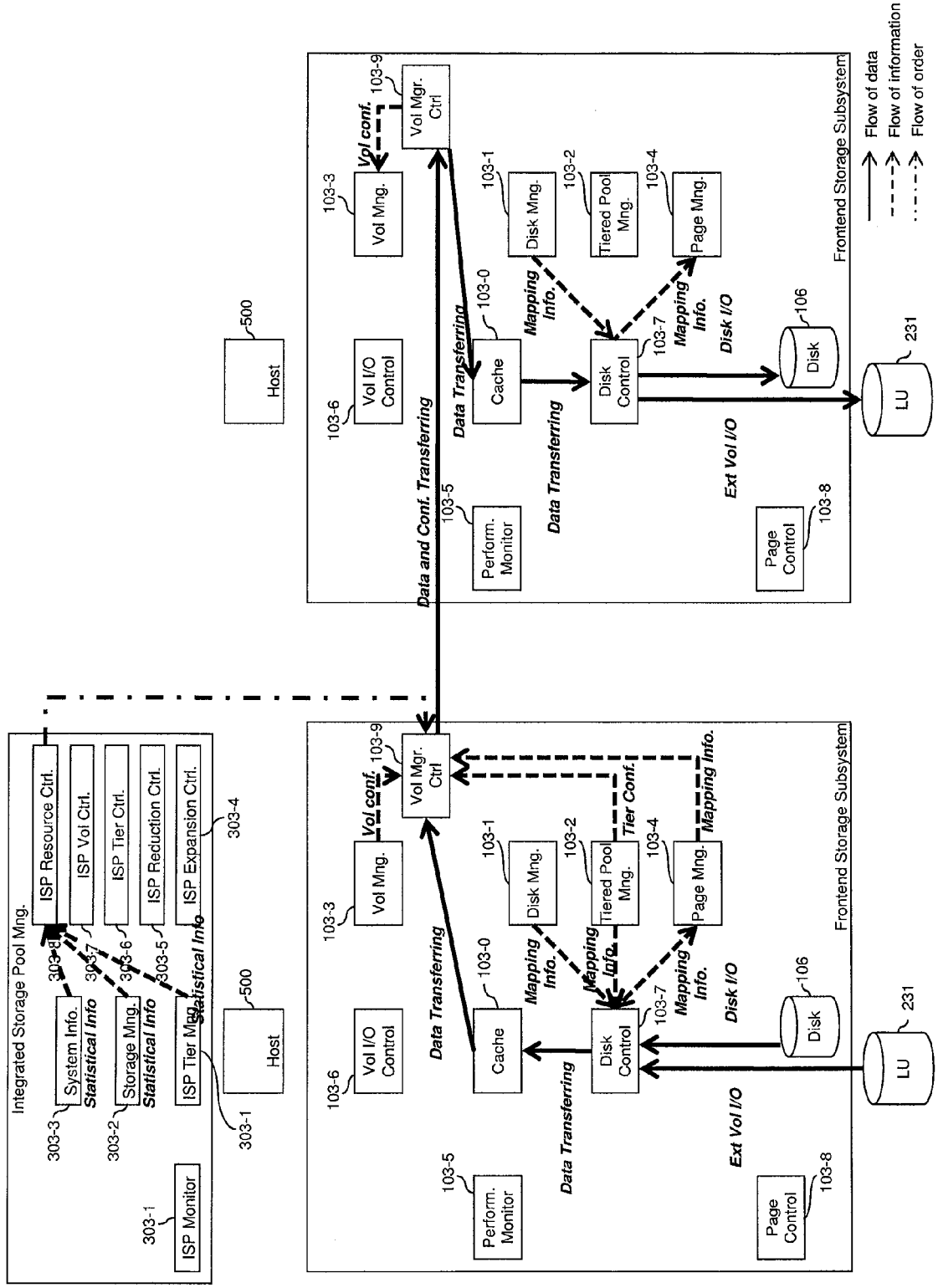
FIG. 49 shows the flow of data, information, and order to remount an external volume.

FIG. 49 shows the flow of data, information, and order to remount an external volume 231. The Integrated Storage Resource Control Program 303-8 finds the unbalance of resource by checking the Storage Subsystem Management Table 303-2. It considers the best way to rebalance by referring to the Storage Subsystem Management Table 303-2, Integrated Storage Tier Management Table 303-1, and System Information table 303-3. As a result, it selects the way to migrate an online volume from the frontend storage subsystem 100a to the frontend storage subsystem 100b.

The Integrated Storage Resource Control Program 303-8 orders the Volume Migration Control Program 103-9 to migrate a host volume 131 to the frontend storage subsystem 100b. The Volume Migration Control Program 103-9 on the frontend storage subsystem 100a gathers the configuration of the host volume 131 from the Volume Management Table 103-3, Tiered Pool Management Table 103-2, and Page Management Table 103-4. It is particularly important to know the allocation information from the Page Management Table 103-4. Because this information is useful for reducing the bandwidth for migration by excepting or excluding the copy for page-unallocated area. The Volume Migration Control Program 103-9 on the frontend storage subsystem 100a orders the Disk Control Program 103-7 to transfer the data from the external volume 231 and/or disks 106 to the cache area 103-3. The Volume Migration Control Program 103-9 on the frontend storage subsystem 100a reads data from the cache area 103-0 and transfers the data and configuration to the Volume Migration Control Program 103-9 on the frontend storage subsystem 100b. The Volume Migration Control Program 103-9 on the frontend storage subsystem 100b provisions a host volume 131 with the aforesaid configuration by applying it to the Volume Management Table 103-9 and stores the data on the cache area 103-0. The Disk Controls Program 103-7 allocates a capacity page by changing the Page Management Table 103-4. The Disk Controls Program 103-7 stores data on the cache area 103-0 to the external volume 231 or disks 106 by resolving the mapping with the Disk Management Table 103-1.

C9. Integrated Storage Pool Reduction

Figure 50:
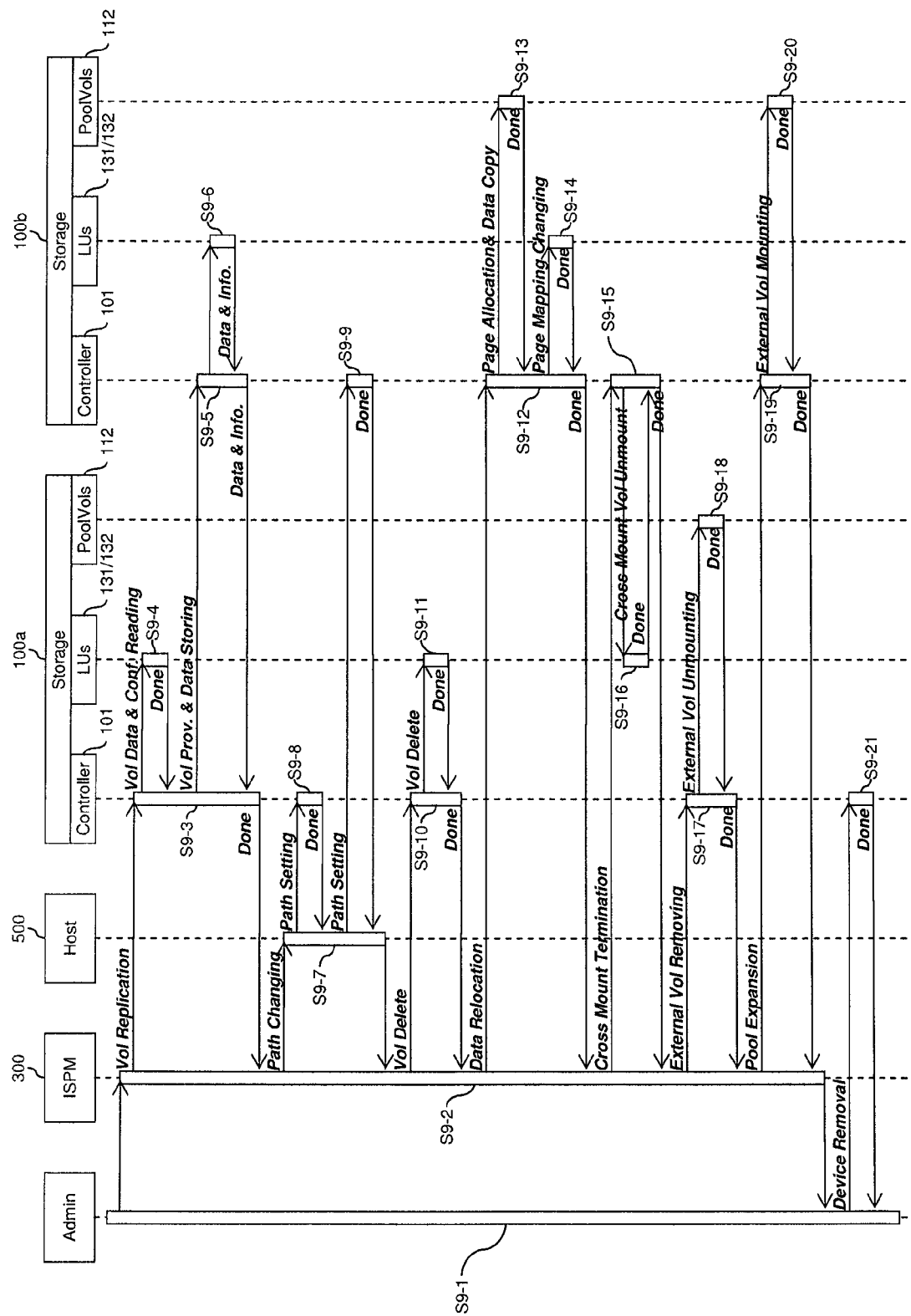
FIG. 50 shows an example of the sequence of reduction of the integrated storage pool by removal of a storage subsystem.

FIG. 50 shows an example of the sequence of reduction of the integrated storage pool 600 by removal of a storage subsystem. In procedure S9-1, the user designates a storage subsystem to be removed from the integrated storage pool. After the pool reduction process completes, the user removes the storage from the system. In procedure S9-2, the integrated storage pool management server 300 checks the configuration of the designated storage subsystem.

If the storage subsystem is a backend storage subsystem 200, the following occurs. The frontend storage subsystem 100 which mounts the removed backend storage subsystem 200 reallocates capacity pages from the external volumes 216 to other RAID groups 112. The frontend storage subsystem 100 unmounts the external volume 216.

If the storage subsystem is a frontend storage subsystem 100, the following occurs. The frontend storage subsystem 100a copies the data and configuration of the host volumes 131 to other frontend storage subsystems 100. The host 500 which connects the copied host volumes 131 changes the path to copy the target host volume 131. The frontend storage subsystem 100a deletes the copy-source host volumes 131. The frontend storage subsystem 100b which does not include the removed frontend storage subsystem 100a reallocates capacity pages from the RAID groups mounting the cross mount volumes 132 on the removed frontend storage subsystem 100. The frontend storage subsystem 100b which does not include the removed frontend storage subsystem 100a unmounts the cross mount volumes 132 of the removed frontend storage subsystem 100a. The removed frontend storage subsystem 100 unmounts the external volumes 231. The frontend storage subsystem 100b which does not include the removed frontend storage subsystem 100a mounts the unmounted external volumes 231.

In procedure S9-3, the frontend storage subsystem 100 reads the configuration and data of all host volumes 131. In procedure S9-4, the host volume 131 transfers the data. In procedure S9-5, the frontend storage subsystem 100a transfers the data and configuration of the host volume 131 to the frontend storage subsystem 100a. In procedure S9-6, the host volume 131 on the frontend storage subsystem 100b is provisioned and stores the data. In procedure S9-7, the host 500 changes the path from the frontend storage subsystem 100a to the frontend storage subsystem 100b. In procedure S9-8, the host volume 131 on the frontend storage subsystem 100a disconnects the host path. In procedure S9-9, the host volume 131 on the frontend storage subsystem 100b connects the host path. In procedure S9-10, the frontend storage subsystem 100a deletes all host volumes 131. In procedure S9-11, the host volume 131 is deleted. The procedure S9-12, the frontend storage subsystem 100b reallocates the capacity pages on the RAID group mounting an external volume 231 to other RAID groups. In procedure S9-13, the RAID group copies data to other RAID groups 112. In procedure S9-14, the cross mount volume 132 changes the mapping for capacity pages. In procedure S9-15, the frontend storage subsystem 100b removes the RAID groups 112 mounting the cross mount volumes 132 from the tiered thin provisioning pool 110. The frontend storage subsystem 100b unmounts the mounted cross mount volumes 132. In procedure S9-16, the cross mount volume 132 on the frontend storage subsystem 100a is unmounted. In procedure S9-17, the frontend storage subsystem 100a unmounts the external volumes 216. In procedure S9-18, the RAID group 112 unmounts the external volume 216. In procedure S9-19, the frontend storage subsystem 100b mounts the external volume 216 which was mounted on the frontend storage subsystem 100a. In procedure S9-20, the RAID group 112 mounts the external volume 216. In procedure S9-21, the frontend storage subsystem 100a is removed from the system.

Figure 51:
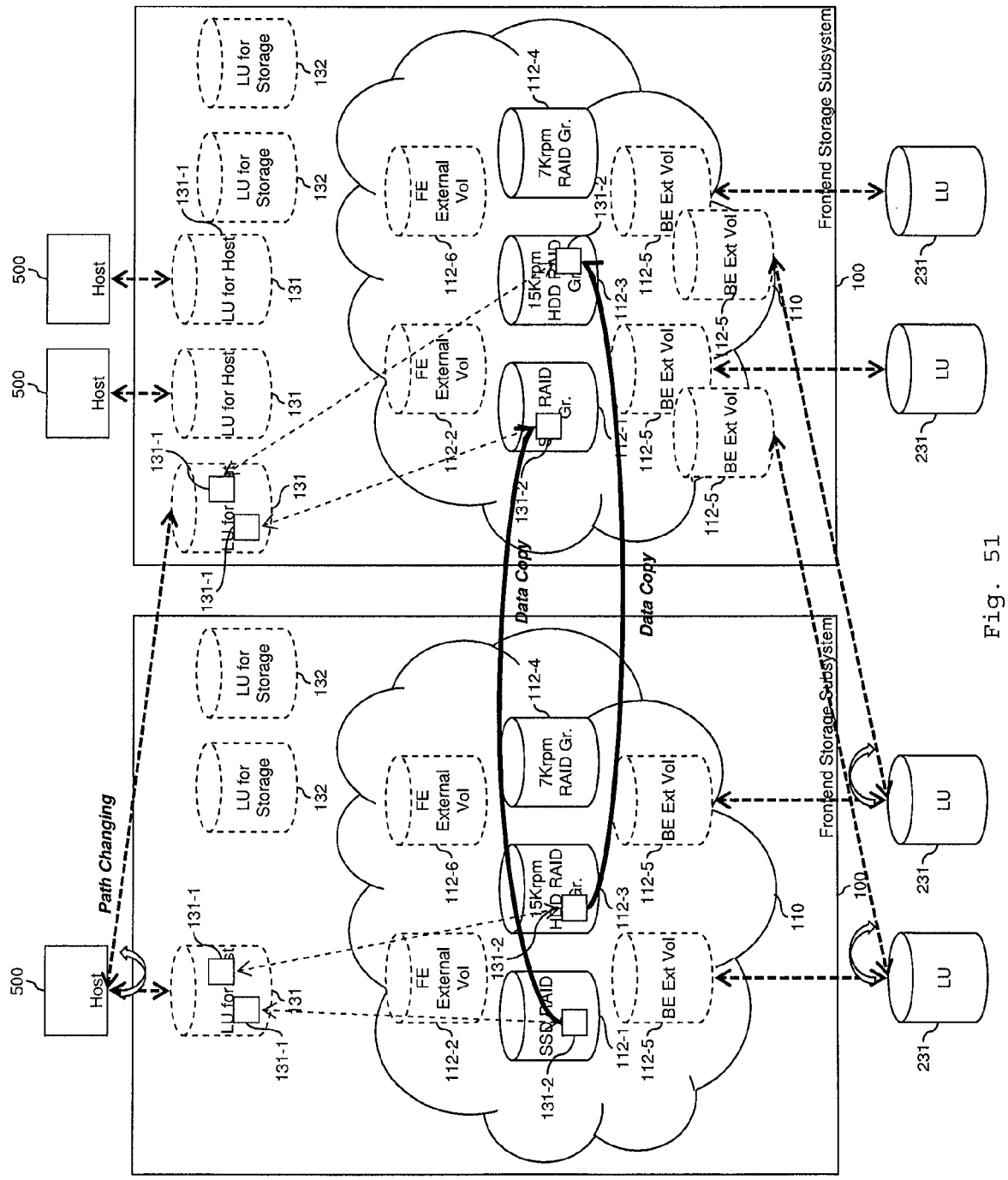
FIG. 51 shows the state of the system during the reduction process of the integrated storage pool in FIG. 50.

FIG. 51 shows the state of the system during the reduction process of the integrated storage pool 600. The frontend storage subsystem 100a migrates a host volume 131 to the frontend storage subsystem 100b. The frontend storage subsystem 100b mounts an external volume 213 which the frontend storage subsystem 100a has mounted. The connection to the cross mount volume 132 of the frontend storage subsystem 100a mounted by the frontend storage subsystem 100b is disconnected. The connection from the host 500 to the host volume 131 of the frontend storage subsystem 100a is succeeded to or switched to the frontend storage subsystem 100b.

Of course, the system configurations illustrated in FIGS. 1, 4, 10, 13, and 21 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for tiered storage pool management and control for lose coupled multiple storage environment. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system, comprising:
  a plurality of storage systems forming a storage pool, a first storage system of the plurality of storage systems having a first storage controller, which receives input/output (I/O) commands from host computers and provides first storage volumes to the host computers, and a second storage system of the plurality of storage systems including a second storage controller, which receives I/O commands from host computers and provides second storage volumes to the host computers; and
  a computer, being adapted to be coupled to the plurality of storage systems, the computer managing to add a new storage system to the storage pool or to remove one of the storage systems from the storage pool,
  wherein upon adding the new storage system to the storage pool, a storage controller of the new storage system provides new storage volumes to the host computers, and the computer controls path setting between the new storage system and a storage system existing in the storage pool,
  wherein upon removing the one of the storage systems from the storage pool, the computer removes the storage volumes of the removed one of the storage systems from the storage pool, and the computer controls to remove a path between the removed one of the storage systems and another storage system in the storage pool,
  wherein upon removing the one of the storage systems from the storage pool, the computer controls the one of the storage systems to unmount storage volumes provided to the one of the storage systems, the storage pool to re-mount the storage volumes from the one of the storage systems, and the storage pool to unmount storage volumes provided by the storage controller of the one of the storage systems,
  wherein the storage volumes unmounted from the removed one of the storage systems include physical storage volumes, and
  wherein the computer controls to remove the path to the removed one of the storage systems after unmounting the storage volumes.

2. The system according to claim 1, further comprising:
  wherein the computer selects to migrate a first storage volume to a second storage volume, or change control from the second storage controller to the first storage controller against a storage media which is coupled to both the first and second storage controllers, based on a load requirement of the system.

3. The system according to claim 1, wherein upon adding the new storage system to the storage pool, a storage controller of the new storage system provides storage volumes to the storage pool, and
  wherein the computer controls path setting to the new storage system from the host computers.

4. The system according to claim 3, wherein upon adding the new storage system to the storage pool, the computer controls the storage pool to provide storage volumes to the new storage system, and
  wherein the computer controls path setting to the storage pool from the host computers.

5. The system according to claim 1, wherein prior to removing the path to the removed one of the storage systems, the computer selects which of the storage systems in the storage pool that re-mount the storage volumes from the removed one of the storage systems, and the re-mounted physical storage volumes are provided as one or more storage media.

6. A computer adapted to be coupled to a plurality of storage systems forming a storage pool, the storage pool including a first storage system of the plurality of storage systems having a first storage controller, which receives input/output (I/O) commands from host computers and provides first storage volumes to the host computers, and a second storage system of the plurality of storage systems including a second storage controller, which receives I/O commands from host computers and provisions second storage volumes to the host computers, the computer comprising:
  a processor; and
    a computer-readable storage medium encoded with instructions that, when executed on the processor, instruct the processor to perform acts for controlling the storage pool and storage systems thereof, the acts comprising:
    adding a new storage system to the storage pool or removing one of the storage systems from the storage pool;
    wherein upon adding the new storage system to the storage pool, instructing a storage controller of the new storage system to provide new storage volumes to the host computers, and controlling path setting between the new storage system and a storage system existing in the storage pool,
    wherein upon removing the one of the storage systems from the storage pool, instructing the storage pool to remove storage volumes of the removed one of the storage systems from the storage pool, and to remove a path between the removed one of the storage systems and another storage system in the storage pool, and
    wherein upon removing the one of the storage systems from the storage pool, the acts further comprising:
    controlling the one of the storage systems to unmount storage volumes provided to the one of the storage systems;
    controlling the storage pool to re-mount the storage volumes from the one of the storage systems;
    controlling the storage pool to unmount storage volumes provided by the storage controller of the one of the storage systems; and
    controlling to remove the path to the removed one of the storage systems,
    wherein the storage volumes unmounted from the removed one of the storage systems include physical storage volumes.

7. The computer according to claim 6, the acts further comprising:
  selecting to migrate a first storage volume to a second storage volume, or changing control from the second storage controller to the first storage controller against a storage media which is coupled to both the first and second storage controllers, based on a load requirement of the storage pool.

8. The computer according to claim 6, wherein upon adding the new storage system to the storage pool, a storage controller of the new storage system provides storage volumes to the storage pool, the acts further comprising:
  controlling path setting to the new storage system from the host computers.

9. The computer according to claim 8, wherein upon adding the new storage system to the storage pool, the acts further comprising:
  controlling the storage pool to provide storage volumes to the new storage system; and
  controlling path setting to the storage pool from the host computers.

10. The computer according to claim 6, wherein prior to removing the path to the removed one of the storage systems, the acts further comprising:
  selecting which of the storage systems in the storage pool that re-mount the storage volumes from the removed one of the storage systems, and
  controlling the storage pool to provide the re-mounted physical storage volumes as one or more storage media.

11. A non-transitory computer-readable medium encoded with instructions that, when executed on a processor, instruct the processor to perform a method of controlling a plurality of storage systems forming a storage pool, where the storage pool includes a first storage system having a first storage controller, which receives input/output (I/O) commands from host computers and provides first storage volumes to the host computers, and a second storage system including a second storage controller, which receives I/O commands from host computers and provisions second storage volumes to the host computers, the method comprising:
  adding a new storage system to the storage pool or removing one of the storage systems from the storage pool;
  wherein upon adding the new storage system to the storage pool, instructing a storage controller of the new storage system to provide new storage volumes to the host computers, and controlling path setting between the new storage system and a storage system existing in the storage pool, and
  wherein upon removing the one of the storage systems from the storage pool, instructing the storage pool to remove storage volumes of the removed one of the storage systems from the storage pool, and to remove a path between the removed one of the storage systems and another storage system in the storage pool, and
  the method further comprising:
  upon removing the one of the storage systems from the storage pool, controlling the one of the storage systems to unmount storage volumes provided to the one of the storage systems;
  controlling the storage pool to re-mount the storage volumes from the one of the storage systems;
  controlling the storage pool to unmount storage volumes provided by the storage controller of the one of the storage systems; and
  controlling to remove the path to the removed one of the storage systems,
  wherein the storage volumes unmounted from the removed one of the storage systems include physical storage volumes.

12. The non-transitory computer-readable medium according to claim 11, the method further comprising:
  selecting to migrate a first storage volume to a second storage volume, or changing control from the second storage controller to the first storage controller against a storage media which is coupled to both the first and second storage controllers, based on a load requirement of the storage pool.

13. The non-transitory computer-readable medium according to claim 11, the method further comprising:
  upon adding the new storage system to the storage pool, a storage controller of the new storage system provides storage volumes to the storage pool, controlling path setting to the new storage system from the host computers.

14. The non-transitory computer-readable medium according to claim 13, the method further comprising:
  upon adding the new storage system to the storage pool, controlling the storage pool to provide storage volumes to the new storage system; and
  controlling path setting to the storage pool from the host computers.

15. The non-transitory computer-readable medium according to claim 11, the method further comprising:
  prior to removing the path to the removed one of the storage systems, selecting which of the storage systems in the storage pool that re-mount the storage volumes from the removed one of the storage systems, and
  controlling the storage pool to provide the re-mounted physical storage volumes as one or more storage media.

* * * * *